(12) United States Patent
Kamei et al.

(10) Patent No.: US 8,281,009 B2
(45) Date of Patent: Oct. 2, 2012

(54) INTERMEDIATE NAS APPARATUS HAVING ACL INHERITANCE FUNCTION FOR NAMESPACE INTEGRATION

(75) Inventors: Hitoshi Kamei, Sagamihara (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 871 days.

(21) Appl. No.: 12/013,584

(22) Filed: Jan. 14, 2008

(65) Prior Publication Data
US 2009/0089413 A1    Apr. 2, 2009

(30) Foreign Application Priority Data
Sep. 27, 2007  (JP) ................................ 2007-251457

(51) Int. Cl.
*G06F 11/00* (2006.01)
(52) U.S. Cl. .................. 709/225; 709/223; 709/224
(58) Field of Classification Search .......... 709/217–219, 709/223–225
See application file for complete search history.

(56) References Cited

U.S. PATENT DOCUMENTS

| | | | |
|---|---|---|---|
| 6,061,684 A * | 5/2000 | Glasser et al. | 707/999.009 |
| 7,139,973 B1 * | 11/2006 | Kirkwood et al. | 715/206 |
| 2003/0097454 A1 | 5/2003 | Yamakawa et al. | |
| 2006/0059211 A1 | 3/2006 | Futatsugi | |
| 2006/0150169 A1 * | 7/2006 | Cook et al. | 717/156 |
| 2006/0236381 A1 * | 10/2006 | Weeden | 726/6 |

FOREIGN PATENT DOCUMENTS

| | | |
|---|---|---|
| JP | 2003162449 A | 6/2003 |
| JP | 2003-203029 | 7/2003 |
| JP | 2006079465 A | 3/2006 |

OTHER PUBLICATIONS

U.S. Appl. No. 11/972,653, filed Jan. 11, 2008, Takaki Nakamura.

* cited by examiner

*Primary Examiner* — Kenneth R Coulter
(74) *Attorney, Agent, or Firm* — Hitachi America, Ltd.

(57) ABSTRACT

According to this invention, a computer system which provides a client node with a file system mounted into a virtual namespace, comprising: at least one file server which provides the file system; a root node which mounts the file system provided by the file server into the virtual namespace; and a network which couples the file server and the root node. The root node has an interface coupled to the network, a processor coupled to the interface, and a memory coupled to the processor. The root node is configured to: obtain access information set to a directory above a point in the virtual namespace at which the file system is to be mounted when mounting the file system into the virtual namespace; judge whether the obtained access information is to be inherited; and set, to the file system to be mounted, the obtained access information that is to be inherited.

8 Claims, 40 Drawing Sheets

| SHARED ID | SERVER ID | ALGORITHM INFORMATION ID |
|---|---|---|
|  |  |  |
|  |  |  |
|  |  |  |

SWITCH INFORMATION MANAGEMENT TABLE

FIG. 10

| SERVER ID | SERVER INFORMATION |
|---|---|
|  |  |
|  |  |
|  |  |

SERVER INFORMATION MANAGEMENT TABLE

FIG. 11

| ALGORITHM INFORMATION ID | ALGORITHM INFORMATION |
|---|---|
| | |
| | |
| | |

ALGORITHM INFORMATION MANAGEMENT TABLE

FIG. 12

| CONNECTION SOURCE OBJECT ID | CONNECTION DESTINATION SHARED ID | CONNECTION DESTINATION OBJECT ID |
|---|---|---|
| | | |
| | | |
| | | |

CONNECTION POINT MANAGEMENT TABLE

FIG. 13

INTERMEDIATE NAS APPARATUS HAVING ACL INHERITANCE FUNCTION FOR NAMESPACE INTEGRATION

CLAIM OF PRIORITY

The present application claims priority from Japanese patent application JP 2007-251457 filed on Sep. 27, 2007, the content of which is hereby incorporated by reference into this application.

BACKGROUND

This invention relates to a device that virtualizes a file system namespace provided to a client by a file server.

A file server provides a file sharing service to a plurality of clients via a network. A client shares a file stored in the file server with other clients. Thus, a plurality of users can share data in a specific file.

An increasing amount of data is stored in file servers, raising the count of file servers run in one company or organization. Files are scattered over those many file servers, and it is difficult to grasp where any particular file is stored.

Global name space (GNS) presents a solution to this problem. GNS integrates file namespaces managed separately by individual file servers into one virtual file namespace, and provides the created virtual namespace to clients. Data in different servers can thus be accessed through a unified file access path. GNS provides a function of virtualizing file servers in this manner.

Access to files managed by a file server is controlled in order to limit users that can access the files. Usually, file servers are run on a department basis or the like, and only users belonging to the department are allowed access to files managed by the department's file server. Which user has access can be set to each file as a further preventive measure against information leakage. One of such access control methods is a method called an access control list (ACL).

An ACL is an aggregation of access control entries (ACEs) each of which is a combination of "user," "operation," and "access right."

However, an ACL may contain zero ACE and, in that case, any other user than the owner of the file is denied access to the file.

The ACL method includes an "inheritance function" with which an ACL set to one directory is set to file system objects (e.g., files and directories) contained in the directory. An ACL with its inheritance function turned on is called an inheritable ACL. A directory above a directory which stores a file system object is called a parent directory, and a file system object which is stored in a parent directory is called a child file or a child directory.

In GNS, a root node integrates file servers to provide a virtual namespace to clients. The clients send access requests to the root node in the same way as in normal access to the file servers. Since the root node is recognized as a normal file server, an access control function is necessary in GNS, too.

GNS connects file namespaces provided by a plurality of file servers to one virtual file namespace. A client makes a file access request to a file tree in the virtual file namespace.

If the client sets here an inheritable ACL to a directory in the virtual file namespace, the inheritable ACL is also set to file system objects stored in the directory. For example, when a directory in a file server A is a parent directory and a file server B is connected to a directory under the parent directory, the parent directory in the file server A and file system objects in the file server B have different inheritable ACLs.

Let us now discuss how a GNS is configured and an inheritable ACL is set. GNS connects a file server to a virtual file namespace. When there is an inheritable ACL set to a parent directory that is the connection source, connecting the file server to the virtual file namespace as it is results in no inheritable ACL being set halfway down the file tree.

Accordingly, no inheritable ACL is set to a child file or a child directory despite the fact that there is an inheritable ACL set to the parent directory. If GNS is run in this state and a user's access right is judged based on the ACL of the parent directory, there is a possibility that a user who should be denied access to the child file is allowed access.

Further, when a file server connected to a file tree is disconnected while GNS is run with an inheritable ACL set to the connection source, the inheritable ACL remains set to file system objects in the file server after the file server is disconnected. If this file server is connected to another GNS tree, the unnecessary inheritable ACL still remains and presents the risk of permitting file access to a user who should be denied access.

This invention has been made in view of the above, and it is therefore an object of this invention to set a correct inheritable ACL before and after a configuration definition is changed in GNS, so whether access to a file should be allowed or denied is judged properly.

SUMMARY

A representative aspect of this invention is as follows. That is, there is provided a computer system which provides a client node with a file system mounted into a virtual namespace, comprising: at least one file server which provides the file system; a root node which mounts the file system provided by the file server into the virtual namespace; and a network which couples the file server and the root node. The root node has an interface coupled to the network, a processor coupled to the interface, and a memory coupled to the processor. The root node is configured to: obtain access information set to a directory above a point in the virtual namespace at which the file system is to be mounted when mounting the file system into the virtual namespace; judge whether the obtained access information is to be inherited; and set, to the file system to be mounted, the obtained access information that is to be inherited.

According to an embodiment of this invention, before and after the configuration definition is changed in GNS, the inheritable ACL can work properly.

BRIEF DESCRIPTION OF THE DRAWINGS

The present invention can be appreciated by the description which follows in conjunction with the following figures, wherein:

FIG. 10 is a diagram showing a configuration of a switch information management table in accordance with the first embodiment of this invention;

FIG. 11 is a diagram showing a configuration of a server information management table in accordance with the first embodiment of this invention;

FIG. 12 is a diagram showing a configuration of a algorithm information management table in accordance with the first embodiment of this invention;

FIG. 13 is a diagram showing a configuration of a connection point management table in accordance with the first embodiment of this invention;

DETAILED DESCRIPTION OF THE PREFERRED EMBODIMENTS

An outline of this invention will be given first.

A computer system according to an embodiment of this invention sets an inheritable ACL when a new file server (file system) is connected to a virtual file namespace in GNS if there is an inheritable ACL set to a tree that is the connection source. Conversely, when disconnecting a file server from the virtual file namespace, the computer system deletes an inheritable ACL set to a tree that is the connection source. A correct inheritable ACL is set by executing those two types of processing in defining the configuration of a GNS.

A computer system according to another embodiment of this invention combines an inheritable ACL with an ACL set to a file when a root node which provides a GNS receives a request to access the file, and uses the combined ACL to judge whether access to the file should be allowed or denied. In this way, a temporary inheritable ACL is created only when access right is judged and a disk resource used to store an inheritable ACL is saved. It also lightens the load of processing for connecting a file server, and a file server can be connected quickly.

A computer system according to still another embodiment of this invention judges whether access to a file is to be allowed or denied based on an inheritable ACL when a root node which provides a GNS receives a request to access the file and, if this judging processing fails to determine whether the access should be allowed or denied, uses an ACL set to the file to judge. This speeds up access judging process in the case where whether access should be allowed or denied can be judged from an inheritable ACL alone.

The embodiments of this invention will be described below in detail with reference to the drawings.

First Embodiment

Figure 1:
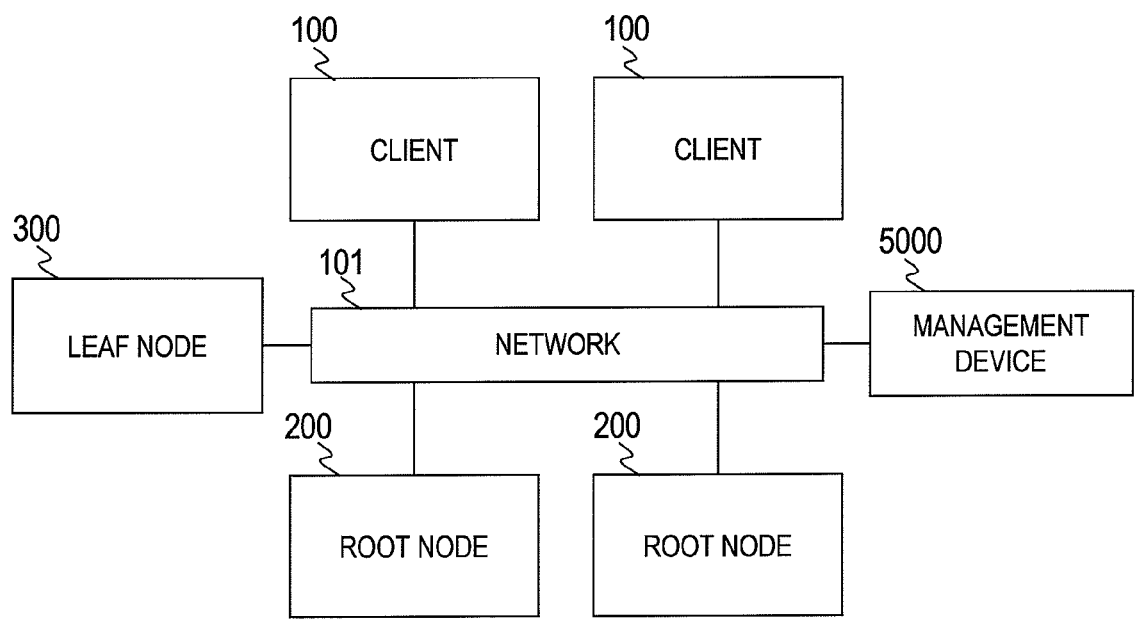
FIG. 1 is a system configuration diagram showing a client-server type computer system in accordance with a first embodiment of this invention.

FIG. 1 is a system configuration diagram of a client-server type computer system (network file system) according to a first embodiment of this invention.

As shown in FIG. 1, the client-server type computer system of the first embodiment of this invention has at least one client computer 100, at least one root node 200, and at least one leaf node 300. The computer system also has a management device 5000.

The computer system may have no leaf node 300 at all. The client 100, the root node 200, the management device 5000, and the leaf node 300 are each a computer connected to a network 101, which is a LAN, the Internet, or the like, and can communicate with one another via the network 101.

The leaf node 300 is a file server which provides a file service to the client 100.

The root node 200 is interposed between the client 100 which uses a file service and the leaf node 300 which provides the file service. The root node 200 is a switch that relays a request from the client 100 to the leaf node 300 and a response from the leaf node 300 to the client 100. The root node 200 is also a file server which provides a file service to the client 100. In short, the root node 200 is equipped with an additional function as a leaf node.

The management device 5000 is an administrative-use terminal node which is operated by a GNS administrator to define the configuration of the GNS. The management device 5000 may be an independent device as shown in FIG. 1. Alternatively, the function of the management device 5000 may be provided by running a management program 5003 in the client 100, the root node 200, or the leaf node 300.

A request from the client 100 to the root node 200 and the leaf node 300 is a message signal that requests the root node 200 and the leaf node 300 to execute some type of processing, and a response from the root node 200 and the leaf node 300 to the client 100 is a message signal that is sent from the root node 200 and the leaf node 300 in response to the request. A request from the management device 5000 to the root node 200 is a message signal that requests for some type of processing.

The root node 200 does not need to be placed literally between the client 100 and the leaf node 300, and it is sufficient if the root node 200 is positioned logically between the two. The root node 200 in FIG. 1 is connected to the same network 101 as the client 100 and the leaf node 300, but logically is interposed between each client 100 and each leaf node 300 to relay communication between the client 100 and the leaf node 300.

Figure 2:
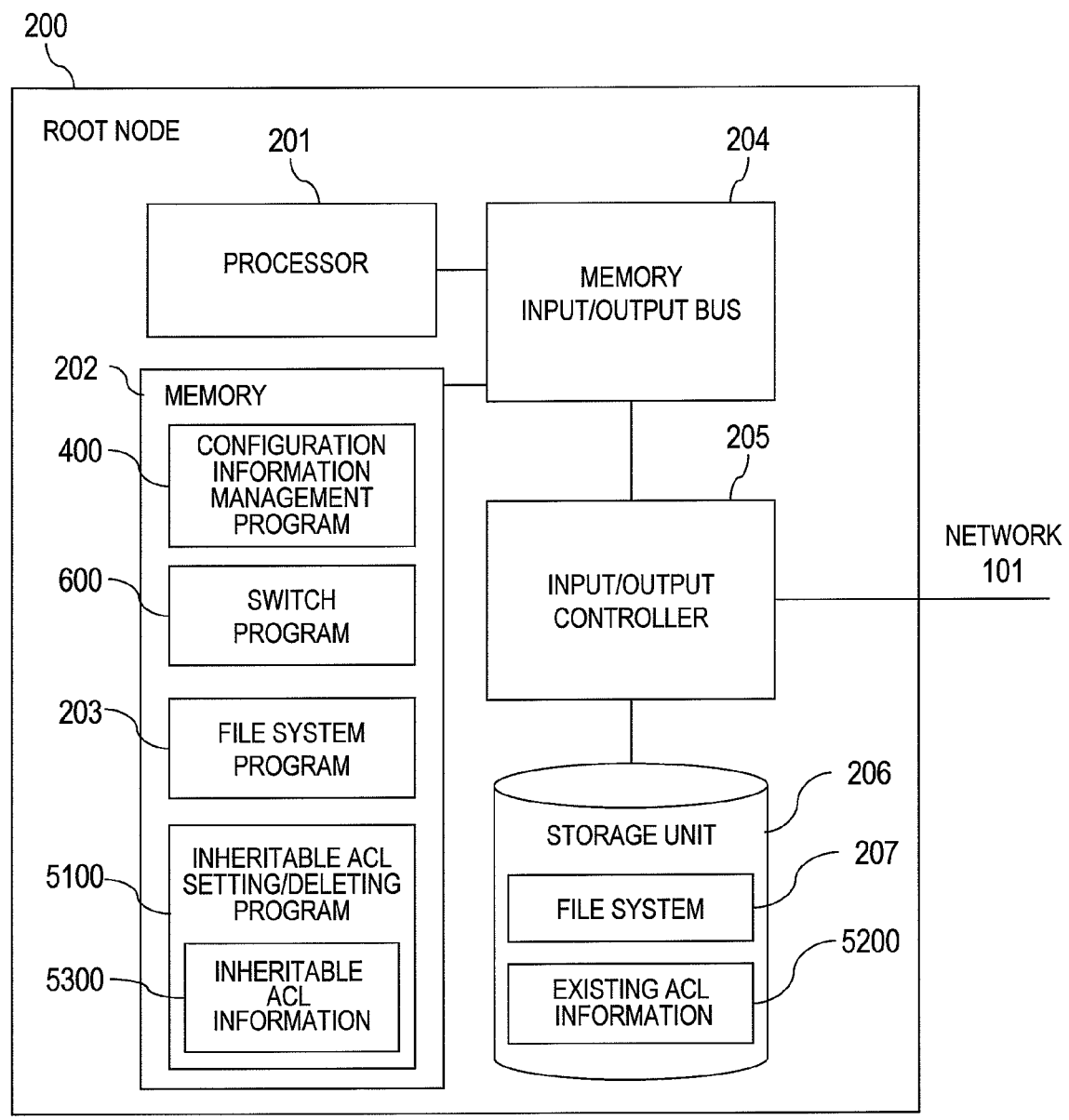
FIG. 2 is a block diagram showing a configuration of a root node in accordance with the first embodiment of this invention.

FIG. 2 is a block diagram showing a configuration of the root node 200 according to the first embodiment of this invention.

As shown in FIG. 2, the root node 200 of the first embodiment of this invention has at least one processor 201, memory 202, memory input/output bus 204, input/output controller 205, and storage unit 206.

The memory 202 stores a configuration information management program 400, a switch program 600, a file system program 203, and an inheritable ACL setting/deleting program 5100. The processor 201 executes those programs stored in the memory 202, thereby implementing the functions of the root node 200.

The inheritable ACL setting/deleting program 5100 contains inheritable ACL information 5300. The inheritable ACL information 5300, which, in FIG. 2, is within the inheritable ACL setting/deleting program 5100, may be separate from the inheritable ACL setting/deleting program 5100.

The memory input/output bus 204 connects the processor 201, the memory 202, and the input/output controller 205 to transfer data between those components. The input/output controller 205 is connected to the client 100, the leaf node 300, and others via the network 101 to exchange input/output data with those computers. The input/output controller 205 is also connected to the storage unit 206 so that data is input and output between the input/output controller 205 and the storage unit 206.

Figure 15:
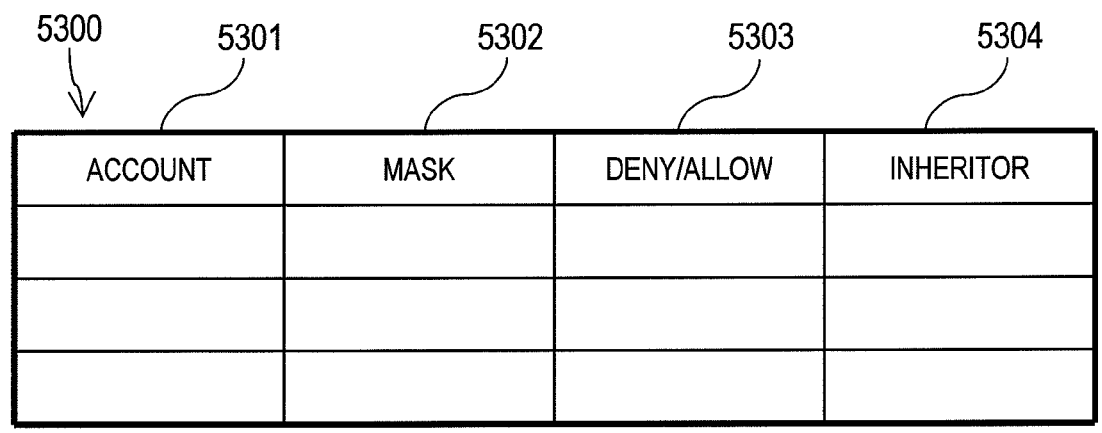
FIG. 15 is a diagram showing a configuration of a inheritable ACL information in accordance with the first embodiment of this invention.

The storage unit 206 stores at least one file system 207 which manages files and other data. The file system 207 is provided by the file system program 203. The storage unit 206 also stores existing ACL information, which is shown in FIG. 15.

Figure 3:
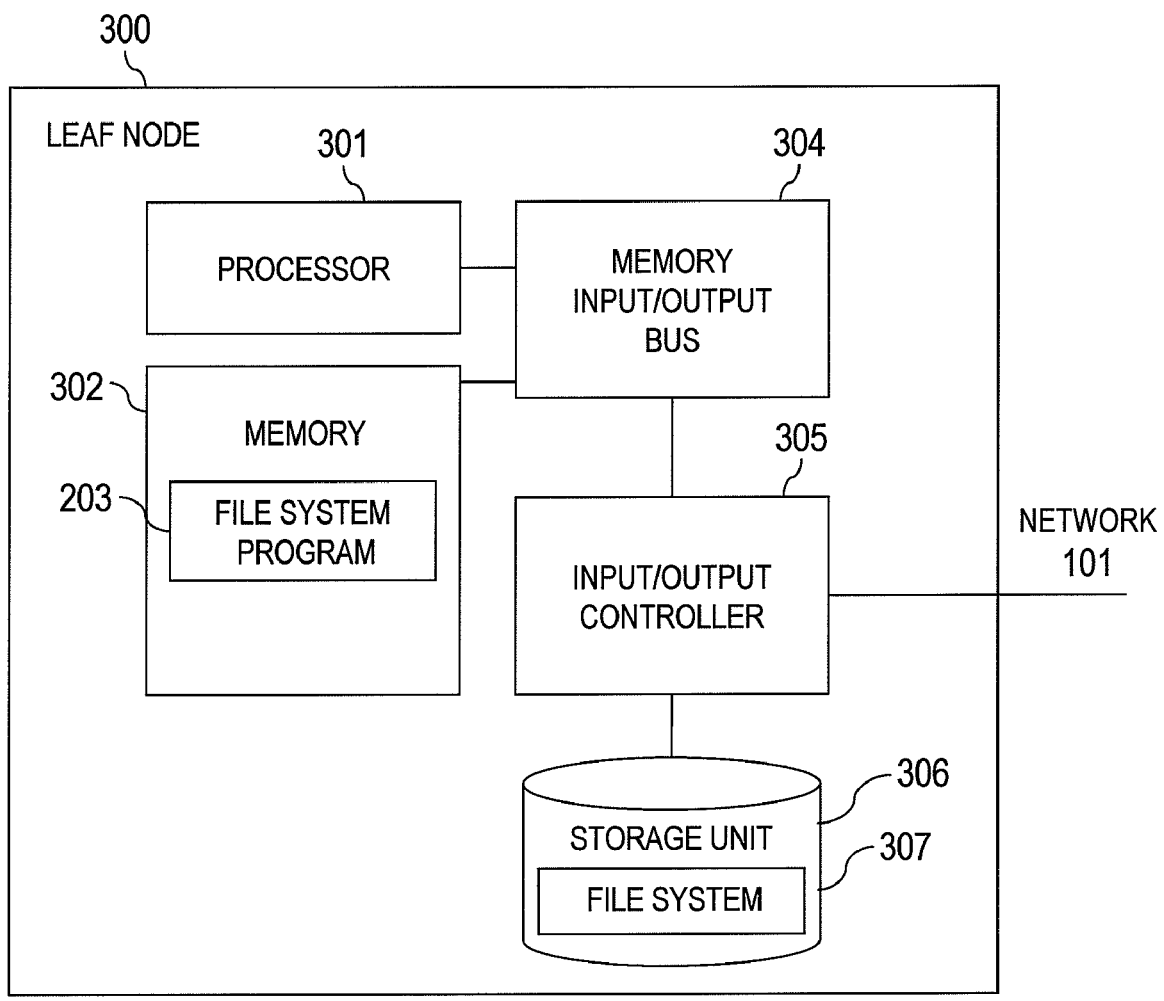
FIG. 3 is a block diagram showing the configuration of a leaf node according to the first embodiment of this invention.

FIG. 3 is a block diagram showing a configuration of the leaf node 300 according to the first embodiment of this invention.

As shown in FIG. 3, the leaf node 300 of the first embodiment of this invention has at least one processor 301, memory 302, memory input/output bus 304, input/output controller 305, and storage unit 306.

The memory 302 stores the file system program 203. Though not shown in FIG. 3, the memory 302 may also store the configuration information management program 400.

The memory input/output bus 304 connects the processor 301, the memory 302, and the input/output controller 305 to transfer data between those components. The input/output controller 305 is connected to the client 100, the root node 200, and others via the network 101 to exchange input/output data with those computers. The input/output controller 305 is also connected to the storage unit 306 so that data is input and output between the input/output controller 305 and the storage unit 306.

The storage unit 306 stores at least one file system 307 which manages files and other data. The file system 307 is provided by the file system program 203.

Figure 4:
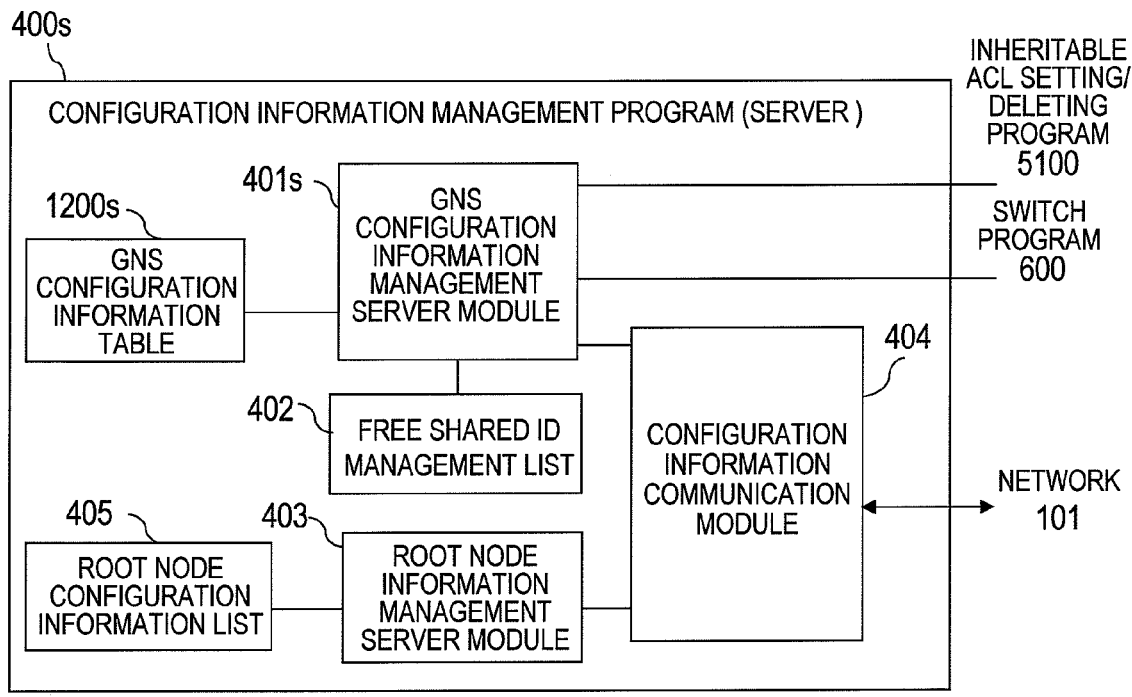
FIG. 4 is a functional block diagram showing a configuration of a configuration information management program (server) in the root node in accordance with the first embodiment of this invention.
Figure 5:
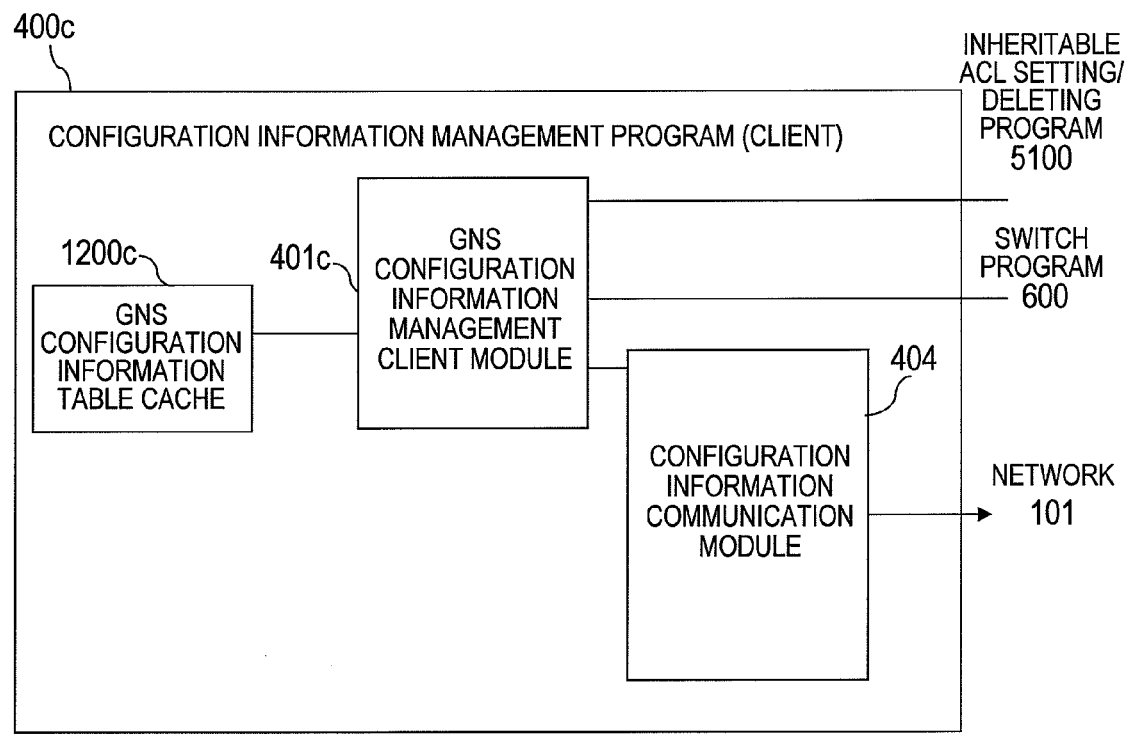
FIG. 5 is a functional block diagram showing a configuration of a configuration information management program (client) in the root node in accordance with the first embodiment of this invention.

FIG. 4 is a functional block diagram showing a configuration of the configuration information management program (server) 400s in the root node 200 according to the first embodiment of this invention, and FIG. 5 is a functional block diagram showing the configuration of the configuration information management program (client) 400c in the root node 200 according to the first embodiment of this invention.

One of a plurality of root nodes 200 is the representative node where the configuration information management program (server) 400s of FIG. 4 is run, whereas the configuration information management program (client) 400c of FIG. 5 is run in the rest of the root nodes 200.

As shown in FIG. 4, the configuration information management program (server) 400s of the first embodiment of this invention has a GNS configuration information management server module 401s, a root node information management server module 403, and a configuration information communication module 404. The root node 200 that runs the configuration information management program (server) 400s stores a free shared ID management list 402, a root node configuration information list 405, and a GNS configuration information table 1200s.

The GNS configuration information management server module 401s mounts a directory structure provided by the file system 207 of the root node 200 to the GNS space, and manages the GNS tree configuration. The free shared ID management list 402 is a list in which available shared IDs are pooled. The GNS configuration information table 1200s is a table holding information about the configuration of the GNS, and will be described later in detail with reference to FIG. 14.

The root node information management server module 403 performs processing through which a plurality of root nodes 200 are processed in a unified manner. The root node configuration information list 405 holds information about the configuration of a plurality of root nodes 200.

The configuration information communication module 404 controls a protocol used in communication with the network 101.

As shown in FIG. 5, the configuration information management program (client) 400c of the first embodiment of this invention has a GNS configuration information management client module 401c and the configuration information communication module 404. The root node 200 that runs the configuration information management program (client) 400c stores a GNS configuration information table cache 1200c.

The GNS configuration information management client module 401c mounts a directory structure provided by the file system 207 of the root node 200 to the GNS space, and manages the GNS tree configuration. The GNS configuration information management client module 401c also synchronizes information stored in the GNS configuration information table cache 1200c with the GNS configuration information table 1200s of the configuration information management program (server) 400s.

The GNS configuration information table cache 1200c stores the same information as the one held in the GNS configuration information table 1200s. In other words, every root node 200 holds the same information in its GNS configuration information table. The configuration information communication module 404 controls a protocol used in communication with the network 101.

Figure 6:
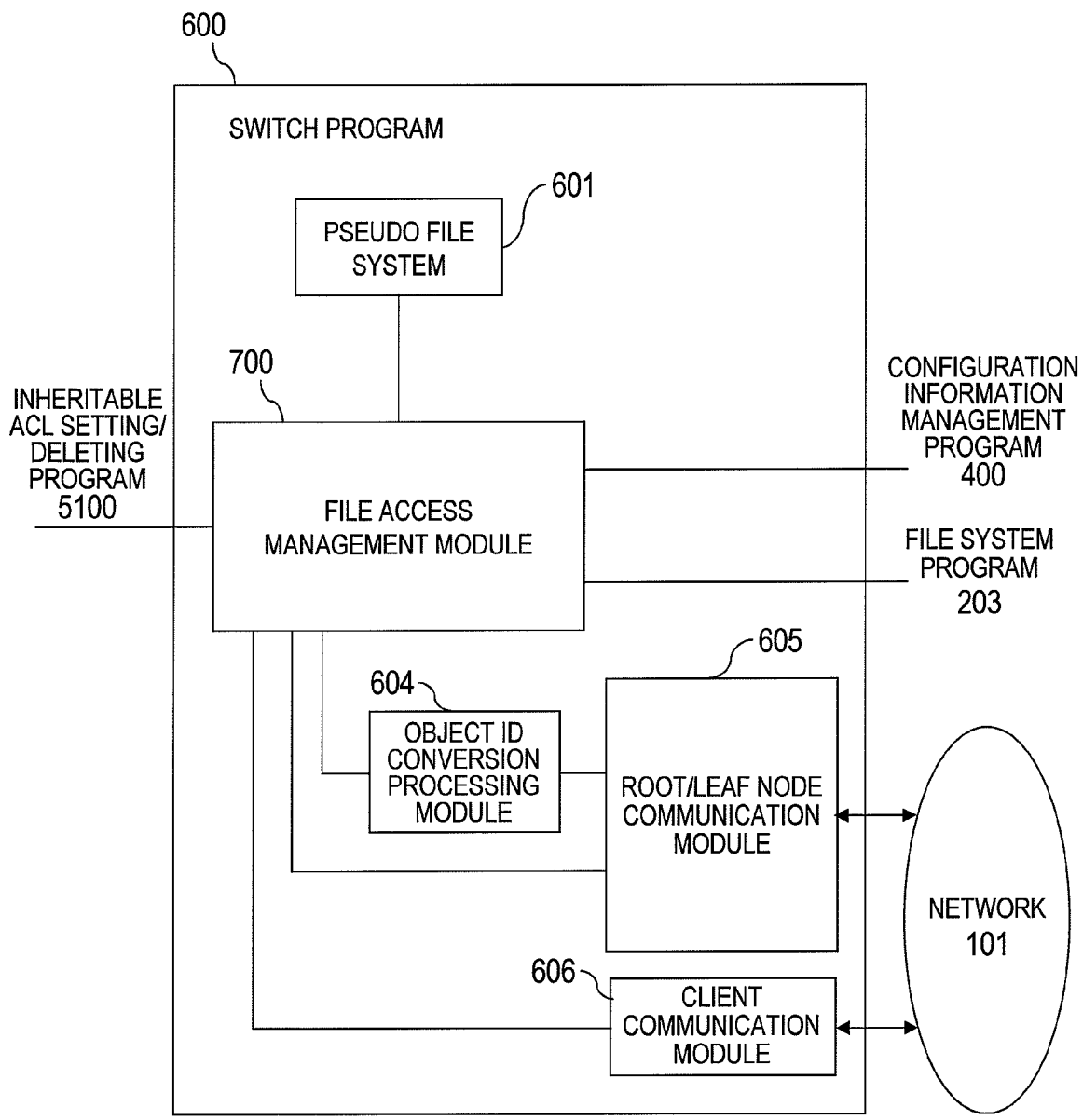
FIG. 6 is a functional block diagram showing a configuration of a switch program in the root node in accordance with the first embodiment of this invention.

FIG. 6 is a functional block diagram showing a configuration of the switch program 600 in the root node 200 according to the first embodiment of this invention.

Figure 7:
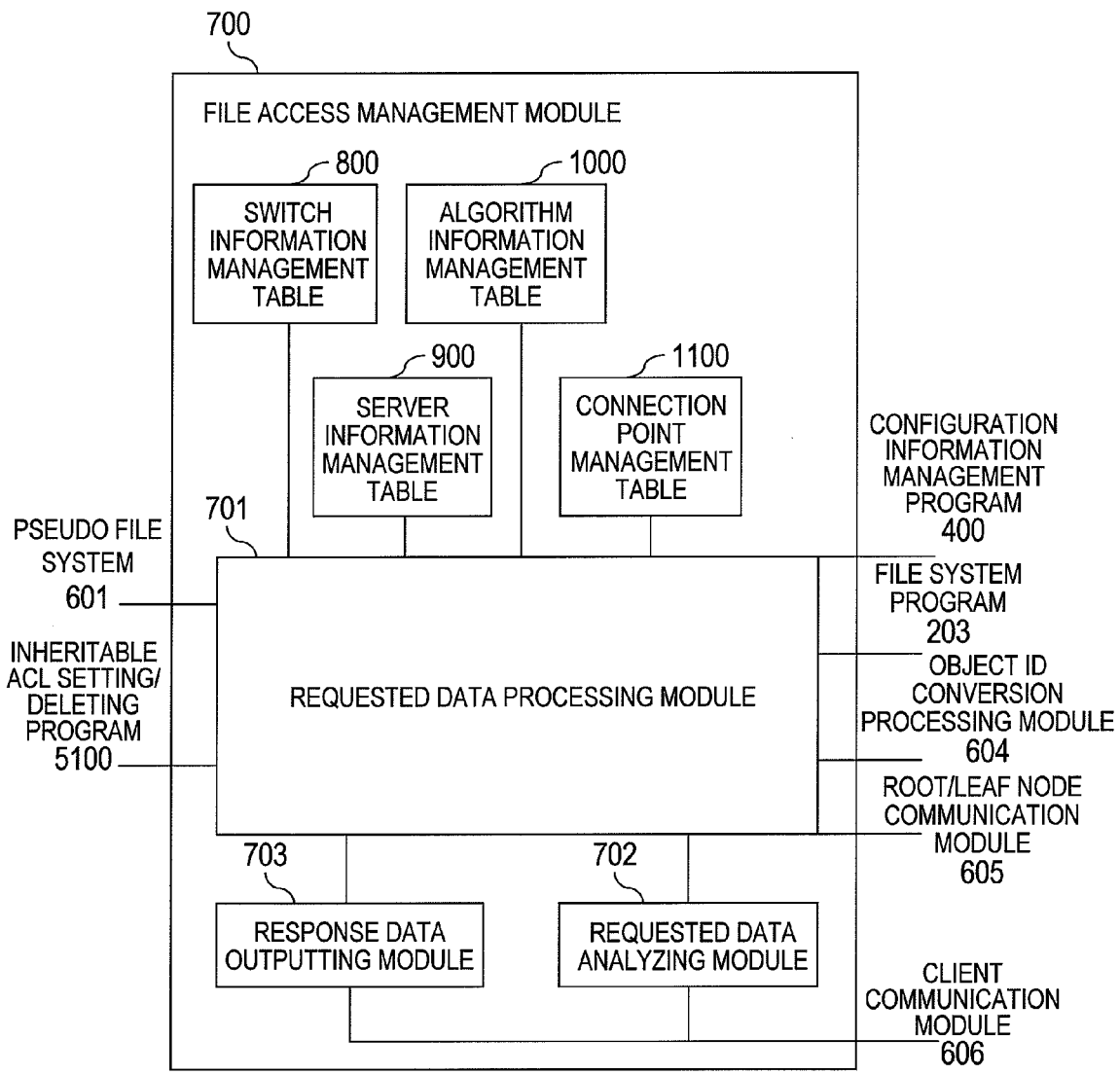
FIG. 7 is a functional block diagram showing a configuration of a file access management module according to the first embodiment of this invention.

As shown in FIG. 6, the switch program 600 of the first embodiment of this invention has a client communication module 606, a root/leaf node communication module 605, a file access management module 700, which is shown in FIG. 7, an object ID conversion processing module 604, and a pseudo file system 601.

The client communication module 606 receives a request from the client 100 and outputs the received request to the file access management module 700. The client communication module 606 sends data output from the file access management module 700 to the client 100 as a response to the request.

The root/leaf node communication module 605 sends, as a request to the root node 200 or the leaf node 300, data output from the file access management module 700 and data output from the object ID conversion processing module 604. The root/leaf node communication module 605 receives a response to the request from the root node 200 or the leaf node 300, and outputs the response to the file access management module 700 or the object ID conversion processing module 604.

The file access management module 700 analyzes data output from the client communication module 606 to determine how to process a request from the client 100, and outputs the determined processing method to the root/leaf node communication module 605 or the object ID conversion processing module 604. In the case where a request from the client 100 is directed to the file system 207 (local file system) placed in its own root node 200, the file access management module 700 uses the file system program 203 to obtain data stored in the storage unit 206, and outputs the obtained data to the client communication module 606. The file access management module 700 also receives from the inheritable ACL setting/deleting program 5100 requests to set and delete ACLs of file system objects managed by the root node 200 and the leaf node 300. An ACL setting or deleting request is sent from the file access management module 700 through the root/leaf node communication module 605 to the root node 200 or the leaf node 300 that manages the target file system object.

The object ID conversion processing module 604 converts an object ID that is contained in a request message received from the client 100 into a format recognizable to the leaf node 300. The object ID conversion processing module 604 also converts an object ID that is contained in a response message received from the leaf node 300 into a format recognizable to the client 100.

An object ID is an identifier assigned to a file that is managed by a file system. For example, an object ID in NFS is a file handle.

The pseudo file system 601 is a virtual file system created by mapping the file system 207 of the root node 200 and of the leaf node 300 to a directory under the root directory of the pseudo file system 601.

FIG. 7 is a functional block diagram showing a configuration of the file access management module 700 according to the first embodiment of this invention.

As shown in FIG. 7, the file access management module 700 has a requested data processing module 701, a requested data analyzing module 702, and a response data outputting module 703. The root node 200 where the file access management module 700 is run has a switch information management table 800 shown in FIG. 10, a server information management table 900 shown in FIG. 11, an algorithm information management table 1000 shown in FIG. 12, and a connection point management table 1100 shown in FIG. 13.

The switch information management table 800, the server information management table 900, the algorithm information management table 1000, and the connection point management table 1100, which, in FIG. 7, are within the file access management module 700, may be separate from the file access management module 700.

The requested data analyzing module 702 analyzes requested data that the client communication module 606 outputs, and obtains the object ID of a file that is associated with the requested data. The requested data analyzing module 702 also obtains a shared ID from the obtained object ID.

The requested data processing module 701 uses a shared ID obtained by the requested data analyzing module 702 as a key in referring to the switch information management table 800, the server information management table 900, the algorithm information management table 1000, and the connection point management table 1100, and processes requested data.

The response data outputting module 703 converts data output from the requested data processing module 701 into a format recognizable to the client 100, and outputs the converted data to the client communication module 606.

Figure 8:
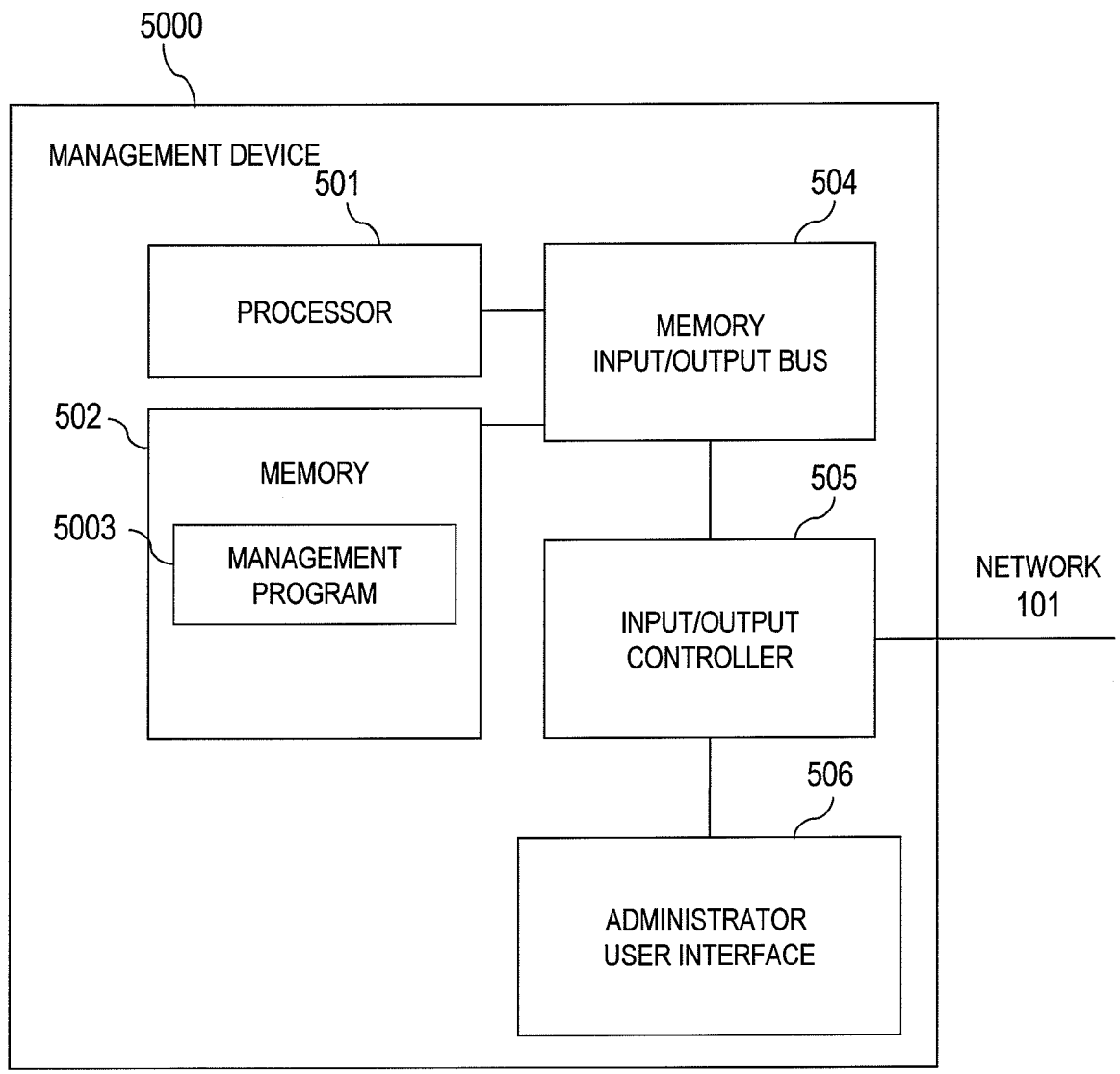
FIG. 8 is a block diagram showing a configuration of a management device in accordance with the first embodiment of this invention.

FIG. 8 is a block diagram showing a configuration of a management device 5000 according to the first embodiment of this invention.

As shown in FIG. 8, the management device 5000 has at least one processor 501, memory 502, memory input/output bus 504, input/output controller 505, and administrator user interface 506.

The memory 502 stores a management program 5003. The processor 501 executes those programs stored in the memory 502, thereby implementing the functions of the management device 5000.

The memory input/output bus 504 connects the processor 501, the memory 502, and the input/output controller 505 to transfer data between those components. The input/output controller 505 is connected to the client 100, the root node 200, and the leaf node 300 via the network 101 to exchange input/output data with those computers.

The management program 5003 may be placed in another component (e.g., the root node 200) of the computer system. Then this component operates as the management device 5000.

Figure 9:
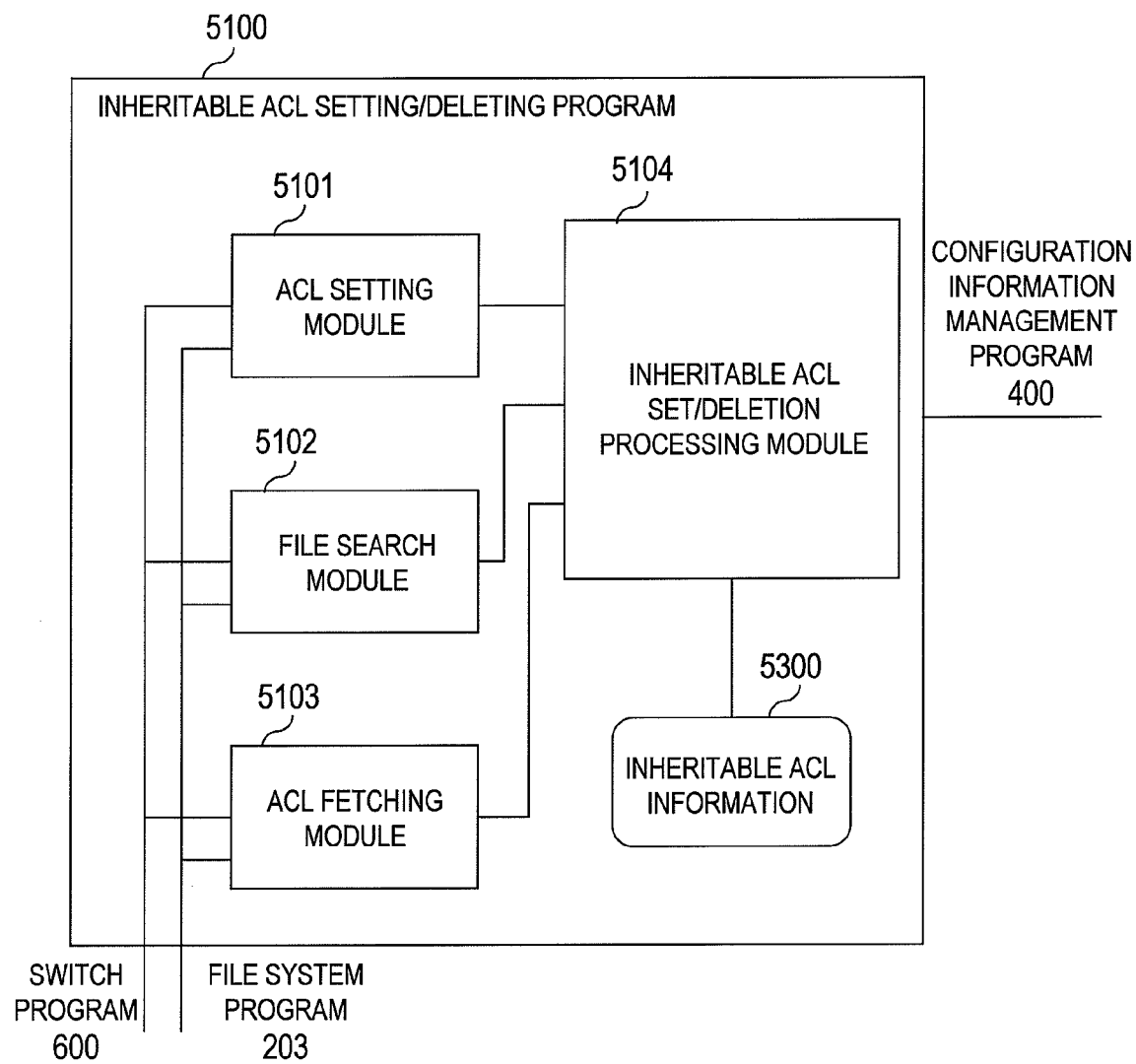
FIG. 9 is a functional block diagram showing a configuration of a inheritable ACL setting/deleting program in accordance with the first embodiment of this invention.

FIG. 9 is a functional block diagram showing the configuration of the inheritable ACL setting/deleting program 5100 according to the first embodiment of this invention.

As shown in FIG. 9, the inheritable ACL setting/deleting program 5100 has an ACL setting module 5101, a file search module 5102, an ACL fetching module 5103, an inheritable ACL setting/deleting processing module 5104, and the inheritable ACL information 5300. The inheritable ACL information 5300, which, in FIG. 9, is within the inheritable ACL setting/deleting program 5100, may be separate from the inheritable ACL setting/deleting program 5100.

The ACL setting module 5101 sends an inheritable ACL setting/deleting request to the file system program 203 or the switch program 600. The file search module 5102 searches for a file to which an inheritable ACL is to be set, or from which an inheritable ACL is to be deleted, in configuring a virtual namespace.

The ACL fetching module 5103 obtains an ACL set to a file system object. The ACL fetching module 5103 also sends a request to obtain an ACL to the switch program 600 or the file system program 203.

The inheritable ACL setting/deleting processing module 5104 receives a request to change the configuration of the virtual namespace from the configuration information management program 400 when the configuration of the virtual namespace is changed, and sets or deletes an inheritable ACL. The inheritable ACL information 5300 holds inheritable ACL information set to a file system object. In this embodiment, inheritable ACL information is kept in a table format.

FIG. 10 is a diagram showing a configuration of the switch information management table 800 according to the first embodiment of this invention.

The switch information management table 800 is a table holding entries each of which is composed of a set of a shared ID 801, a server ID 802, and an algorithm information ID 803.

The shared ID 801 indicates an identifier for identifying a file service export unit, and is assigned uniquely to each sharing group. The server ID 802 indicates an identifier for identifying a server. The algorithm information ID 803 indicates an identifier for identifying an algorithm that converts an object ID.

IDs for identifying server information and algorithm information can be obtained by referring to the switch information management table 800. The switch information management table 800 can hold a plurality of entries for one same shared ID.

One shared ID, server ID, and algorithm information ID are recorded in each entry of the switch information management table 800. Alternatively, one shared ID and two or more sets of server IDs and algorithm information IDs may be recorded in one entry. It is also possible to store one or more sets of server IDs and algorithm information IDs in a list format, with each set associated with a shared ID.

FIG. 11 is a diagram showing a configuration of the server information management table 900 according to the first embodiment of this invention.

The server information management table 900 is a table holding entries each of which is composed of a set of a server ID 901 and server information 902. The server information 902 is, for example, an IP address or a socket structure. Where a request from the client 100 is processed can be identified by referring to the switch information management table 800 and the server information management table 900.

FIG. 12 is a diagram showing the configuration of the algorithm information management table 1000 according to the first embodiment of this invention.

The algorithm information management table 1000 is a table holding entries each of which is composed of a set of an algorithm information ID 1001 and algorithm information 1002. The algorithm information 1002 is information necessary in converting an object ID and contains, for example, an object ID conversion rule and a pointer that indicates the storage location of the object ID conversion rule.

An object ID conversion method can be identified by referring to the switch information management table 800 and the algorithm information management table 1000.

The switch information management table 800, the server information management table 900, and the algorithm information management table 1000 in the first embodiment of this invention are separate tables. Alternatively, the switch information management table 800 may contain the server information 902 and the algorithm information 1002.

FIG. 13 is a diagram showing the configuration of the connection point management table 1100 according to the first embodiment of this invention.

The connection point management table 1100 is a table holding entries each of which is composed of a set of a connection source object ID 1101, a connection destination shared ID 1102, and a connection destination object ID 1103.

By referring to the connection point management table 1100, the root node 200 can virtualize a namespace in a manner that enables the client 100 to access a file through no more procedure than the one for accessing a single sharing group even when access to the file involves crossing over from one sharing group to another.

The connection source object ID 1101 and the connection destination object ID 1103 which are stored in the connection point management table 1100 may be those exchanged between the client 100 and the root node 200. Alternatively, the connection source object ID 1101 and the connection destination object ID 1103 may be other identifiers as long as they can be used to identify the connection source and destination objects.

Figure 14:
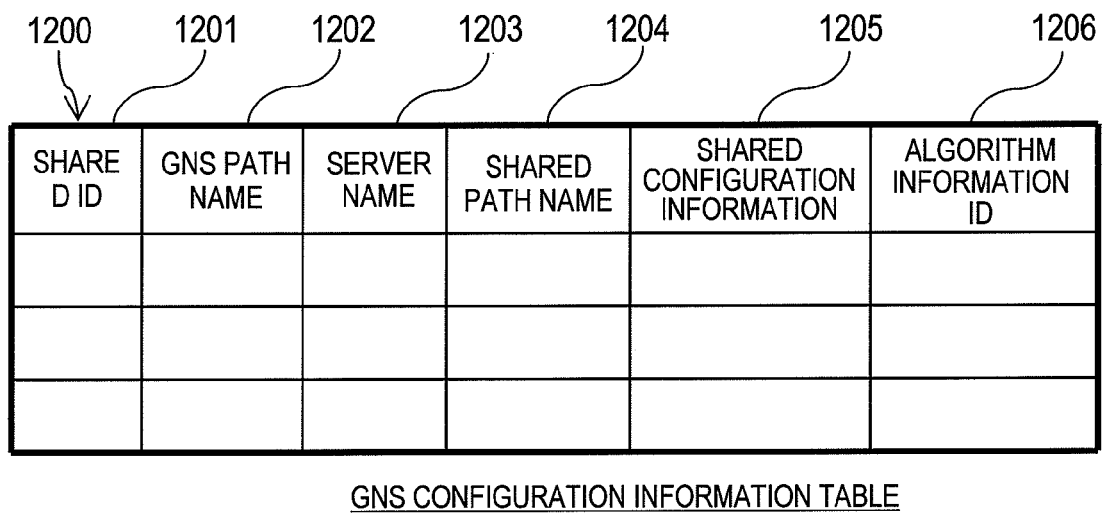
FIG. 14 is a diagram showing the configuration of the GNS configuration information table 1200s according to the first embodiment of this invention.

FIG. 14 is a diagram showing the configuration of the GNS configuration information table 1200s according to the first embodiment of this invention.

The GNS configuration information table 1200s is a table holding entries each of which is composed of a set of a shared ID 1201, a GNS path name 1202, a server name 1203, a shared path name 1204, shared configuration information 1205, and an algorithm information ID 1206.

The shared ID 1201 indicates an ID for identifying a file service export unit. The GNS path name 1202 indicates a path that integrates constituents of a sharing group identified by the shared ID 1201 into a single namespace. The server name 1203 indicates the name of a server that holds a sharing group identified by the shared ID 1201. The shared path name 1204 indicates the path name on a server of a sharing group identified by the shared ID 1201.

The shared configuration information 1205 indicates information that is set to the top directory of a sharing group identified by the shared ID 1201, specifically, information indicative of the read-only property, information about limiting of hosts that are allowed access, and the like. The algorithm information ID 1206 indicates the identifier of an object ID conversion method of a sharing group that is identified by the shared ID 1201.

The GNS configuration information table 1200s may hold a plurality of entries for one shared ID.

As mentioned above, the GNS configuration information table cache 1200c has the same configuration and stores the same information as the GNS configuration information table 1200s.

Described next is an access control list (ACL). An ACL is information in a table format as is the inheritable ACL information 5300 and the existing ACL information 5200, which are variations of ACL. One entry constituting an ACL is an access control entry (ACE).

FIG. 15 is a diagram showing a configuration of the inheritable ACL information 5300 according to the first embodiment of this invention.

The inheritable ACL information 5300 is a table holding entries each of which is composed of a set of an account 5301, a mask 5302, a deny/allow flag 5303, and an inheritor 5304.

Recorded as the account 5301 is an account that is the subject of access control in the entry in question. An account is, for example, a user identifier.

The mask 5302 is a flag that indicates what operation is the subject of access control. For example, "reading operation" or "writing operation" is registered as the mask 5302.

The deny/allow flag 5303 is a flag that indicates whether the entry in question is about permission or denial.

The inheritor 5304 is a flag that indicates the type of a file system object by which the entry in question is to be inherited. For example, a flag indicating a file is set as the inheritor 5304 when the entry is to be inherited only by files. A value "0" is set as the inheritor 5304 when no file system object is to inherit the entry.

The configuration of the existing ACL information 5200 will be described next. The existing ACL information 5200 holds entries each of which is composed of the same fields as the inheritable ACL information 5300 shown in FIG. 15. The fields in the existing ACL information 5200 and the inheritable ACL information 5300 indicate the same things.

Figure 16A:
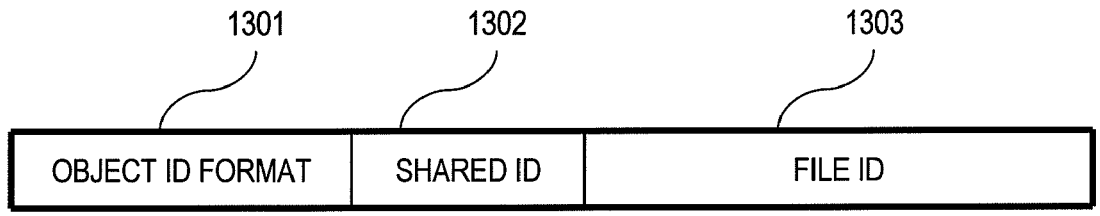
FIG. 16A is a diagram showing a format of the object ID transferred between the node in accordance with the first embodiment of this invention.
Figure 16B:
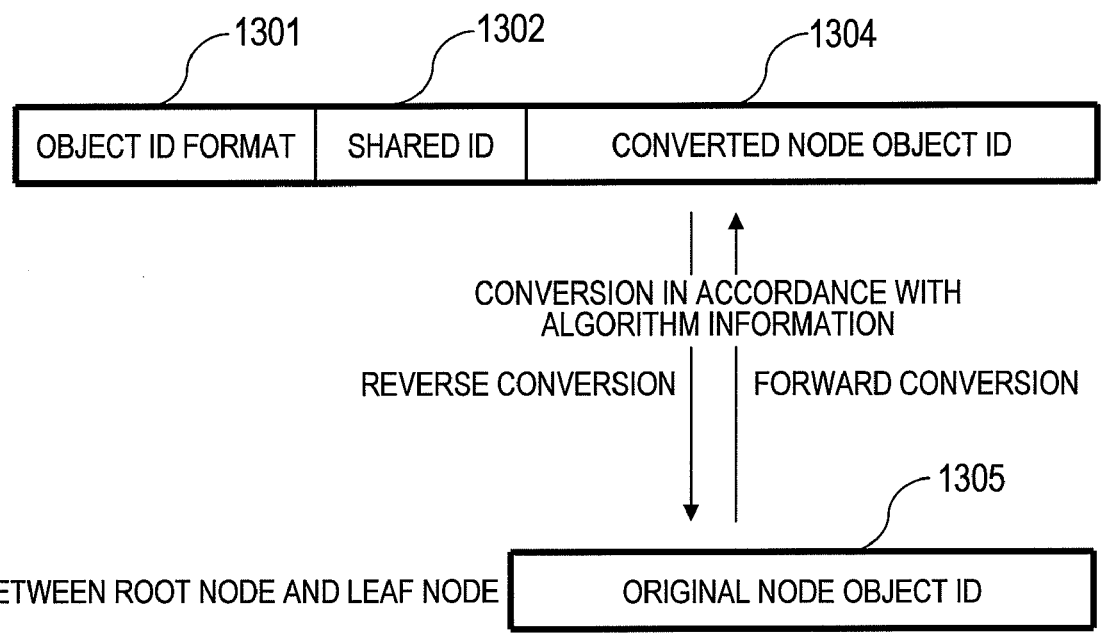
FIG. 16B is a diagram showing a format of the object ID transferred between the node in accordance with the first embodiment of this invention.

FIGS. 16A and 16B are diagrams showing the formats of object IDs that are exchanged between the client 100, the root node 200, and the leaf node 300 according to the first embodiment of this invention.

There are different formats for object IDs exchanged between the client 100 and the root node 200, because some nodes can create an object ID in a shared ID format whereas other nodes cannot.

Nodes that can create an object ID in the shared ID format are all root nodes 200 and some of the leaf nodes 300. The format of object IDs exchanged between the client 100 and any root node 200, between two root nodes 200, and between any root node 200 and any one of those leaf nodes 300 is invariable (not converted).

The object ID format of a node that can create an object ID in the shared ID format contains, as shown in FIG. 16A, an object ID format 1301, a shared ID 1302, and a file ID 1303.

The object ID format 1301 indicates the format of an object ID, and a value indicating the shared ID format is recorded in the field for the object ID format 1301. A shared ID for identifying a sharing group (in some cases, there are a plurality of sharing groups) is recorded in the field for the shared ID 1302. An ID used to identify an object by a node that holds the object is recorded in the field for the file ID 1303.

Nodes that cannot create an object ID in the shared ID format are some of the leaf nodes 300. For example, the leaf node 300 (file system 307) that is different in bit count of an object ID cannot create an object ID in the shared ID format.

In this case, the format of object IDs exchanged between the client 100 and any root node 200 differs from the format of object IDs exchanged between any root node 200 and any one of those leaf nodes 300. The format of object IDs exchanged between the client 100 and any root node 200 contains, as shown in FIG. 16B, a field for the object ID format 1301, a field for the shared ID 1302, and a field for a converted node object ID 1304. The fields for the object ID format 1301 and the shared ID 1302 are as described above with reference to FIG. 16A.

Recorded in the field for the converted node object ID 1304 is a value obtained by converting an original node object ID 1305, which is an object ID exchanged between the root node 200 and the leaf node 300. When the object ID format is variable and long enough, the original node object ID 1305 may be recorded as it is. A conversion from an object ID exchanged between the root node 200 and the leaf node 300 to an object ID exchanged between the client 100 and the root node 200 is called forward conversion, whereas a conversion from an object ID exchanged between the client 100 and the root node 200 to an object ID exchanged between the root node 200 and the leaf node 300 is called reverse conversion. The conversions follow rules identified by algorithm information.

The description given next is about how the root node 200 operates according to the first embodiment of this invention. The root node 200 of the first embodiment of this invention provides the clients 100 with a file sharing service in which a plurality of sharing groups are virtualized as a single sharing group. Processing described below is executed by the processor 201 by running the programs that the memory 202 stores.

Figure 17:
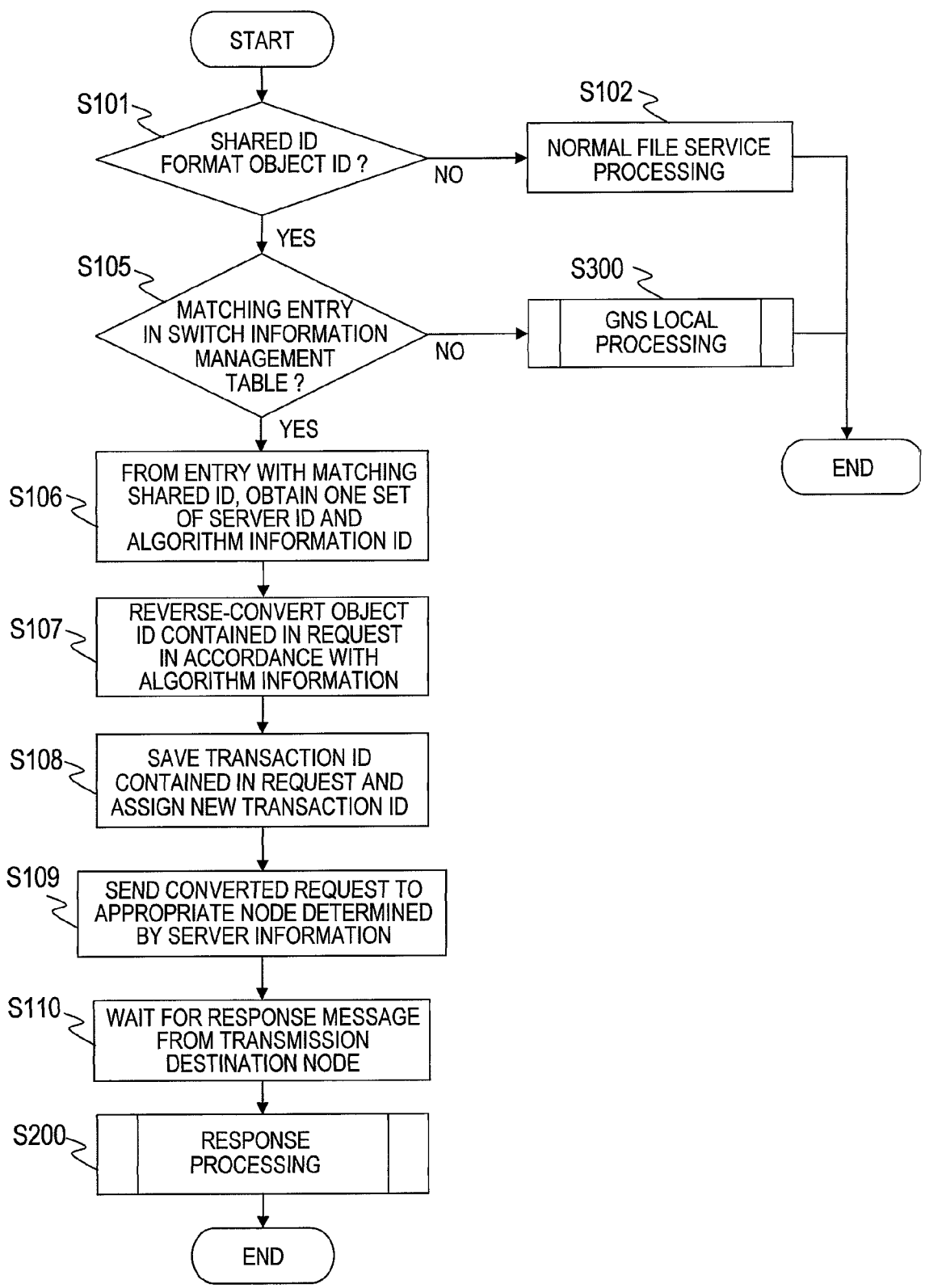
FIG. 17 is a flow chart showing a processing for virtualizing namespaces of sharing groups in accordance with the first embodiment of this invention.

FIG. 17 is a flow chart showing processing that is executed by the root node 200 to virtualize namespaces of sharing groups according to the first embodiment of this invention.

The client communication module 606 receives a file access request from one of the clients 100. The file access request is, for example, a remote procedure call (RPC) of the NFS protocol. The file access management module 700 extracts an object ID from the received request. Whether or not the extracted object ID has the shared ID format is then judged (S101).

When the object ID extracted from the received request does not have the shared ID format, conventional file service processing is executed (S102) and the processing of FIG. 17 is ended.

When the object ID extracted from the received request has the shared ID format, the root node 200 judges whether or not the switch information management table 800 has an entry that has the same shared ID as that of the object ID extracted from the received request. As mentioned above, the switch information management table 800 may have more than one entry that meets the condition (entry that holds the same shared ID).

When the switch information management table 800 has no entry that meets the condition ("NO" in S105), it is judged that the request should be processed by the root node 200 that has received the request, and GNS local processing is executed (S300). The GNS local processing (S300) will be described later with reference to FIG. 19.

On the other hand, when the switch information management table 800 has an entry that meets the condition ("YES" in S105), it is judged that the request should be processed by other root nodes 200 than the one that has received the request, and a set of server ID and algorithm information ID is obtained from the entry that holds the matching shared ID (S106). In the case where a plurality of entries meet the conditions, the information sets may be obtained by round robin, or an information set that contains the name of a server whose response time measured in advance is quick may be obtained.

Algorithm information that is identified by the algorithm information ID of the obtained set is obtained from the algorithm information management table 1000. The object ID contained in the request is reverse-converted in accordance with the obtained algorithm information (S107). As shown in FIG. 12, there are different types of algorithm such as an algorithm that involves no conversion, an algorithm that only involves deleting values from the fields for the object ID format 1301 and the shared ID 1302, and an algorithm that involves deleting values from the fields for the object ID format 1301 and the shared ID 1302 and then restoring an original node object ID from information in the field for the converted node object ID 1304 or other information.

Next, in the case where the request contains a transaction ID when the employed protocol manages transactions on a file access request level, the transaction ID is saved and another transaction ID is assigned for the transaction with a node to which the request is to be transferred (S108). In this case, the transfer destination node is identified by obtaining the server information 902 from an entry of the server information management table 900 that holds the same server ID as the one contained in the obtained set.

The converted file access request is sent to the node identified from the server information 902 (S109), and a response message from the node to which the converted file access request has been sent is waited for (S110).

After a response message is received from the node to which the converted file access request has been sent, response processing is executed (S200) and the processing of FIG. 17 is ended. The response processing (S200) will be described later with reference to FIG. 18.

Figure 18:
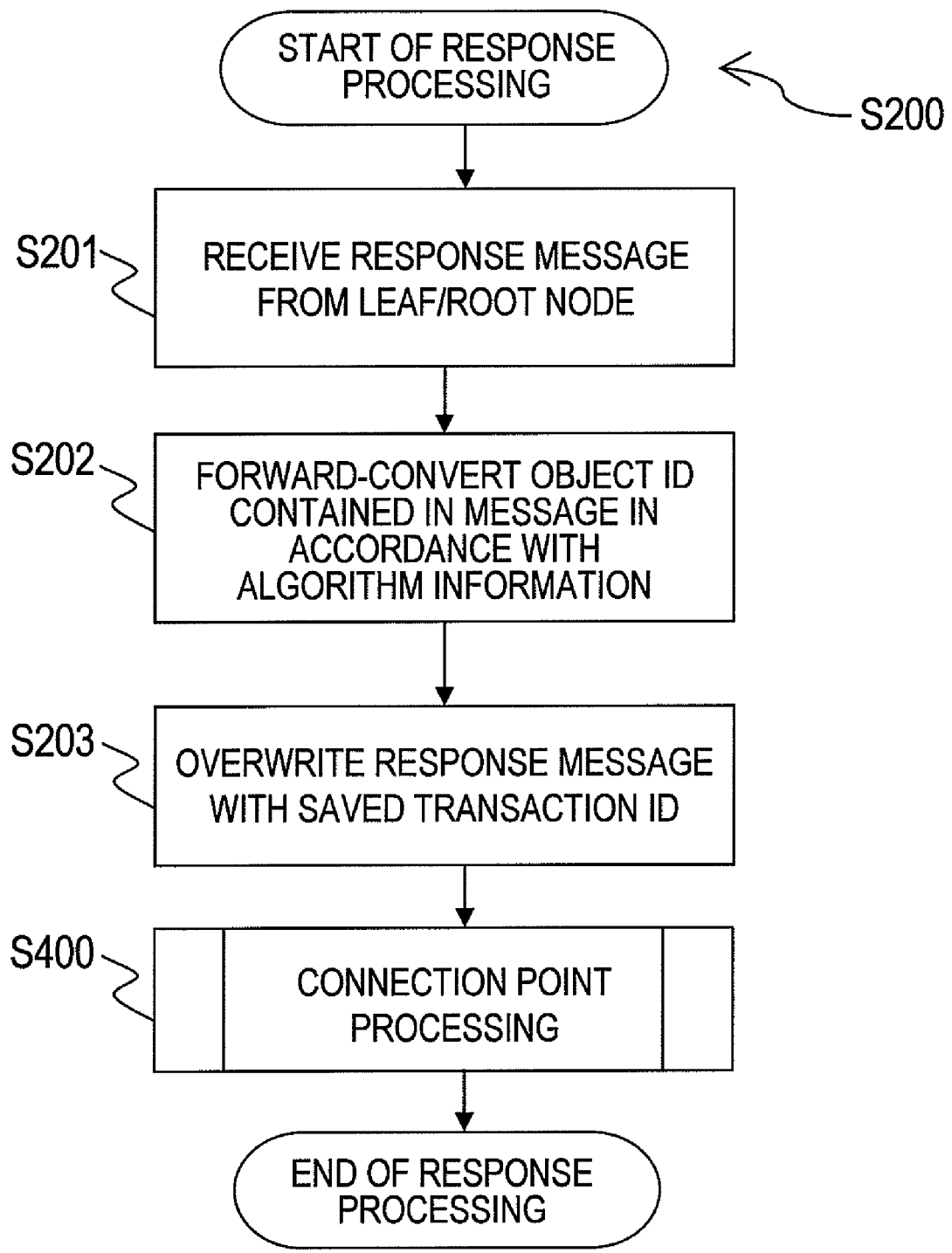
FIG. 18 is a flow chart showing a response processing in accordance with the first embodiment of this invention.

FIG. 18 is a flow chart showing the response processing (S200) which is executed by the root node 200 when the root node 200 receives a response message from another node according to the first embodiment of this invention.

The root node 200 receives a response message from one of the leaf nodes 300 or from another root node 200 (S201).

In the case where the response message contains an object ID, the object ID contained in the message is forward-converted in accordance with the algorithm information used in S107 (S202).

In the case where the response message contains a transaction ID when the employed protocol manages transactions on a file access request level, the response message is overwritten with the transaction ID saved in S108 (S203).

Connection point processing, which is special processing performed when access involves crossing over from one sharing group to another, is then executed (S400), and the response processing is ended. The connection point processing (S400) will be described later with reference to FIG. 20.

Figure 19:
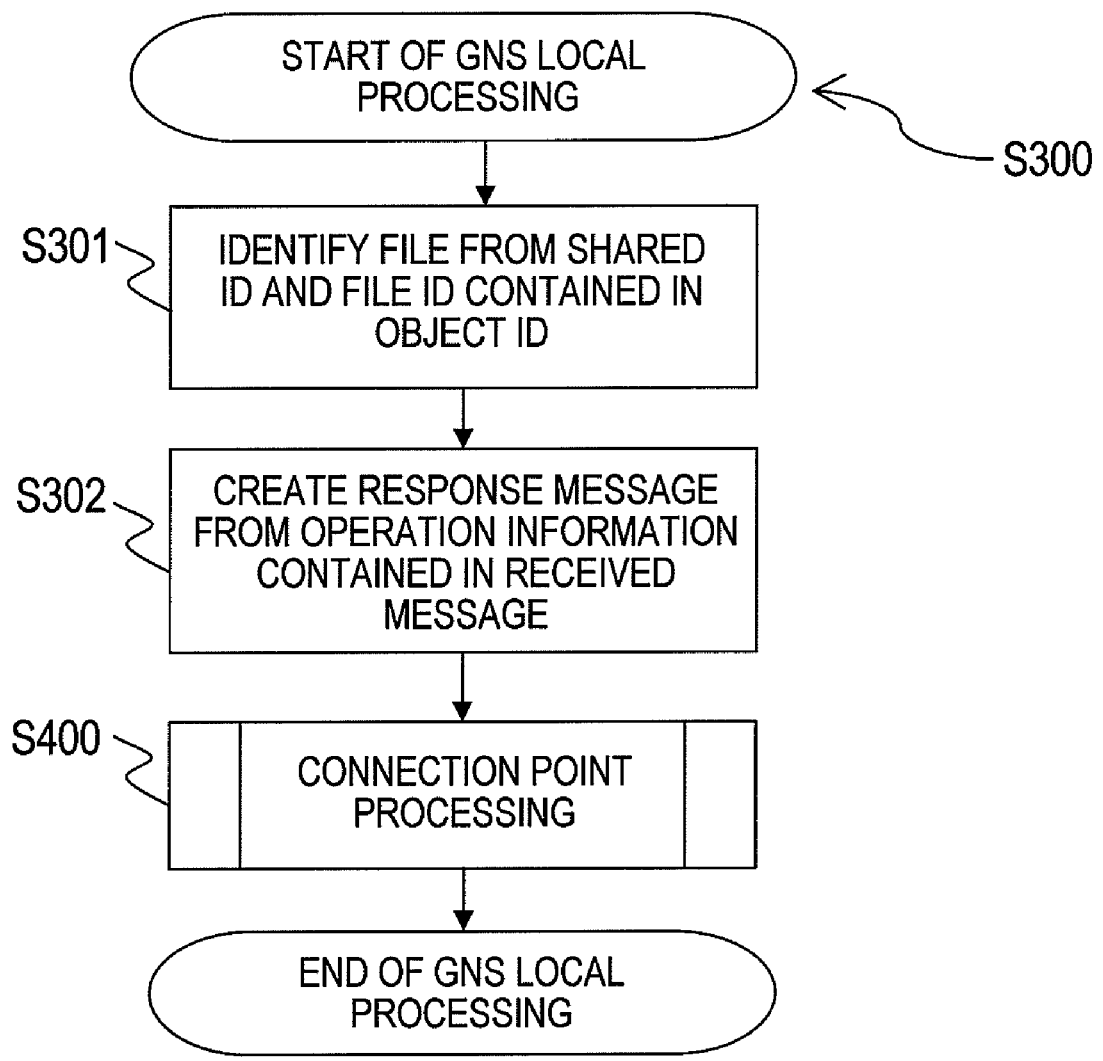
FIG. 19 is a flow chart showing a GNS local processing in accordance with the first embodiment of this invention.

FIG. 19 is a flow chart showing the GNS local processing (S300) which is executed when it is judged that a file access request should be processed by the root node 200 that has received the file access request according to the first embodiment of this invention.

First, the requested file is identified from a shared ID and a file ID that are contained in the request's object ID (S301).

Next, a response message is created from operation information contained in the received request (S302). In the case where processing requested by the received request makes it necessary to include an object ID in the response message, the object ID is given the same shared ID format as the format of the received object ID.

Connection point processing, which is special processing performed when access involves crossing over from one sharing group to another, is then executed (S400), and the GNS local processing is ended. The connection point processing (S400) will be described later with reference to FIG. 20.

Figure 20:
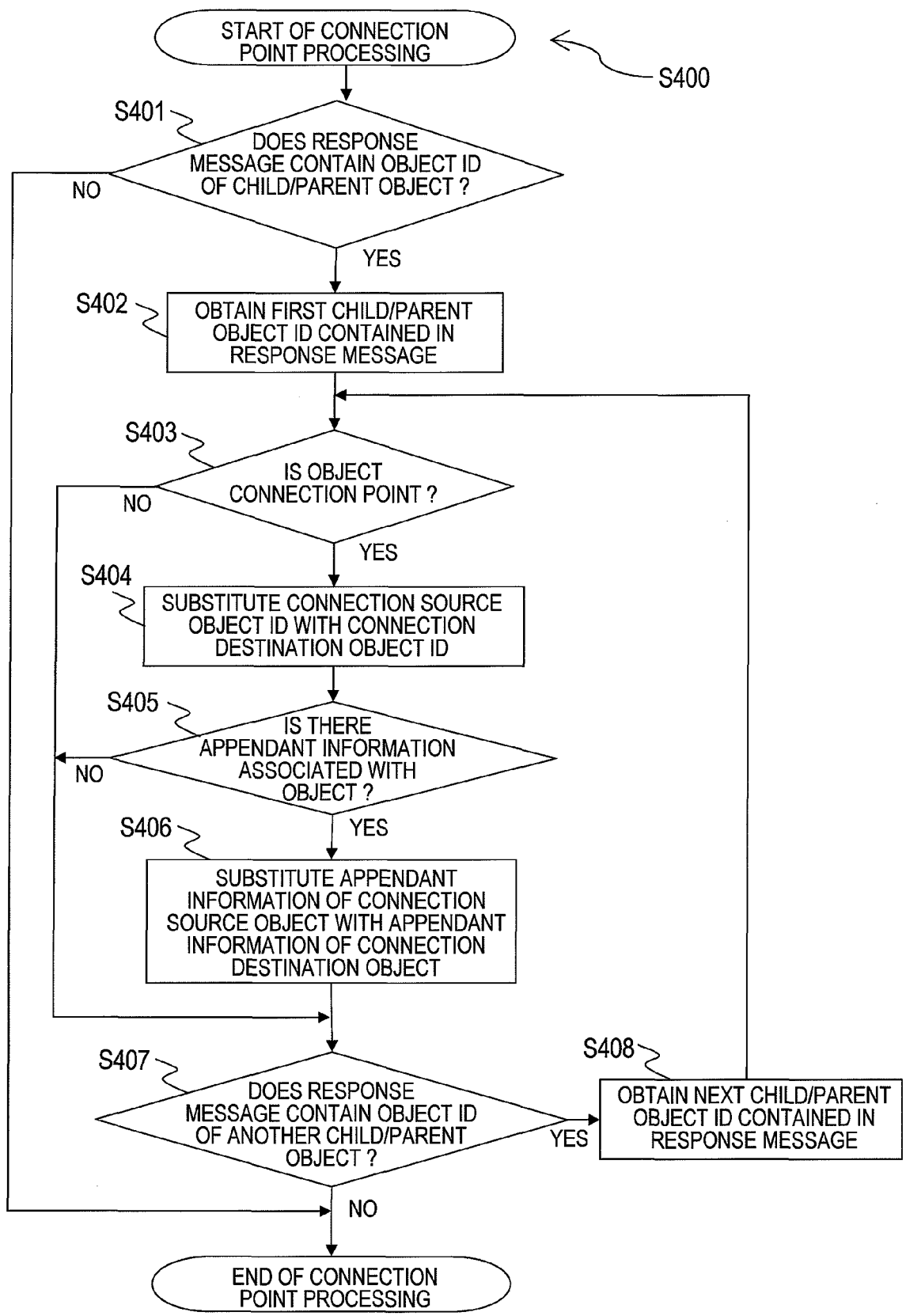
FIG. 20 is a flow chart showing a connection point processing in accordance with the first embodiment of this invention.

FIG. 20 is a flow chart showing the connection point processing (S400), which is special processing performed when access involves crossing over from one sharing group to another according to the first embodiment of this invention.

First, the program judges whether or not the response message contains the object ID of a child object or parent object with respect to the object specified by the file access request (S401). In NFS, for example, a response message of the LOOKUP procedure, a response message of the READ DIR procedure, and a response message of the READ DIR PLUS procedure contain such an object ID. In the case where the response message does not contain such an object ID, the connection point processing is ended.

When the response message contains the object ID of a child object or parent object, the object ID of the first child object or parent object in the response message is obtained (S402).

Whether or not the object identified by the obtained object ID is a connection point is judged by referring to the connection point management table 1100 (S403). Specifically, the connection point management table 1100 is searched for an entry whose ID registered in the field for the connection source object ID 1101 matches the obtained object ID.

When no entry is found that holds the matching object ID, it means that the object identified by the obtained object ID is not a connection point. Then whether or not the response message contains the object ID of another child object or parent object is judged (S407). In the case where the response message contains no other object IDs, the connection point processing is ended. In the case where the response message contains any other object ID, the object ID of the next child object or parent object is obtained from the response message (S408). Step S403 and subsequent steps are repeated for the newly obtained object ID.

When the connection point management table 1100 has an entry that holds the matching object ID, it means that the object identified by the obtained object ID is a connection point. Then the connection source object ID contained in the response message is substituted with the connection destination object ID (S404).

Whether or not there is appendant information associated with the object is judged next (S405). Appendant information is, for example, attribute information of the object. When there is no appendant information, the next step is Step S407. When there is appendant information, the appendant information of the connection source object is substituted with the appendant information of the connection destination object (S406), and the program proceeds to Step S407.

Step S407 and subsequent steps are as described above.

The first embodiment described above has an effect of reducing the latency in access to a file since object ID conversion is unnecessary in nodes that can create an object ID in the shared ID format.

Described next is a procedure of processing that is executed by the administrator through the administrator user interface 506 of the management device 5000 to integrate sharing groups constituting a GNS.

Figure 21:
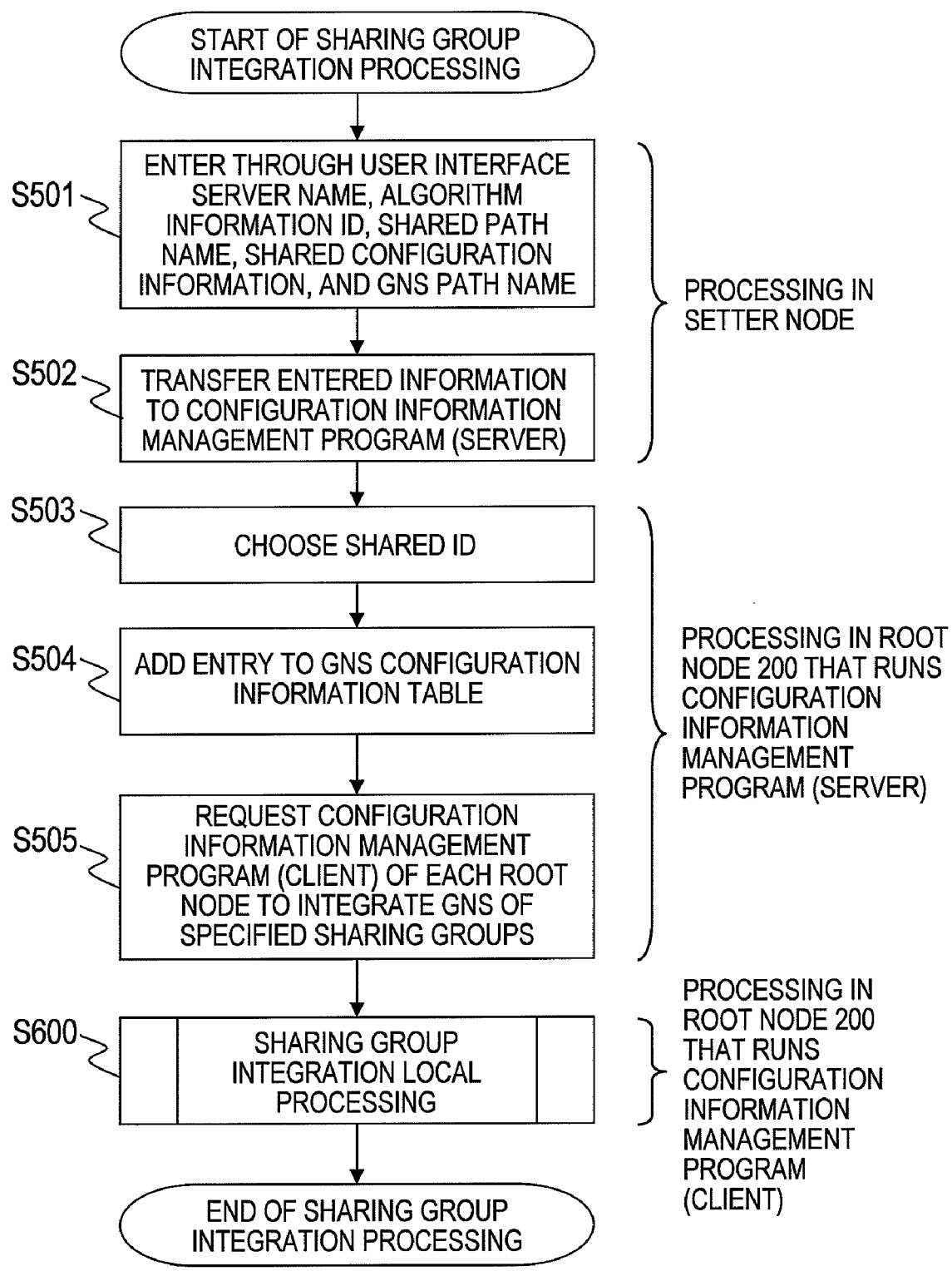
FIG. 21 is a flow chart showing operations of the management device and the root node executed in sharing group integration processing in accordance with the first embodiment of this invention.

FIG. 21 is a flow chart showing how the management device 5000 and the root node 200 operate in sharing group integration processing according to the first embodiment of this invention.

First, the administrator enters, through the administrator user interface 506, server names of sharing groups to be integrated, an algorithm information ID, a shared path name, shared configuration information, and a GNS path name (S501). A GNS path name is a path name in one virtualized sharing group.

The entered information is transferred to the configuration information management program (server) 400s, which is run in one of the root nodes 200 in the computer system (S502).

The configuration information management program (server) 400s chooses a shared ID unique throughout the computer system from the free shared ID management list 402 (S503).

An entry is created from the received information and the chosen shared ID, and is added to the GNS configuration information table 1200s (S504).

Each root node 200 is requested to integrate GNS information for the added entry (S505). The root node 200 that has received the request (the root node 200 that runs the configuration information management program (client) 400c) executes sharing group integration local processing (S600), and the sharing group integration processing is then ended. The sharing group integration local processing (S600) will be described later with reference to FIG. 22.

Figure 22:
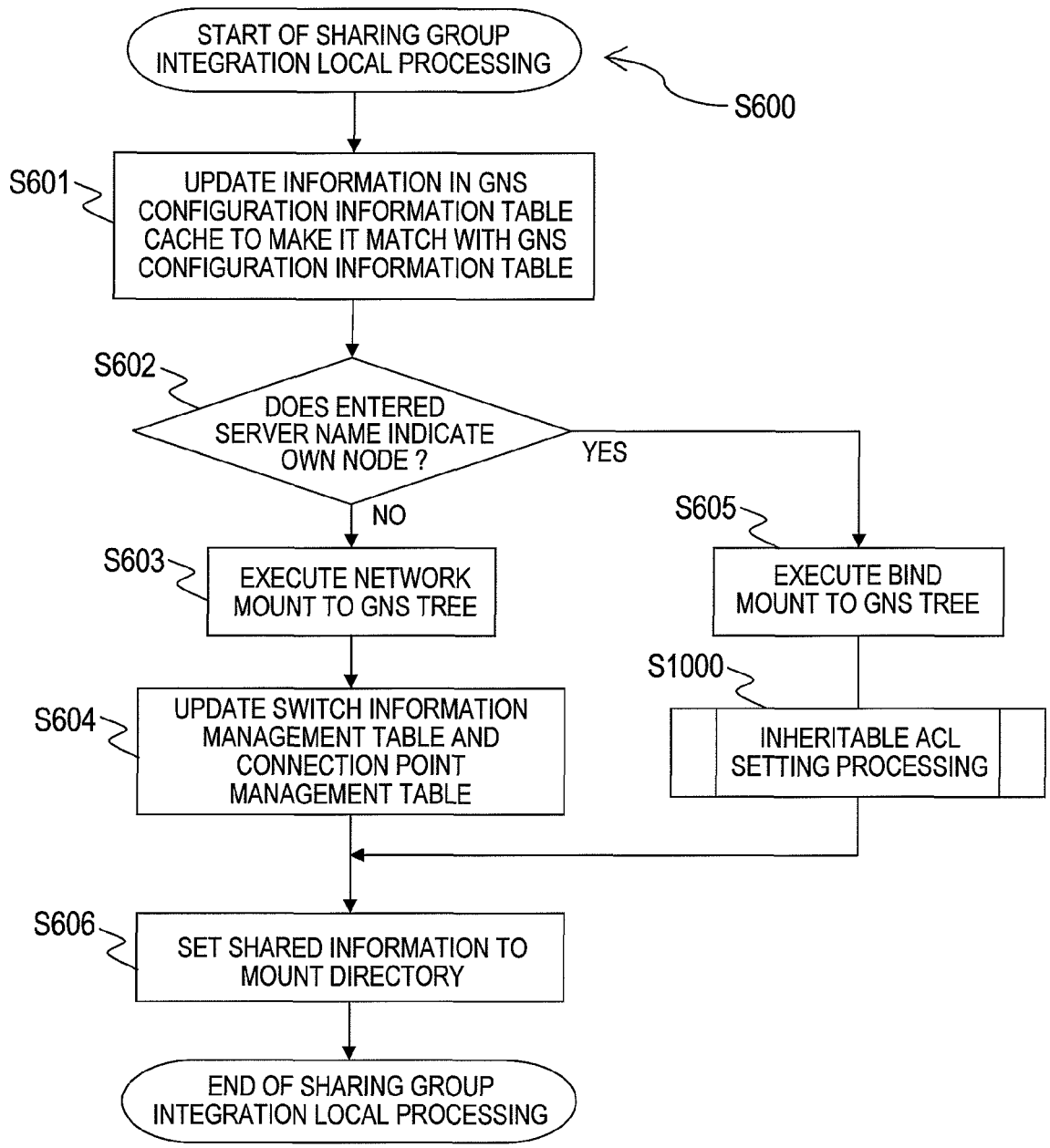
FIG. 22 is a flow chart showing a sharing group integration local processing in accordance with the first embodiment of this invention.

FIG. 22 is a flow chart showing the sharing group integration local processing (S600) which is invoked from the sharing group integration processing of FIG. 21.

First, the same information as the one held in the added entry is obtained and registered in the GNS configuration information table cache 1200c (S601). Next, whether or not a server name in the entry indicates the own node is judged (S602).

When the server name indicates the own node ("YES" in S602), bind mount is executed at a point in the GNS tree that is determined from the entry's information (S605). Inheritable ACL setting processing is then executed (S1000). Thereafter, the program proceeds to Step S606. The inheritable ACL setting processing (S1000) will be described later with reference to FIG. 23.

When the server name does not indicate the own node ("NO" in S602), network mount is executed at a point in the GNS tree that is determined from the entry's information (S603). An entry is then added to the switch information management table 800 and the connection point management table 1100 each (S604).

After the mount is completed, shared information is set to the mount directory (S606), and the sharing group integration local processing is ended.

Figure 23:
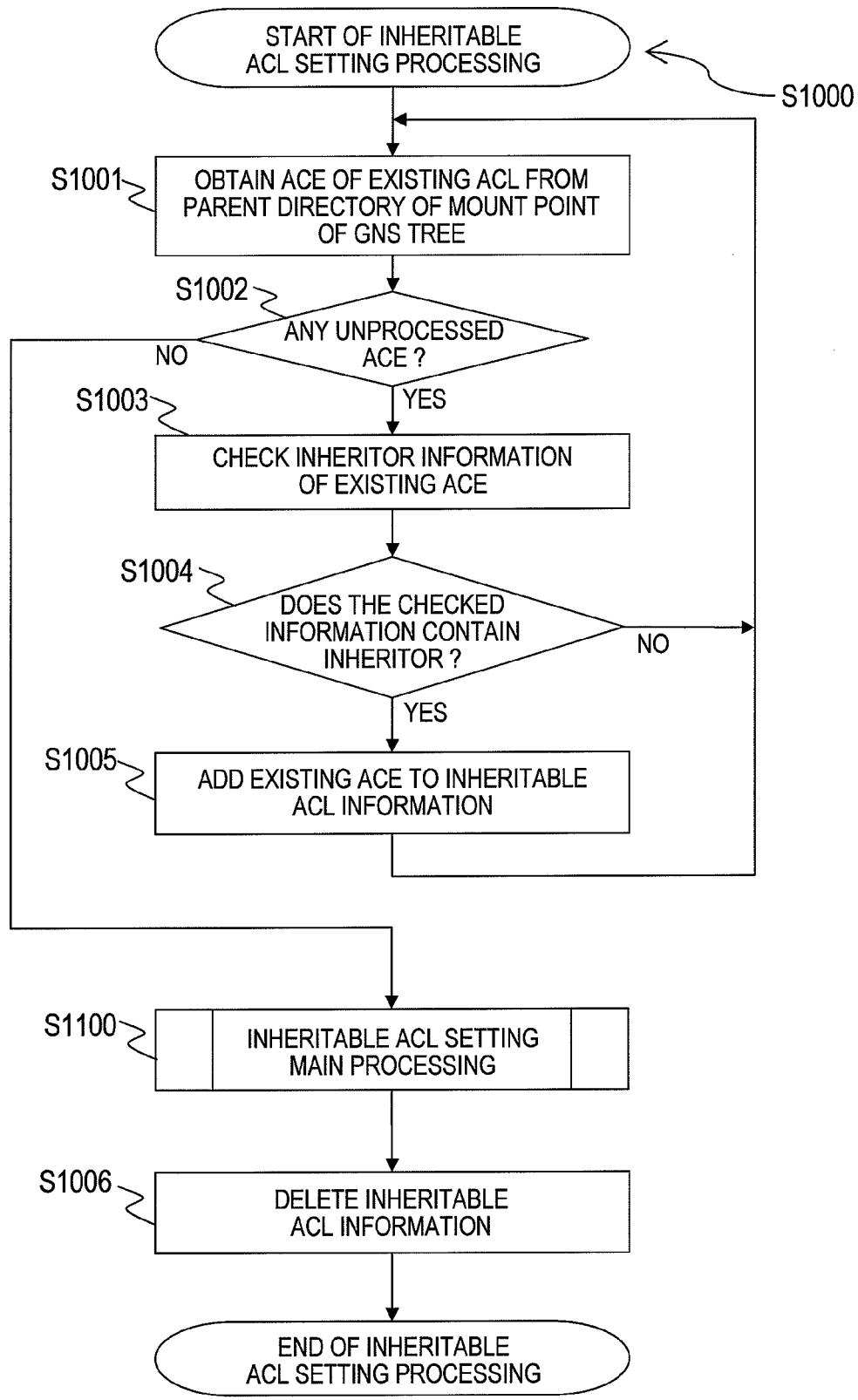
FIG. 23 is a flow chart showing a inheritable ACL setting processing in accordance with the first embodiment of this invention.

FIG. 23 is a flow chart showing the inheritable ACL setting processing (S1000) which is invoked from the sharing group integration local processing (S600).

First, the administrator uses the management program 5003 of the management device 5000 to make a request to connect a new file server to the GNS, and the configuration information management program 400 of the root node 200 sends the request to the inheritable ACL setting/deleting program 5100.

The inheritable ACL setting/deleting program 5100 obtains one ACE from an ACL set to a directory one level above the mount point in the GNS tree (S1001).

Whether or not the ACL has an unprocessed ACE is judged next (S1002). When it is judged in Step S1002 that there is an ACE yet to be processed ("YES" in S1002), whether or not the ACE obtained in S1001 is to be inherited is judged from its inheritor information (S1003). When the obtained ACE is to be inherited ("YES" in S1004), the ACE is added to the inheritable ACL information 5300 (S1005), and the program returns to S1001 to execute S1001 and subsequent steps for another ACE. When the obtained ACE is not to be inherited ("NO" in S1004), the ACE is left as it is, and the program returns to Step S1001 to execute S1001 and subsequent steps for another ACE.

When it is judged in Step S1002 that no unprocessed ACE remains ("NO" in S1002), inheritable ACL setting main processing is executed (S1100), and the inheritable ACL information 5300 is deleted (S1006) as the last step before the inheritable ACL setting processing is ended. The inheritable ACL setting main processing (S1100) will be described later with reference to FIG. 24.

Figure 24:
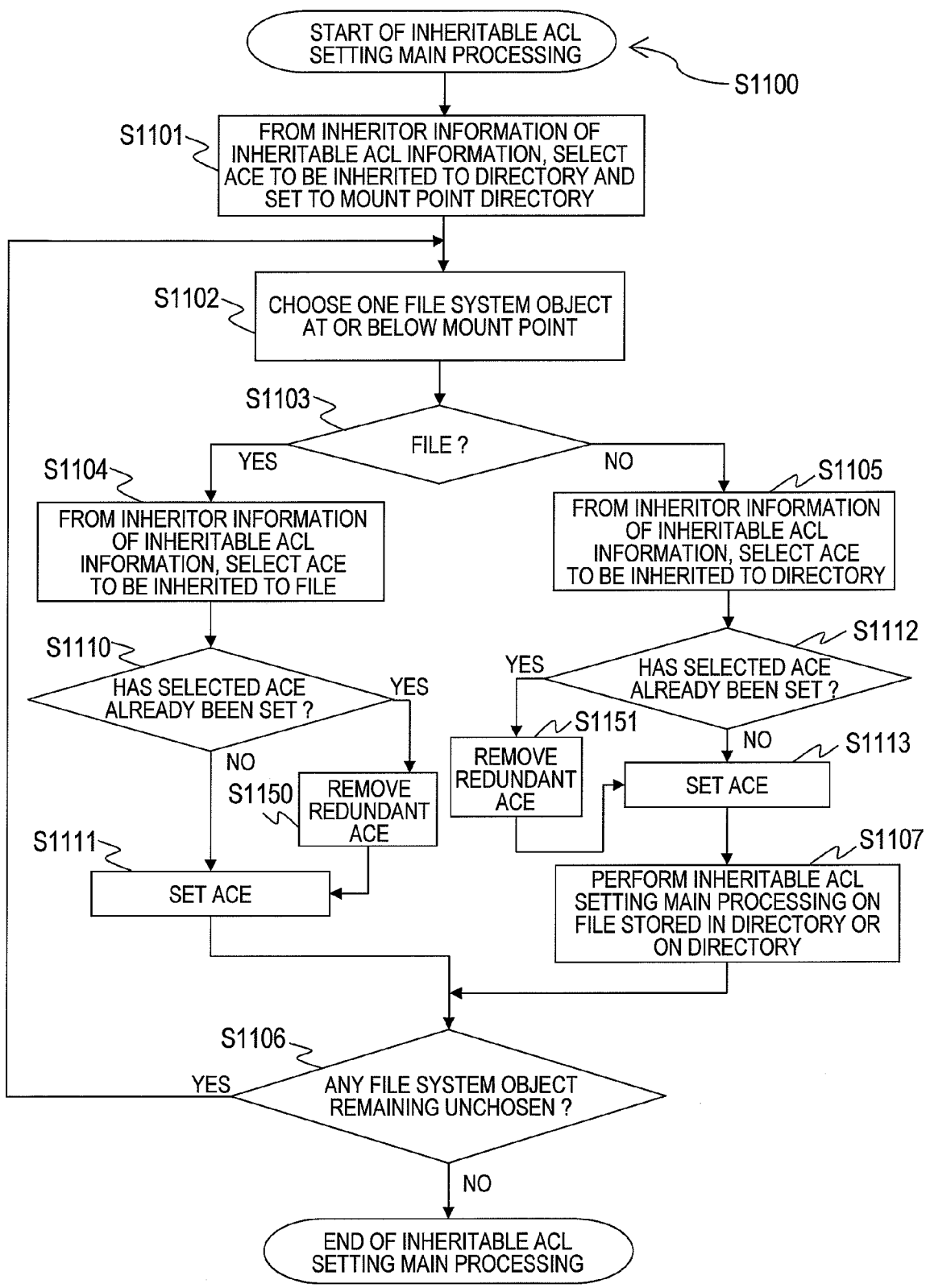
FIG. 24 is a flow chart showing a inheritable ACL setting main processing in accordance with the first embodiment of this invention.

FIG. 24 is a flow chart showing the inheritable ACL setting main processing (S1100) which is evoked from the inheritable ACL setting processing (S1000).

The inheritable ACL setting/deleting program 5100 selects every ACE that is to be inherited to a directory based on the inheritor 5204 of the inheritable ACL information 5300 created in the inheritable ACL setting processing (S1000), and sets the selected ACE to the mount point directory (S1101). The inheritable ACL setting/deleting program 5100 then chooses one file system object below the mount point (S1102).

Whether the chosen file system object is a file or not is judged (S1103). When it is judged as a result that the chosen file system object is a file ("YES" in S1103), every ACE that is to be inherited to a file is selected based on the inheritor 5204 of the inheritable ACL information 5300 (S1104).

Whether or not the selected ACE is already set in the ACL (whether or not there is a duplicate of the ACE to be set) is then judged (S1110). When it is judged as a result that the selected ACE has not been set in the ACL, the selected ACE is set in the ACL (S1111). In the case where the selected ACE has been set in the ACL, any redundant ACE is removed (S1150), and ACEs that do not have a duplicate are set (S1111).

When the chosen file system object is any other object than a file (for example, a directory) ("NO" in S1103), every ACE that is to be inherited to a directory is selected based on the inheritor 5204 of the inheritable ACL information 5300 (S1105).

Whether or not the selected ACE is already set in the ACL (whether or not there is a duplicate of the ACE to be set) is then judged (S1112). When it is judged as a result that the selected ACE has not been set in the ACL, the selected ACE is set in the ACL (S1113). In the case where the chosen ACE has been set in the ACL, any redundant ACE is removed (S1151), and ACEs that do not have a duplicate are set (S1113).

The program then chooses a file stored in the directory or a lower directory, and performs the inheritable ACL setting main processing (S1100) on the chosen file or directory (S1107).

In this way, when a file system object to be processed is a directory, a file system object stored in the directory is chosen and an inheritable ACL is set to the chosen file system object. By repeating this processing for files and directories under the directory, the inheritable ACL can be set recursively, and the inheritable ACL can thus be set to every file system object in the directory.

Lastly, whether or not any file system object remains unchosen is judged (S1106) and, when there is a file system object yet to be chosen ("YES" in S1106), another file system object is chosen (S1102) in order to execute the subsequent steps. When there is no file system object that has not been chosen, ("NO" in S1106), the inheritable ACL setting main processing is ended since the inheritable ACL has been set to every file system object.

Figure 25:
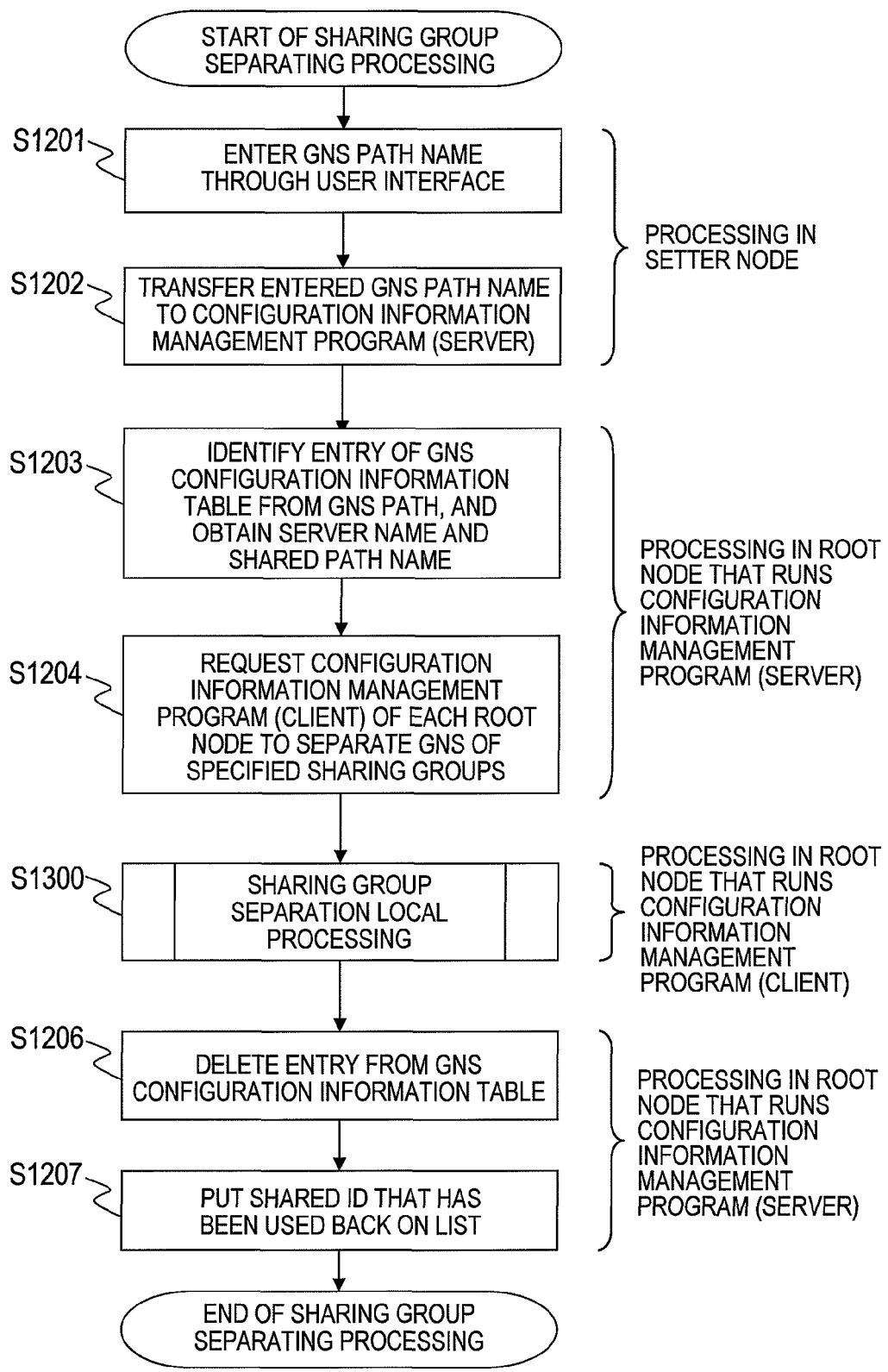
FIG. 25 is a flow chart showing a sharing group separating processing in accordance with the first embodiment of this invention.

FIG. 25 is a flow chart showing the sharing group separating processing according to the first embodiment of this invention.

The sharing group separating processing is executed when the administrator uses the management program 5003 of the management device 5000 to make a request to disconnect a file server from the GNS.

First, the administrator enters through the administrator user interface 506 the GNS path name of a directory to be disconnected (S1201). A GNS path name is a path name in one virtualized sharing group.

The entered information is transferred to the configuration information management program (server) 400s, which is run in one of the root nodes 200 in the computer system (S1202).

From the GNS path name received in Step S1202, the configuration information management program (server) 400s identifies an entry of the GNS configuration information table 1200s, and obtains a server name and a shared path name from the GNS configuration information table 1200s (S1203).

A GNS separation request is then sent to the configuration information management program (client) 400c of each root node 200.

The root node 200 that has received the GNS separation request (the root node 200 that runs the configuration information management program (client) 400c, executes sharing group separation local processing (S1300). The sharing group separation local processing (S1300) will be described later with reference to FIG. 26.

The configuration information management program (server) 400s deletes an unnecessary entry from the GNS configuration information table 1200 (S1206). For example, an entry of the GNS configuration information table 1200s whose GNS path name 1202 matches the GNS path name entered by the administrator is an unnecessary entry.

Lastly, the shared ID chosen in the sharing group integration processing (S503 of FIG. 21) is put back on the free shared ID management list 402 (S1207), and the sharing group separating processing is ended (S1207).

Figure 26:
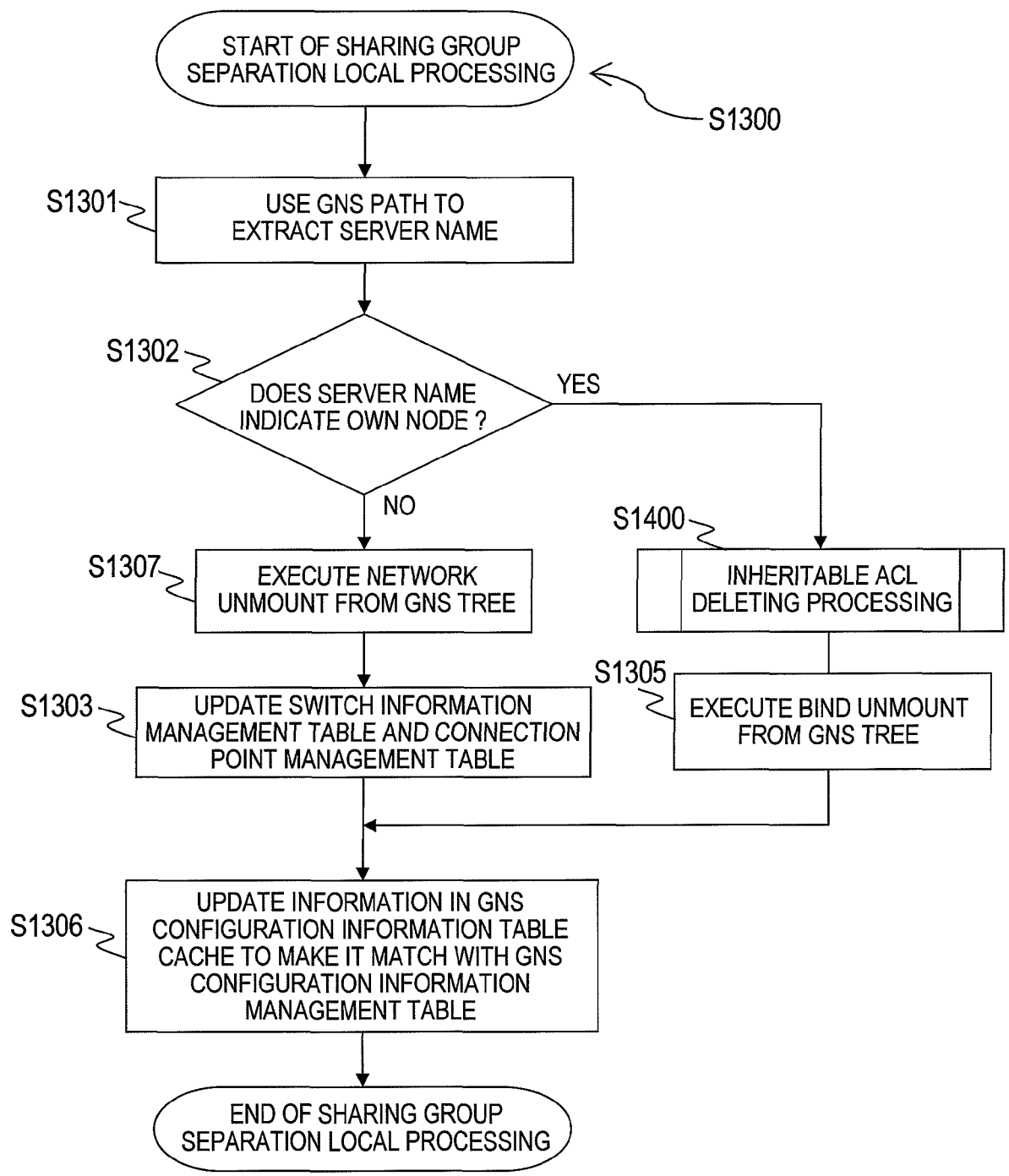
FIG. 26 is a flow chart showing a sharing group separation local processing in accordance with the first embodiment of this invention.

FIG. 26 is a flow chart showing the sharing group separation local processing (S1300) which is invoked from the sharing group separating processing.

The configuration information management program (client) 400c of each root node 200 searches the GNS configuration information table cache 1200c for an entry that is identified by the GNS path name entered by the administrator, and extracts a server name from the GNS configuration information table cache 1200c (S1301). The program next judges whether or not the extracted server name indicates its own node (S1302).

When the extracted server name indicates the own node ("YES" in S1302), inheritable ACL deleting processing is executed (S1400), and then bind unmount is executed in order to unmount the directory from the GNS tree (S1305). The inheritable ACL deleting processing will be described later with reference to FIG. 27.

When the extracted server name does not indicate the own node ("NO" in S1302), network unmount is executed at the corresponding mount point in the GNS tree (S1307). The configuration information management program (client) 400c then deletes the entry from the switch information management table 800 and the connection point management table 1100 (S1303).

Lastly, the configuration information management program (client) 400c updates the GNS configuration information table cache 1200c to synchronize information in the GNS configuration information table cache 1200c with the GNS configuration information table (server) 1200s (S1306). For example, an entry that holds the same GNS path name as that of the directory to be disconnected is deleted from the GNS configuration information table cache 1200c.

Figure 27:
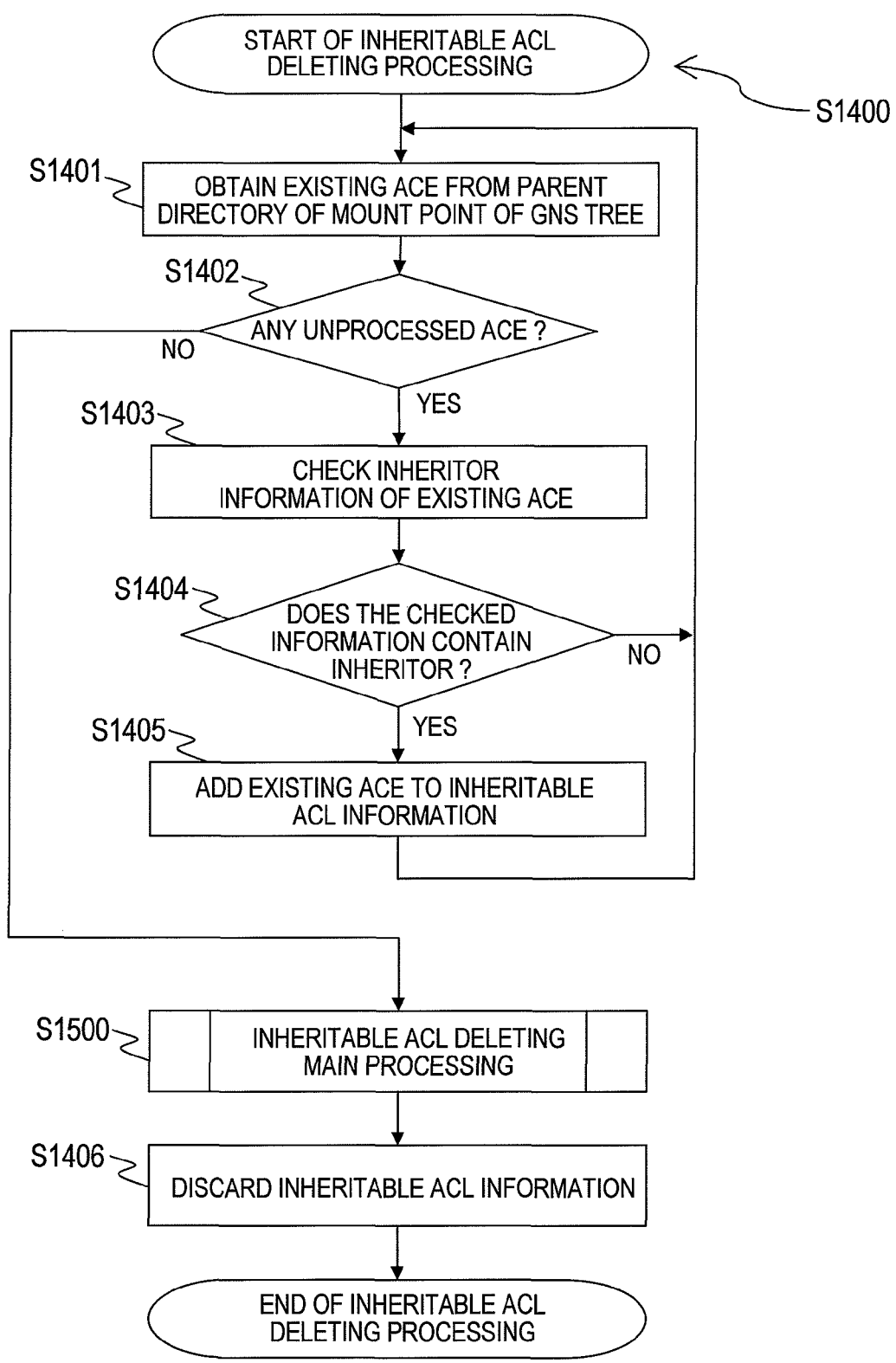
FIG. 27 is a flow chart showing a inheritable ACL deleting processing in accordance with the first embodiment of this invention.

FIG. 27 is a flow chart showing the inheritable ACL deleting processing (S1400) which is invoked from the sharing group separation local processing (S1300).

First, one of ACEs set in an ACL of a parent directory of the mount point in the GNS tree is obtained (S1401).

Whether or not the ACL has an unprocessed ACE is judged next (S1402). When it is judged in Step S1402 that there is an ACE yet to be processed ("YES" in S1402), whether or not the obtained ACE is to be inherited is judged from its inheritor information (S1403). When the obtained ACE is not to be inherited ("NO" in S1404), the program returns to S1401 to execute S1401 and subsequent steps for another ACE. When the obtained ACE is to be inherited ("YES" in S1404), the ACE is added to the inheritable ACL information 5300 (S1405), and the program returns to Step S1401 to execute S1401 and subsequent steps for another ACE.

When it is judged in Step S1402 that no unprocessed ACE remains ("NO" in S1402), inheritable ACL deleting main processing is executed (S1500), the inheritable ACL information 5300 is discarded (S1406), and then the inheritable ACL deleting processing is ended. The inheritable ACL deleting main processing (S1500) will be described later with reference to FIG. 28.

Figure 28:
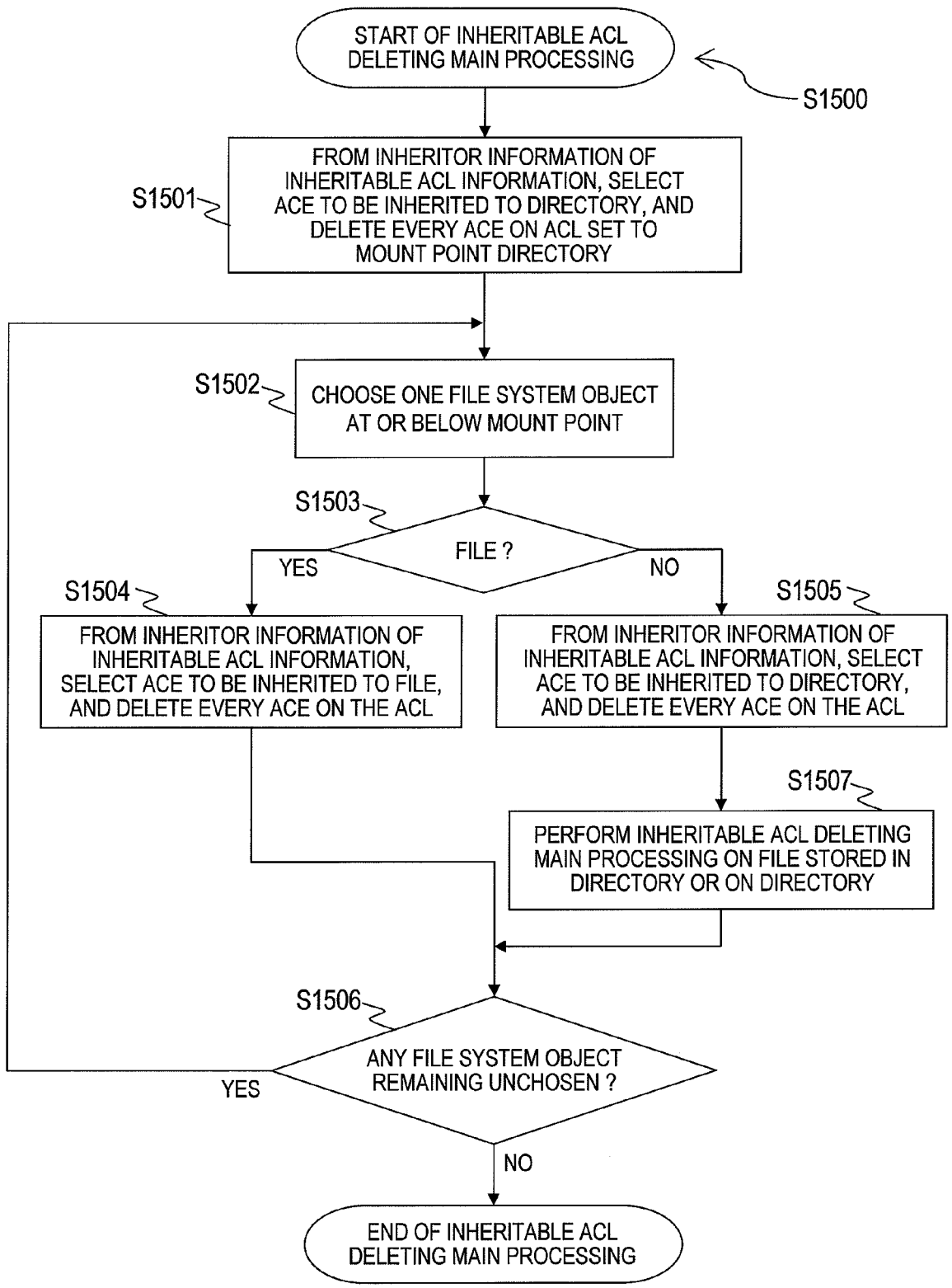
FIG. 28 is a flow chart showing a inheritable ACL deleting main processing in accordance with the first embodiment of this invention.

FIG. 28 is a flow chart showing the inheritable ACL deleting main processing (S1500) which is evoked from the inheritable ACL deleting processing (S1400).

Every ACE that is to be inherited to a directory is selected based on the inheritor 5204 of the inheritable ACL information 5300 created in the inheritable ACL deleting processing (S1400), and every ACE that is found in the ACL set to the mount point directory is deleted (S1501). One file system object below the mount point is then chosen (S1502).

Whether the chosen file system object is a file or not is checked (S1503). When the chosen file system object is a file ("YES" in S1503), every ACE that is to be inherited to a file is selected based on the inheritor 5204 of the inheritable ACL information 5300. From an ACL set to the file, every ACE that is found in the ACL set to the mount point directory is deleted (S1504).

When the chosen file system object is any other object than a file (for example, a directory) ("NO" in S1503), every ACE that is to be inherited to a directory is selected based on the inheritor 5204 of the inheritable ACL information 5300. From an ACL set to the file system object, every ACE that is found in the ACL set to the mount point directory is deleted (S1505).

The program then chooses a file stored in the directory or a lower directory, and performs the inheritable ACL deleting main processing (S1500) on the chosen file or directory (S1507).

In this way, when a file system object to be processed is a directory, a file system object stored in the directory is chosen and an inheritable ACL is deleted from the chosen file system object. By repeating this processing for files and directories under the directory, the inheritable ACL can be deleted recursively, and the inheritable ACL can thus be deleted from every file system object in the directory.

Next, whether or not any file system object remains unchosen is judged (S1506). When there is a file system object yet to be chosen ("YES" in S1506), another file system object yet to be chosen is chosen in Step S1502 in order to execute the subsequent steps. When there is no file system object that has not been chosen ("NO" in S1506), the inheritable ACL deleting main processing is ended.

Second Embodiment

A second embodiment of this invention will be described next. In the first embodiment, an inheritable ACL is set when a file server to the GNS tree is mounted, whereas in the second embodiment, a combined ACL in which an inheritable ACL is set is dynamically created when the root node 200 receives a file access request from the client 100, and the combined ACL is used to judge whether access to the file should be allowed or denied.

In the second embodiment, the inheritable ACL setting processing (S1000) invoked in the sharing group integration local processing (S600) is not executed when the configuration of a virtual namespace is changed. Similarly, the inheritable ACL deleting processing (S1400) invoked from the sharing group separation local processing (S1300) is not executed in the second embodiment.

Figure 29:
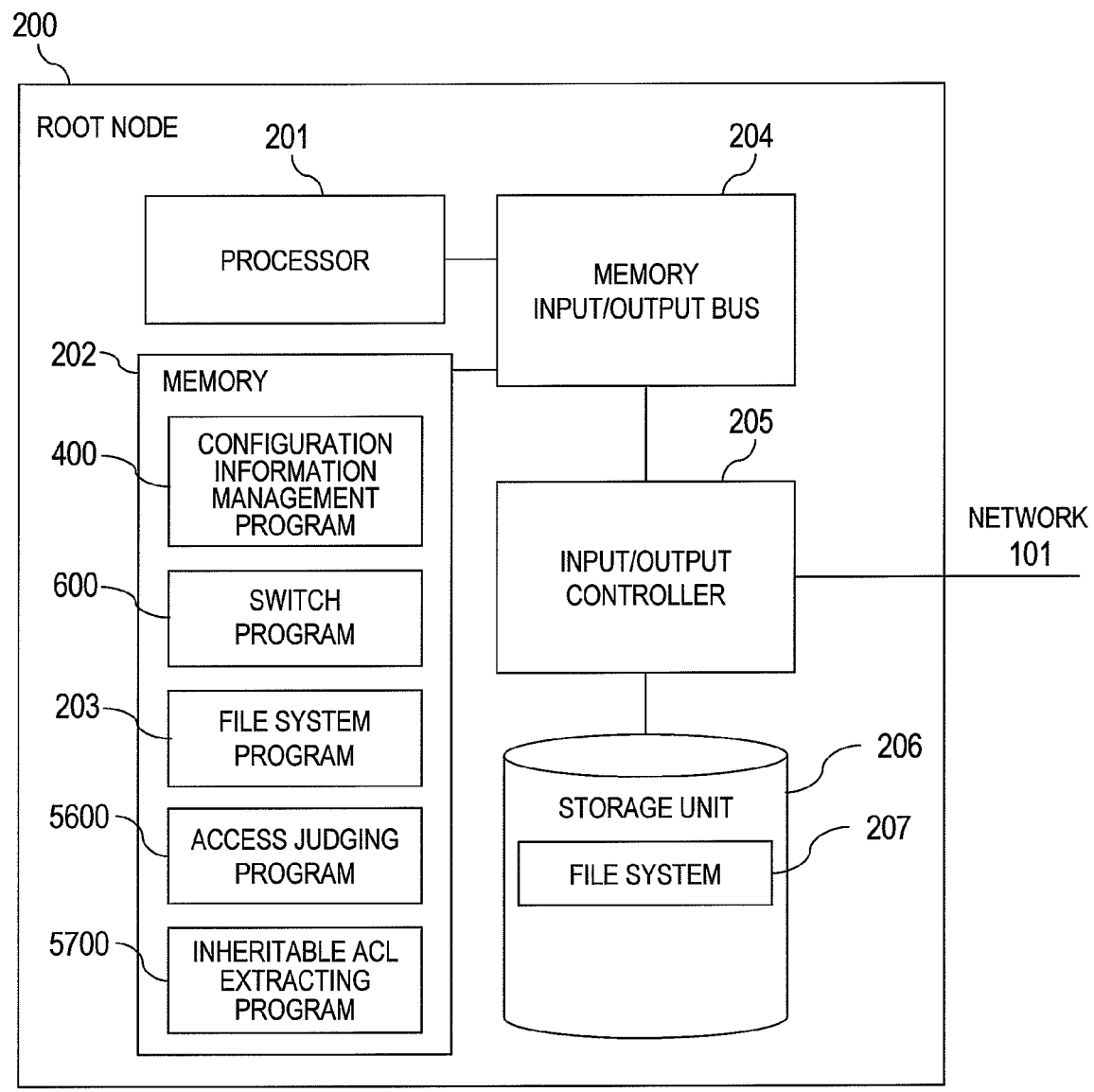
FIG. 29 is a block diagram showing a configuration of the root node in accordance with a second embodiment of this invention.

FIG. 29 is a block diagram showing the configuration of the root node 200 according to the second embodiment of this invention.

The root node 200 of the second embodiment differs from the root node 200 of the first embodiment in that it does not have the inheritable ACL setting/deleting program 5100 but has an inheritable ACL extracting program 5700 and an access judging program 5600. The inheritable ACL extracting program 5700 extracts only inheritable ACLs from among ACLs set to file system objects, and keep the extracted inheritable ACLs in a memory or other storage units. The access judging program 5600 judges whether access to a file should be allowed or denied.

Figure 30:
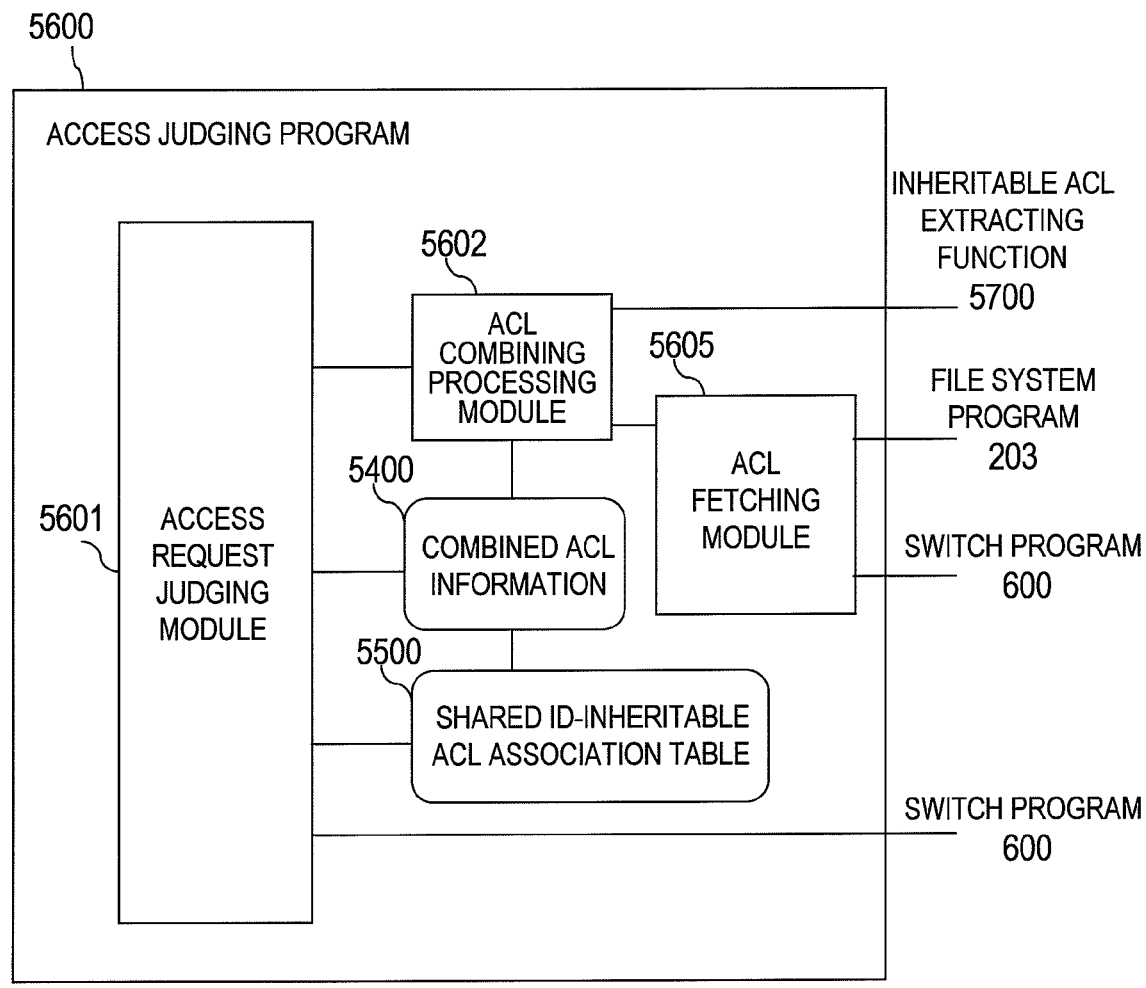
FIG. 30 is a functional block diagram showing a configuration of a access judging program in accordance with the second embodiment of this invention.

FIG. 30 is a functional block diagram showing a configuration of the access judging program 5600 in the root node 200 according to the second embodiment of this invention.

As shown in FIG. 30, the access judging program 5600 of the second embodiment has an access request judging module 5601, an ACL combining processing module 5602, and an ACL fetching module 5605. The root node 200 where the access judging program 5600 is run stores combined ACL information 5400 and a shared ID-inheritable ACL association table 5500.

The access request judging module 5601 judges whether a request made by the client 100 to access a file should be allowed or denied. The ACL combining processing module 5602 combines an inheritable ACL with an ACL set to a file system object.

The ACL fetching module 5605 is similar to the ACL fetching module 5103 described in the first embodiment with reference to FIG. 9, and sends a request to obtain an ACL.

Figure 32:
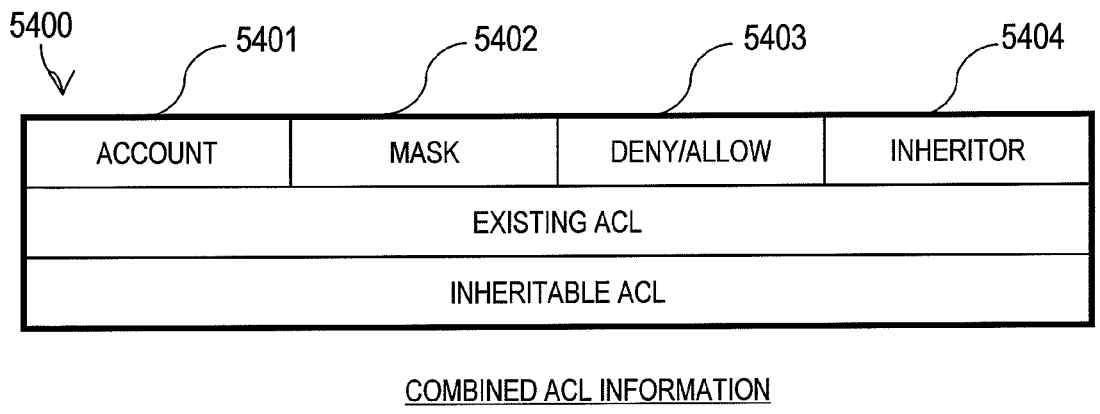
FIG. 32 is a diagram showing a configuration of combined ACL information in accordance with the second embodiment of this invention.
Figure 33:
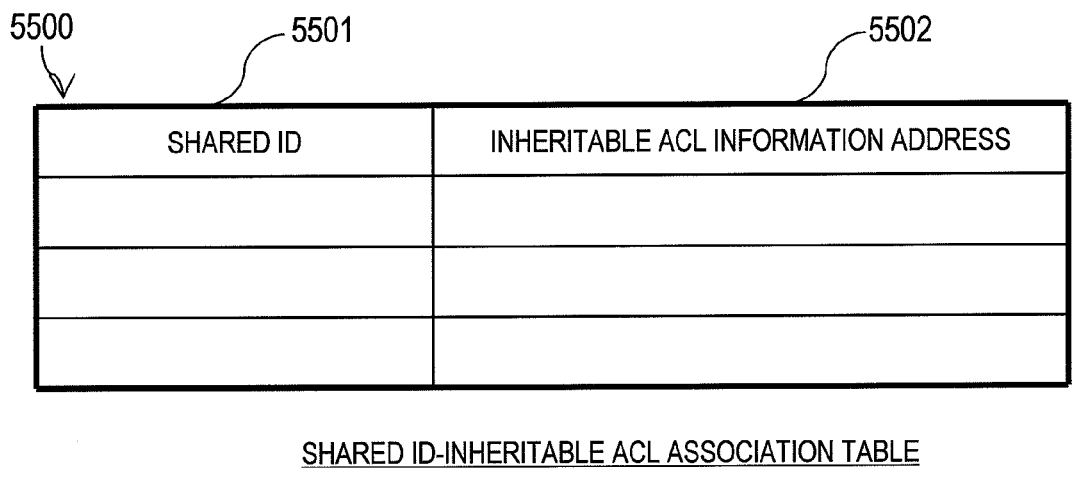
FIG. 33 is a diagram showing a configuration of a shared ID-inheritable ACL association table in accordance with the second embodiment of this invention.

The combined ACL information 5400 is, as shown in FIG. 32, an ACL in which an inheritable ACL is combined with an ACL set to a file system object. The shared ID-inheritable ACL association table 5500 stores information of the association between a shared ID and the inheritable ACL information 5400 as shown in FIG. 33.

The combined ACL information 5400 and the shared ID-inheritable ACL association table 5500, which, in FIG. 30, are shown within the access judging program 5600, may be separate from the access judging program 5600.

Figure 31:
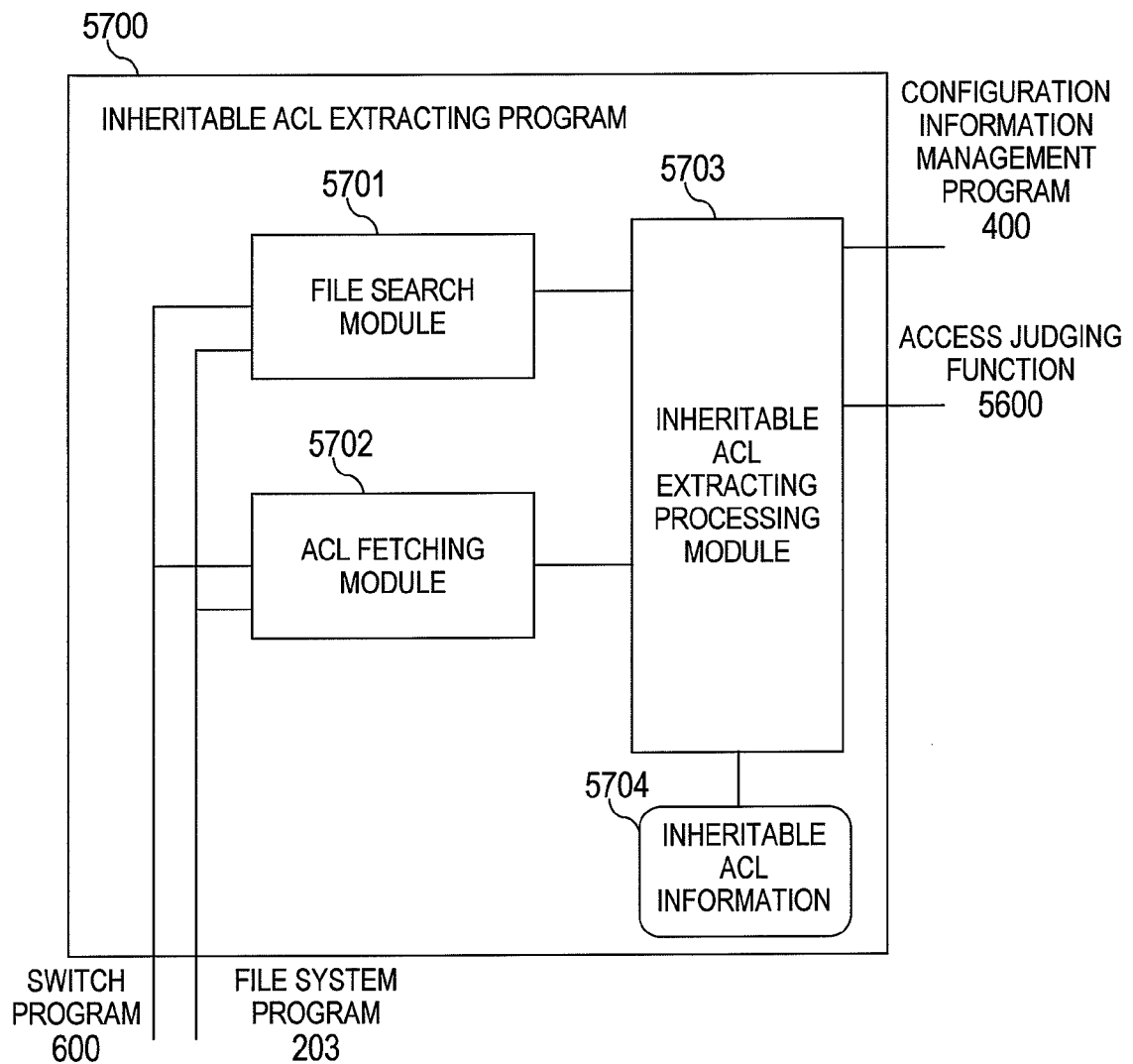
FIG. 31 is a functional block diagram showing a configuration of a inheritable ACL extracting program in accordance with the second embodiment of this invention.

FIG. 31 is a functional block diagram showing a configuration of the inheritable ACL extracting program 5700 in the root node 200 according to the second embodiment of this invention.

As shown in FIG. 31, the inheritable ACL extracting program 5700 has a file search module 5701, an ACL fetching module 5702, and an inheritable ACL extracting processing module 5703. The root node 200 that runs the inheritable ACL extracting program 5700 stores inheritable ACL information 5704.

The file search module 5701 is similar to the file search module 5102 described in the first embodiment with reference to FIG. 9, and searches for a file to which an inheritable ACL is to be set, or from which inheritable ACL is to be deleted, in configuring a virtual namespace. The ACL fetching module 5702 is similar to the ACL fetching module 5103 described in the first embodiment with reference to FIG. 9, and obtains an ACL set to a file system object.

Figure 35:
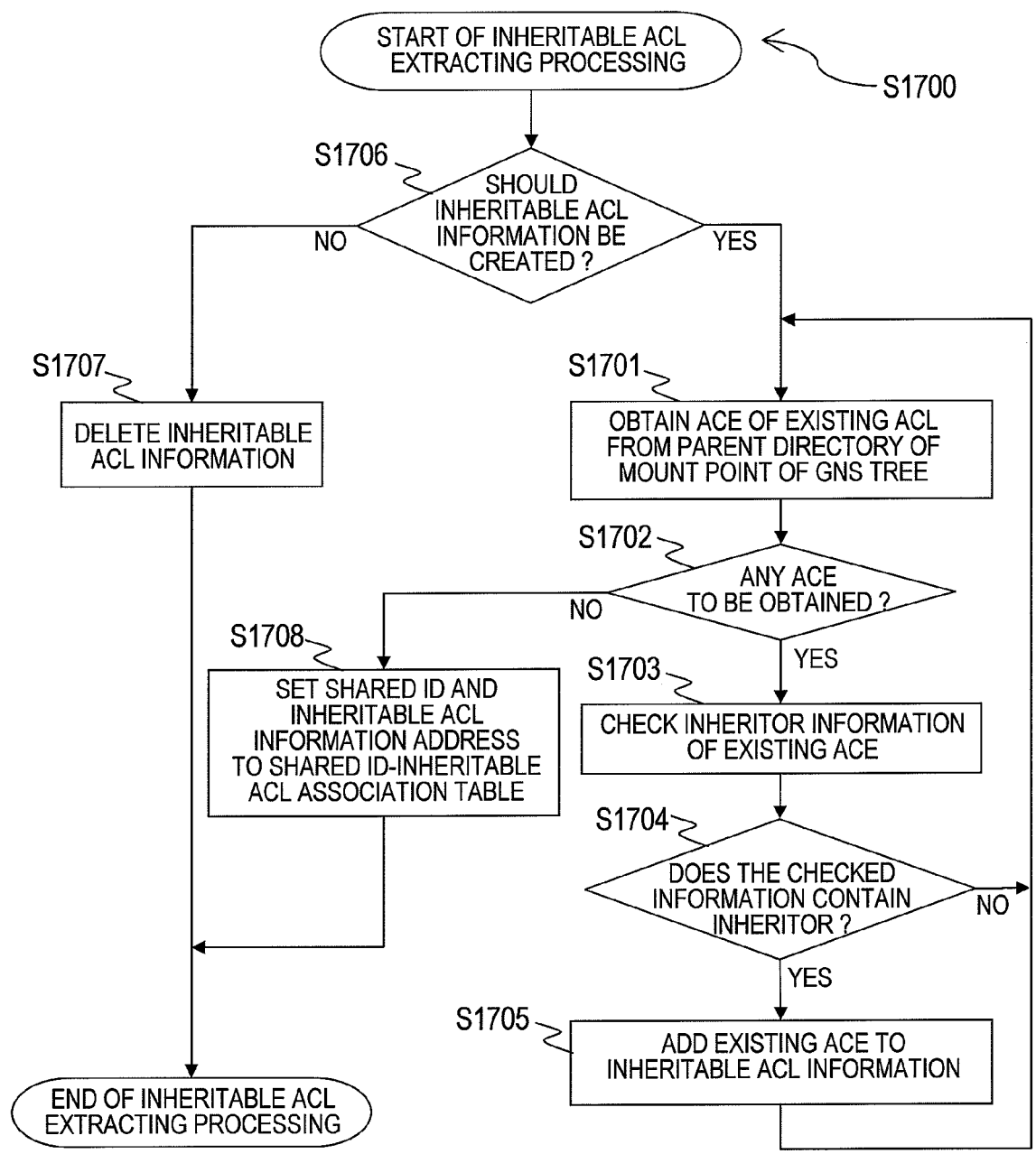
FIG. 35 is a flow chart showing a inheritable ACL extracting processing in accordance with the second embodiment of this invention.

The inheritable ACL extracting processing module 5703 takes an ACE set to be inherited out of an existing ACL through inheritable ACL extracting processing (S1700), which is shown in FIG. 35. The inheritable ACL information 5704 is information in a table format and has the same configuration as that of the inheritable ACL information 5300 described in the first embodiment with reference to FIG. 15.

The inheritable ACL information 5704, which, in FIG. 31, is within the inheritable ACL extracting program 5700, may be separate from the inheritable ACL extracting program 5700.

The configuration information management program (server) 400s in the root node 200 of the second embodiment is similar to the configuration information management program (server) 400s of the first embodiment which is shown in FIG. 4, and has the GNS configuration information management server module 401s, the root node information management server module 403, and the configuration information communication module 404. The root node 200 that runs the configuration information management program (server) 400s stores the free shared ID management list 402, the root node configuration information list 405, and the GNS configuration information table 1200s.

The difference is that, since the root node 200 of the second embodiment does not have the inheritable ACL setting/deleting program 5100, the GNS configuration information management server module 401s is connected to the inheritable ACL extracting program 5700 to exchange data with the inheritable ACL extracting program 5700.

The configuration information management program (client) 400c in the root node 200 of the second embodiment is similar to the configuration information management program (client) 400c of the first embodiment which is shown in FIG. 5, and has the GNS configuration information management client module 401c and the configuration information communication module 404. The root node 200 that runs the configuration information management program (client) 400c stores the GNS configuration information table cache 1200c.

The difference is that, since the root node 200 of the second embodiment does not have the inheritable ACL setting/deleting program 5100, the GNS configuration information management client module 401c is connected to the inheritable ACL extracting program 5700 to exchange data with the inheritable ACL extracting program 5700.

The switch program 600 in the root node 200 of the second embodiment is similar to the switch program 600 of the first embodiment which is shown in FIG. 6, and has the client communication module 606, the root/leaf node communication module 605, the file access management module 700, the object ID conversion processing module 604, and the pseudo file system 601.

The difference is that, since the root node 200 of the second embodiment does not have the inheritable ACL setting/deleting program 5100, the file access management module 700 is connected to the access judging program 5600 and the inheritable ACL extracting program 5700 to receive an ACL obtaining request from the access judging program 5600 and the inheritable ACL extracting program 5700 before obtaining an ACL set to a file system object.

The file access management module 700 in the root node 200 of the second embodiment is similar to the file access management module 700 of the first embodiment which is shown in FIG. 7, and has the requested data processing module 701, the requested data analyzing module 702, and the response data outputting module 703. The root node 200 that runs the file access management module 700 stores the switch information management table 800 shown in FIG. 10, the server information management table 900 shown in FIG. 11, the algorithm information management table 1000 shown in FIG. 12, and the connection point management table 1100 shown in FIG. 13.

The difference is that, since the root node 200 of the second embodiment does not have the inheritable ACL setting/deleting program 5100, the requested data processing module 701 is connected to the access judging program 5600 and the inheritable ACL extracting program 5700 to receive an ACL obtaining request from the access judging program 5600 and the inheritable ACL extracting program 5700 before obtaining an ACL set to a file system object.

FIG. 32 is a diagram showing a configuration of the combined ACL information 5400 according to the second embodiment of this invention.

The combined ACL information 5400 is an ACL in which an inheritable ACL and an ACL set to a file system object are put together. In the second embodiment, whether access should be allowed or denied is judged based on the combined ACL information 5400.

The combined ACL information 5400 is table-format information storing entries each of which is composed of a set of an account 5401, a mask 5402, a deny/allow flag 5403, and an inheritor 5404.

The account 5401, the mask 5402, the denial/permission flag 5403, and the inheritor 5404 are the same as the account 5301, the mask 5302, the deny/allow flag 5303, and the inheritor 5304, respectively, in the inheritable ACL information 5300 described in the first embodiment with reference to FIG. 15.

The combined ACL information 5400 contains entries of an existing ACL and entries of an inheritable ACL. Entries of an existing ACL are placed near the top of the combined ACL information 5400 whereas entries of an inheritable ACL are placed near the bottom of the combined ACL information 5400 (entries of an existing ACL are recorded before entries of an inheritable ACL). This is because, in the case where the combined ACL information 5400 contains conflicting ACEs, ACEs of the existing ACL are preferentially used in judging whether access should be allowed or denied.

FIG. 33 is a diagram showing the configuration of the shared ID-inheritable ACL association table 5500 according to the second embodiment of this invention.

The shared ID-inheritable ACL association table 5500 is a table holding entries each of which is composed of a set of a shared ID 5501 and an inheritable ACL information address 5502.

The shared ID 5501 indicates an ID for identifying a file service export unit. The inheritable ACL information address 5502 is a pointer to the inheritable ACL information 5704.

Figure 34:
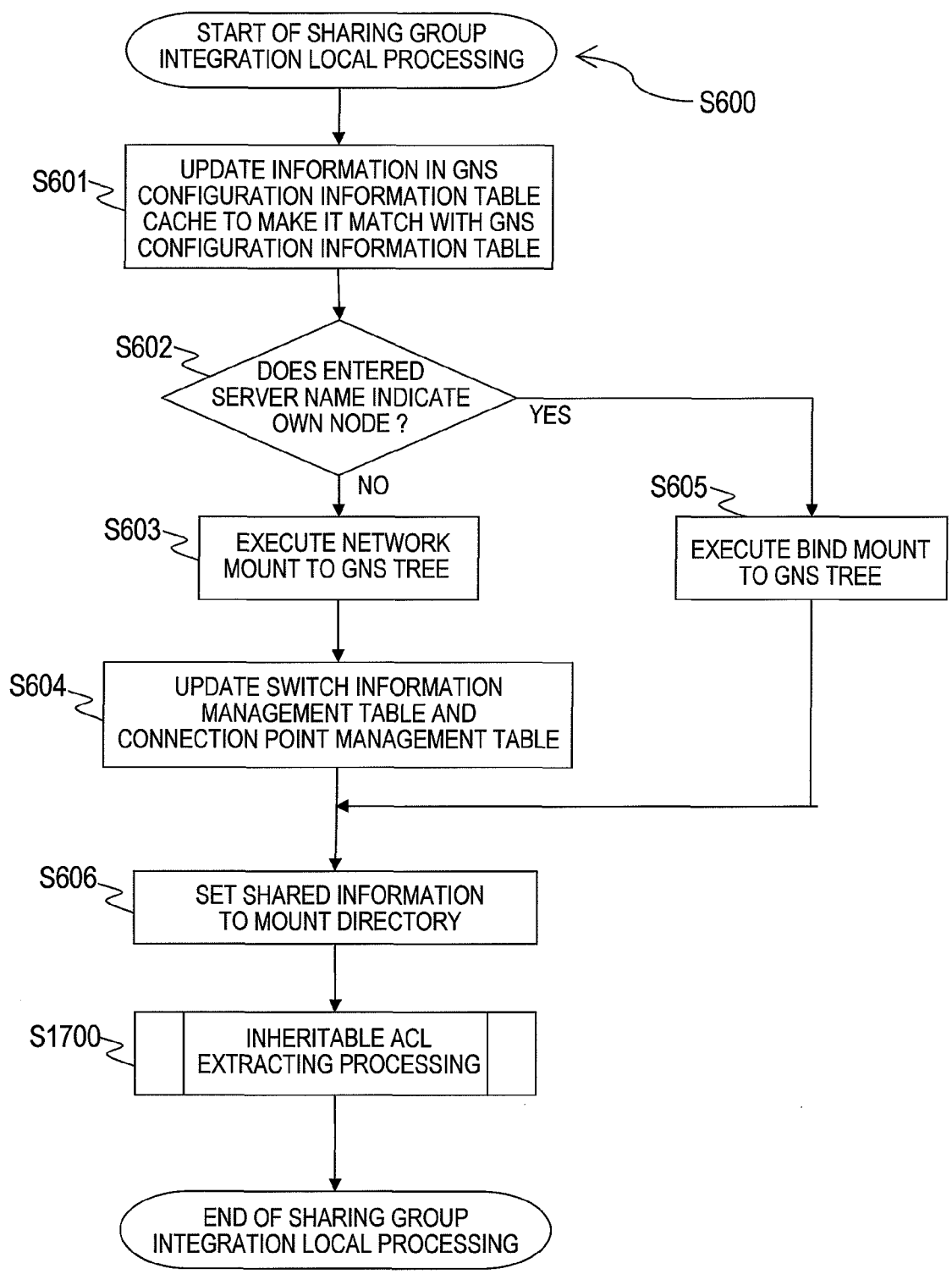
FIG. 34 is a flow chart showing a sharing group integration local processing in accordance with the second embodiment of this invention.

FIG. 34 is a flow chart showing the sharing group integration local processing (S600) according to the second embodiment of this invention. The sharing group integration local processing (S600) is invoked from the same sharing group integration processing that is described in the first embodiment with reference to FIG. 21.

First, the same information as the one held in the added entry is obtained and registered in the GNS configuration information table cache 1200c (S601). Next, whether or not a server name in the entry indicates the own node is judged (S602).

When the server name indicates the own node ("YES" in S602), bind mount is executed at a corresponding point in the GNS tree that is determined from the entry's information (S605). Thereafter, the program moves to Step S606.

When the server name does not indicate the own node ("NO" in S602), network mount is executed at a corresponding point in the GNS tree that is determined from the entry's information (S603). An entry is then added to the switch information management table 800 and the connection point management table 1100 each (S604).

After the mount is completed, shared information is set to the mount directory (S606), the inheritable ACL extracting processing (S1700) is executed, and then the sharing group integration local processing is ended. The inheritable ACL extracting processing (S1700) will be described later with reference to FIG. 35.

FIG. 35 is a flow chart showing the inheritable ACL extracting processing (S1700) according to the second embodiment of this invention.

First, whether to create the inheritable ACL information 5704 (whether the inheritable ACL information 5704 should be created or discarded) is judged (S1706). In the case where this processing is invoked from the sharing group integration local processing (S600), the inheritable ACL information 5704 is to be created ("YES" in S1706). In the case where this processing is invoked from the sharing group separation local processing (S1300), the inheritable ACL information 5704 is to be discarded ("NO" in S1706).

When the inheritable ACL information 5704 is to be created ("YES" in S1706), one ACE is obtained from an ACL set to a directory one level above the mount point in the GNS tree (S1701).

Whether any ACE remains to be obtained is then judged (S1702). When it is judged in S1702 that there is an ACE to be obtained ("YES" in S1702), whether the ACE obtained in S1701 is to be inherited is judged from its inheritor information (S1703). When the obtained ACE is to be inherited ("YES" in S1704), the ACE is added to the inheritable ACL information 5704 (S1705). The inheritable ACL information 5704 can be kept anywhere including a memory and storage. The program then returns to S1701 to execute S1701 and subsequent steps for another ACE. When the obtained ACE is not to be inherited ("NO" in S1704), the ACE is left as it is, and the program returns to Step S1701 to execute S1701 and subsequent steps for another ACE.

When it is judged in Step S1702 that no ACE remains to be obtained ("NO" in S1702), the shared ID 5501 and the inheritable ACL information address 5502 in the shared ID-inheritable ACL association table 5500 are set (S1708), and the inheritable ACL extracting processing is then ended.

When it is judged in Step S1706 that the inheritable ACL information 5704 is to be discarded ("NO" in S1706), the inheritable ACL information 5704 is deleted from the memory (or storage or the like), and the relevant entry is deleted from the shared ID-inheritable ACL association table 5500 (S1707).

Figure 36:
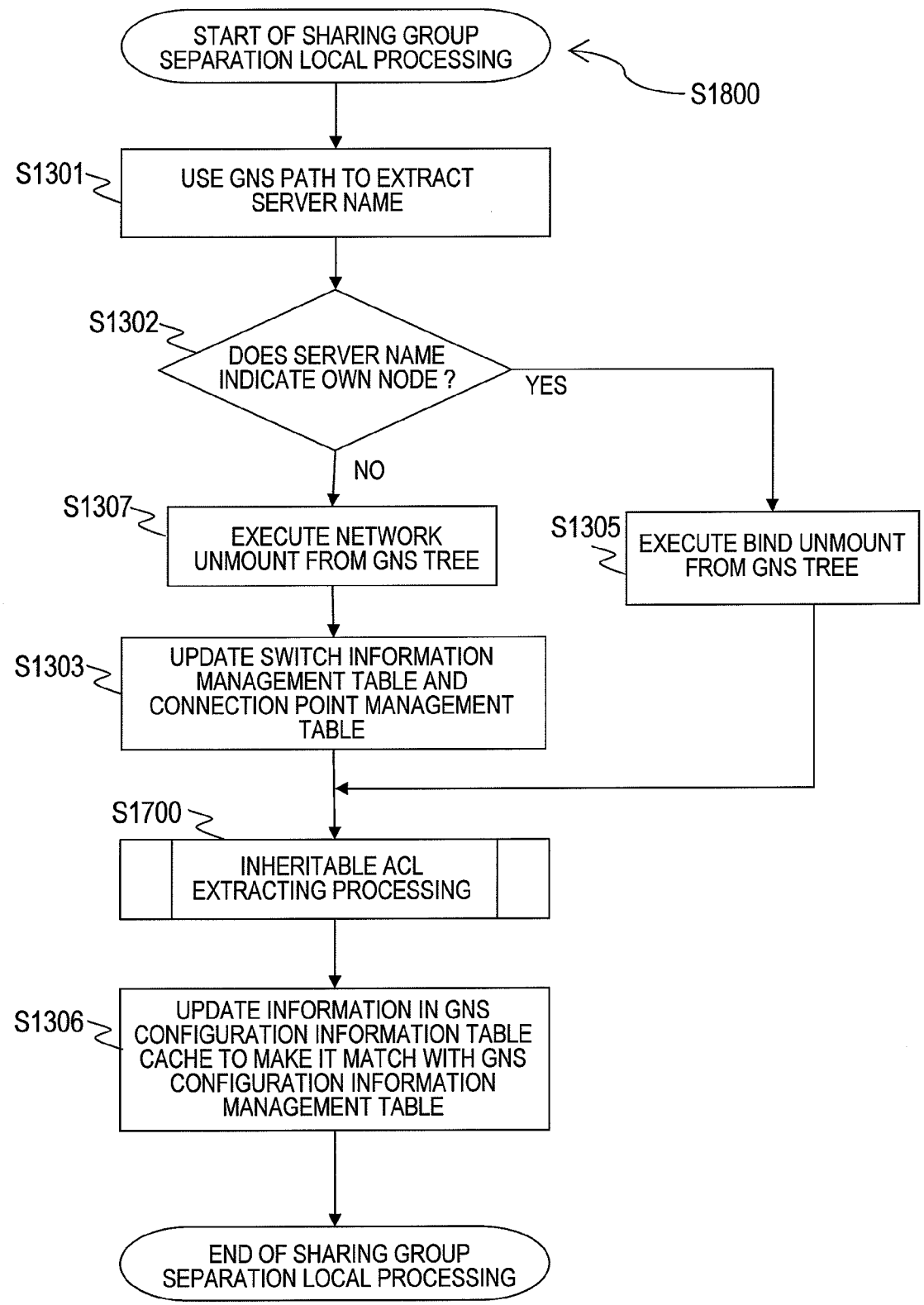
FIG. 36 is a flow chart showing a sharing group separation local processing in accordance with the second embodiment of this invention.

FIG. 36 is a flow chart showing the sharing group separation local processing (S1800) according to the second embodiment of this invention. The sharing group separation local processing (S1800) is invoked from the same sharing group separating processing that is described in the first embodiment with reference to FIG. 25.

The configuration information management program (client) 400c of each root node 200 searches the GNS configuration information table cache 1200c for an entry that is identified by the GNS path name entered by the administrator, and extracts a server name from the GNS configuration information table cache 1200c (S1301). The program next judges whether or not the extracted server name indicates its own node (S1302).

When the extracted server name indicates the own node ("YES" in S1302), bind unmount is executed in order to unmount the directory from the GNS tree (S1305).

When the extracted server name does not indicate the own node ("NO" in S1302), network unmount is executed at the corresponding mount point in the GNS tree (S1307). The configuration information management program (client) 400c then deletes the entry from the switch information management table 800 and the connection point management table 1100 (S1303).

Thereafter, the configuration information management program (client) 400c calls up the inheritable ACL extracting processing (S1700) shown in FIG. 35.

Lastly, the configuration information management program (client) 400c updates the GNS configuration information table cache 1200c to synchronize information in the GNS configuration information table cache 1200c with the GNS configuration information table (server) 1200s (S1306). For example, an entry that holds the same GNS path name as that of the directory to be disconnected is deleted from the GNS configuration information table cache 1200c.

Figure 37:
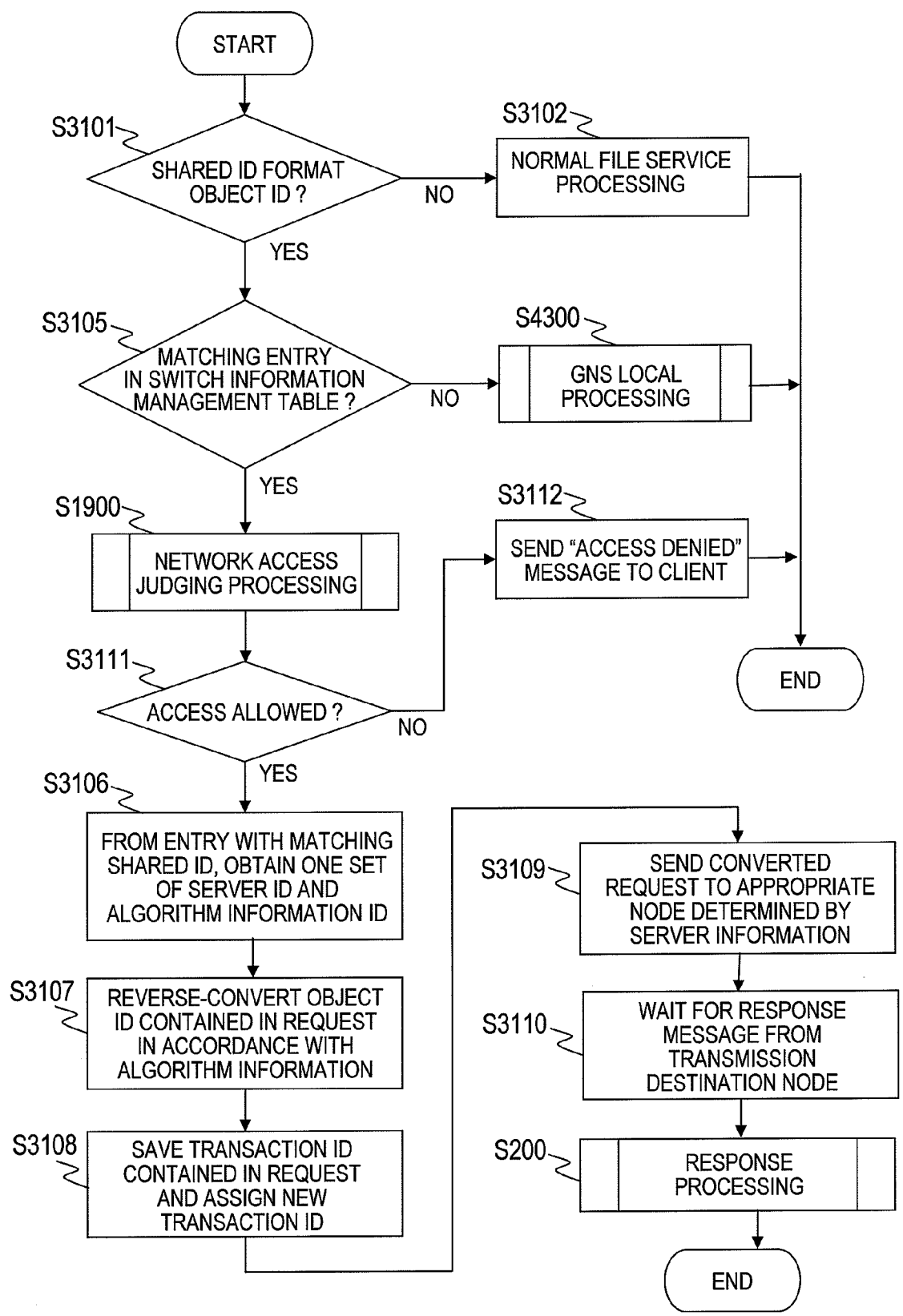
FIG. 37 is a flow chart showing a processing for virtualizing namespaces of sharing groups in accordance with the second embodiment of this invention.

FIG. 37 is a flow chart showing processing that is executed by the root node 200 to virtualize namespaces of sharing groups according to the second embodiment of this invention.

The client communication module 606 receives a file access request from one of the clients 100. The file access request is, for example, a remote procedure call (RPC) of the NFS protocol. The file access management module 700 extracts an object ID from the received request. Whether or not the extracted object ID has the shared ID format is then judged (S3101).

When the object ID extracted from the received request does not have the shared ID format, conventional file service processing is executed (S3102) and the processing of FIG. 37 is ended.

When the object ID extracted from the received request has the shared ID format, the root node 200 judges whether or not the switch information management table 800 has an entry that has the same shared ID as that of the object ID extracted from the received request. As mentioned above, the switch information management table 800 may have more than one entry that meets the condition (entry that holds the same shared ID).

When the switch information management table 800 has no entry that meets the condition ("NO" in S3105), it is judged that the request should be processed by the root node 200 that has received the request, and GNS local processing is executed (S4300). The GNS local processing (S4300) will be described later with reference to FIG. 38.

When the switch information management table 800 has an entry that meets the condition ("YES" in S3105), it is judged that the request should be processed by other root nodes 200 than the one that has received the request, and network access judging processing is executed (S1900). The network access judging processing (S1900) will be described later with reference to FIG. 40. Whether or not the access is allowed is judged (S3111).

When the access is not allowed ("NO" in S3111), an "access denied" message is sent to the client 100 (S3112), and the processing of FIG. 37 is ended.

When the access is allowed as a result of the network access judging processing (S1900) ("YES" in S3111), a set of server ID and algorithm information ID is obtained from the entry that holds the matching shared ID (S3106). In the case where a plurality of entries meet the conditions, the information sets may be obtained by round robin, or an information set that contains the name of a server whose response time measured in advance is quick may be obtained.

Algorithm information that is identified by the algorithm information ID of the obtained set is obtained from the algorithm information management table 1000. The object ID contained in the request is reverse-converted in accordance with the obtained algorithm information (S3107). As shown in FIG. 12, there are different types of algorithm such as an algorithm that involves no conversion, an algorithm that only involves deleting values from the fields for the object ID format 1301 and the shared ID 1302, and an algorithm that involves deleting values from the fields for the object ID format 1301 and the shared ID 1302 and then restoring an original node object ID from information in the field for the converted node object ID 1304 or other information.

Next, in the case where the request contains a transaction ID when the employed protocol manages transactions on a file access request level, the transaction ID is saved and another transaction ID is assigned for the transaction with a node to which the request is to be transferred (S3108). The transfer destination node is identified by obtaining the server information 902 from an entry of the server information management table 900 that holds the same server ID as the one contained in the obtained set.

The converted file access request is sent to the node identified from the server information 902 (S3109), and a response message from the node to which the converted file access request has been sent is waited for (S3110).

After a response message is received from the node to which the converted file access request has been sent, the response processing shown in FIG. 18 is executed (S200), and the processing of FIG. 37 is ended.

Figure 38:
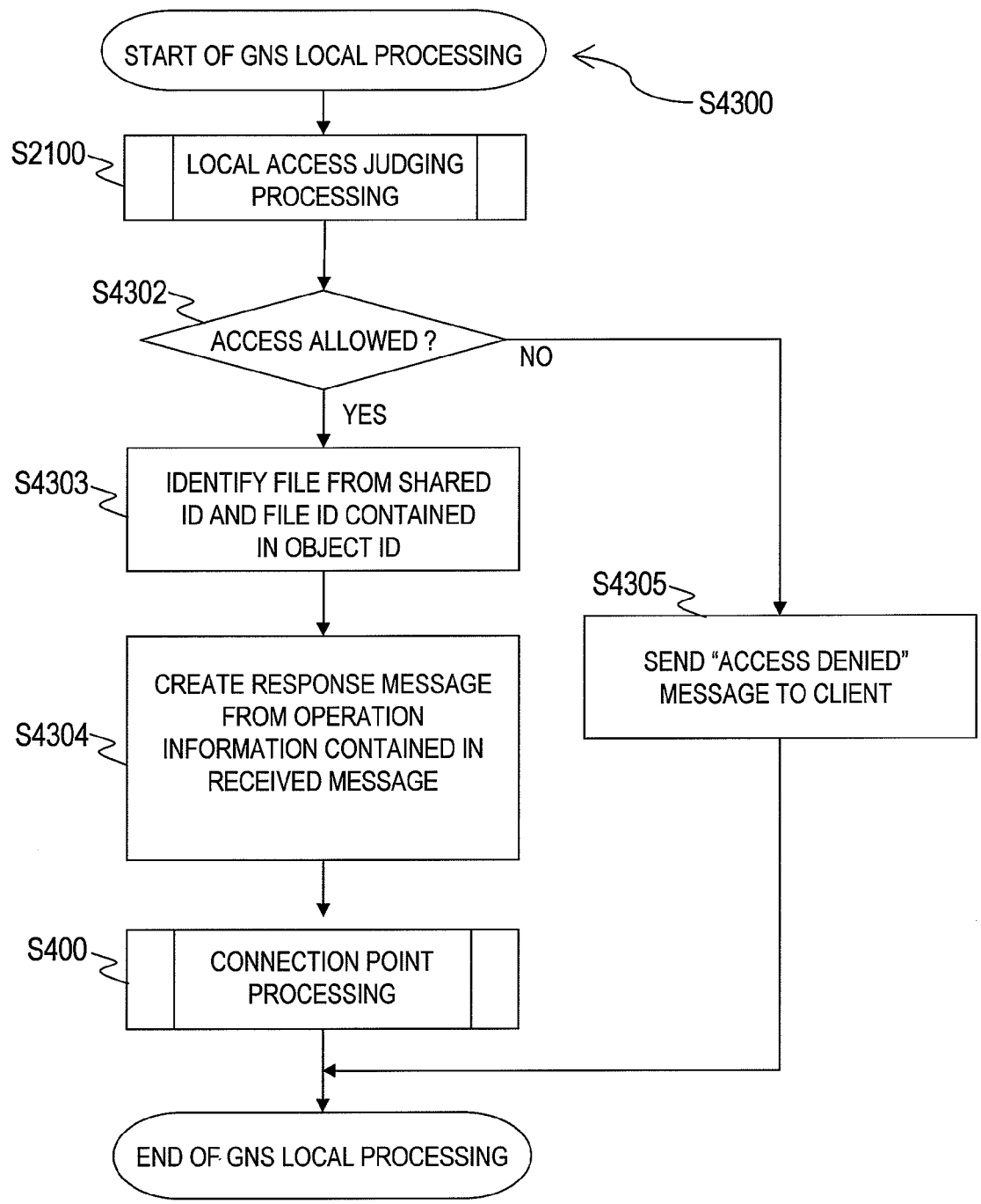
FIG. 38 is a flow chart showing a GNS local processing in accordance with the second embodiment of this invention.

FIG. 38 is a flow chart showing the GNS local processing (S4300) which is executed when it is judged that a file access request should be processed by the root node 200 that has received the file access request according to the second embodiment of this invention.

First, local access judging processing (S2100) is executed. When access is not allowed through the local access judging processing (S2100) ("NO" in S4302), an "access denied" message is sent to the client 100 (S4305), and the GNS local processing is ended. The local access judging processing (S2100) will be described later with reference to FIG. 39.

When access is allowed ("YES" in S4302), the requested file is identified from a shared ID and a file ID that are contained in the request's object ID (S4303).

Next, a response message is created from operation information contained in the received request (S4304). In the case where processing requested by the received request makes it necessary to include an object ID-in the response message, the object ID is given the same shared ID format as that of the received object ID.

The connection point processing, which is special processing performed when access involves crossing over from one sharing group to another, is then executed as shown in FIG. 20 (S400), and the GNS local processing is ended.

Figure 39:
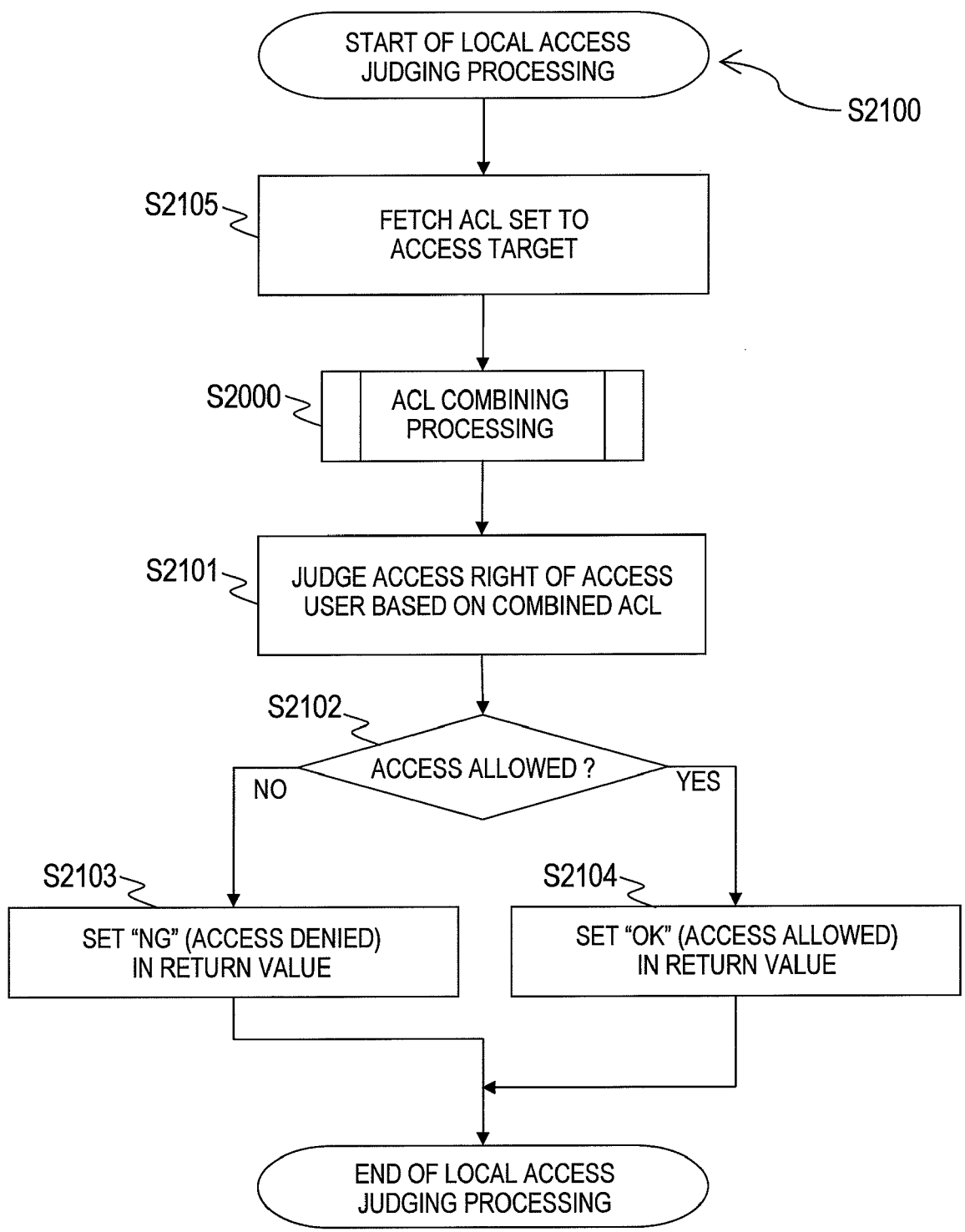
FIG. 39 is a flow chart showing a local access judging processing in accordance with the second embodiment of this invention.

FIG. 39 is a flow chart showing the local access judging processing (S2100) according to the second embodiment of this invention.

First, the file access management module 700 obtains an ACL set to the access target file from the file system program 203 (S2105).

Next, ACL combining processing is executed (S2000) in order to create the combined ACL information 5400. The ACL combining processing (S2000) will be described later with reference to FIG. 41.

Whether the access should be allowed or denied is judged based on the combined ACL information 5400 (S2101). Specifically, an entry whose account 5401 matches the account of the user who has sent the access request is extracted from the ACL, and whether the access should be allowed or denied is judged by comparing information in the access request against the mask 5402 and deny/allow flag 5403 of the entry.

When the access is allowed as a result ("YES" in S2102), "OK" is set as a return value of this processing (a value sent from the local access judging processing back to the GNS local processing) (S2104), and the local access judging processing is ended.

When the access is not allowed ("NO" in S2102), "NG" is set as a return value of this processing (S2103), and the local access judging processing is ended.

Figure 40:
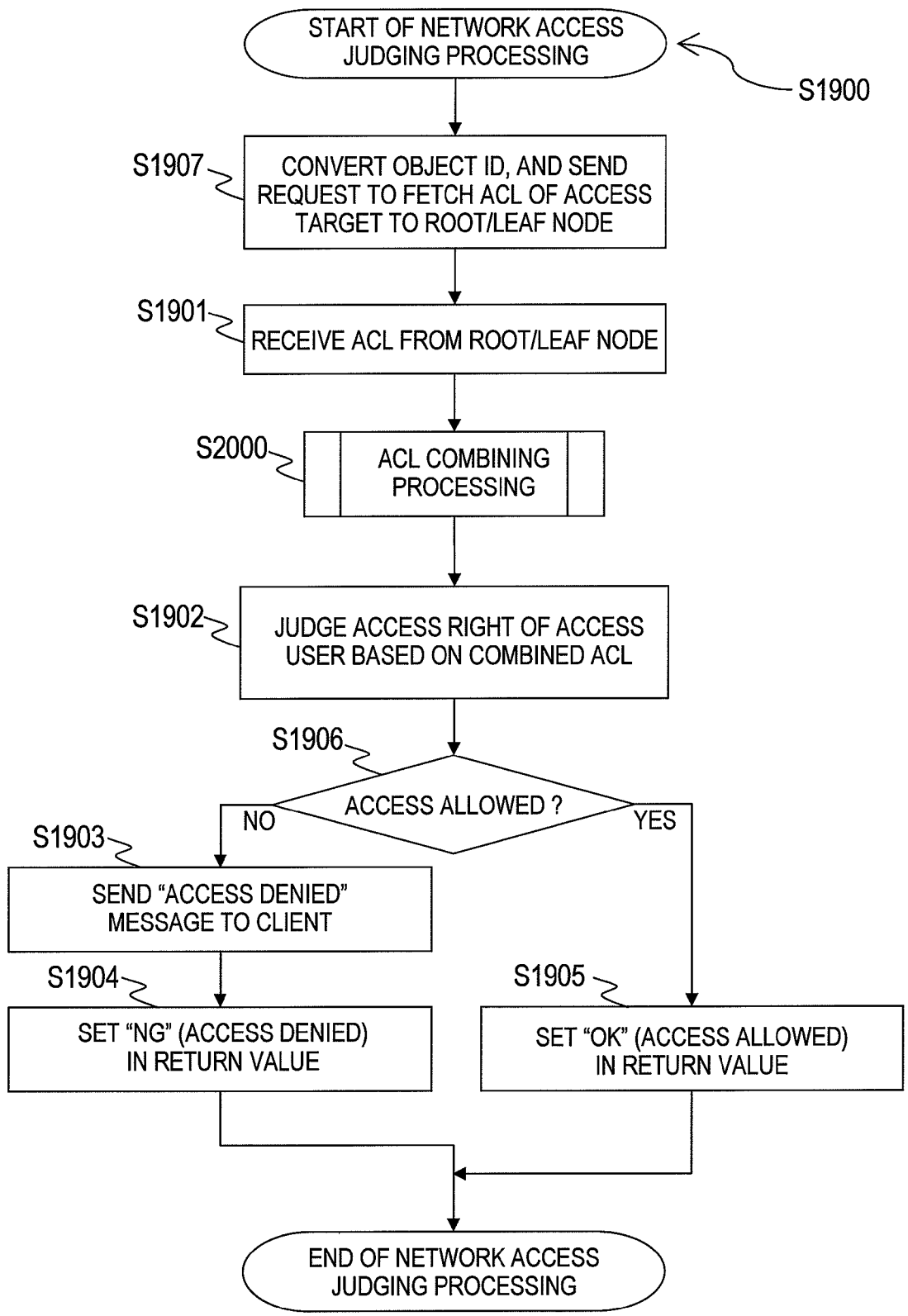
FIG. 40 is a flow chart showing a network access judging processing in accordance with the second embodiment of this invention.

FIG. 40 is a flow chart showing the network access judging processing (S1900) according to the second embodiment of this invention.

First, the file access management module 700 converts the object ID, requests the root node 200 (or the leaf node 300) to obtain an ACL of the access target object (S1907), and receives the ACL from the root node 200 (or the leaf node 300) (S1901).

Next, the ACL combining processing is executed (S2000) in order to create the combined ACL information 5400. The ACL combining processing (S2000) will be described later with reference to FIG. 41.

Whether the access should be allowed or denied is judged based on the combined ACL information 5400 (S1902). Specifically, an entry whose account 5401 matches the account of the user who has sent the access request is extracted from the ACL, and whether the access should be allowed or denied is judged by comparing information in the access request against the mask 5402 and deny/allow flag 5403 of the entry.

When the access is allowed as a result ("YES" in S1906), "OK" is set as a return value of this processing (a value sent from the network access judging processing back to the GNS local processing) (S1905), and the network access judging processing is ended.

When the access is not allowed ("NO" in S1906), an "access denied" message is sent to the client 100 (S1903), and "NG" is set as a return value of this processing (S1904). The network access judging processing is then ended.

Figure 41:
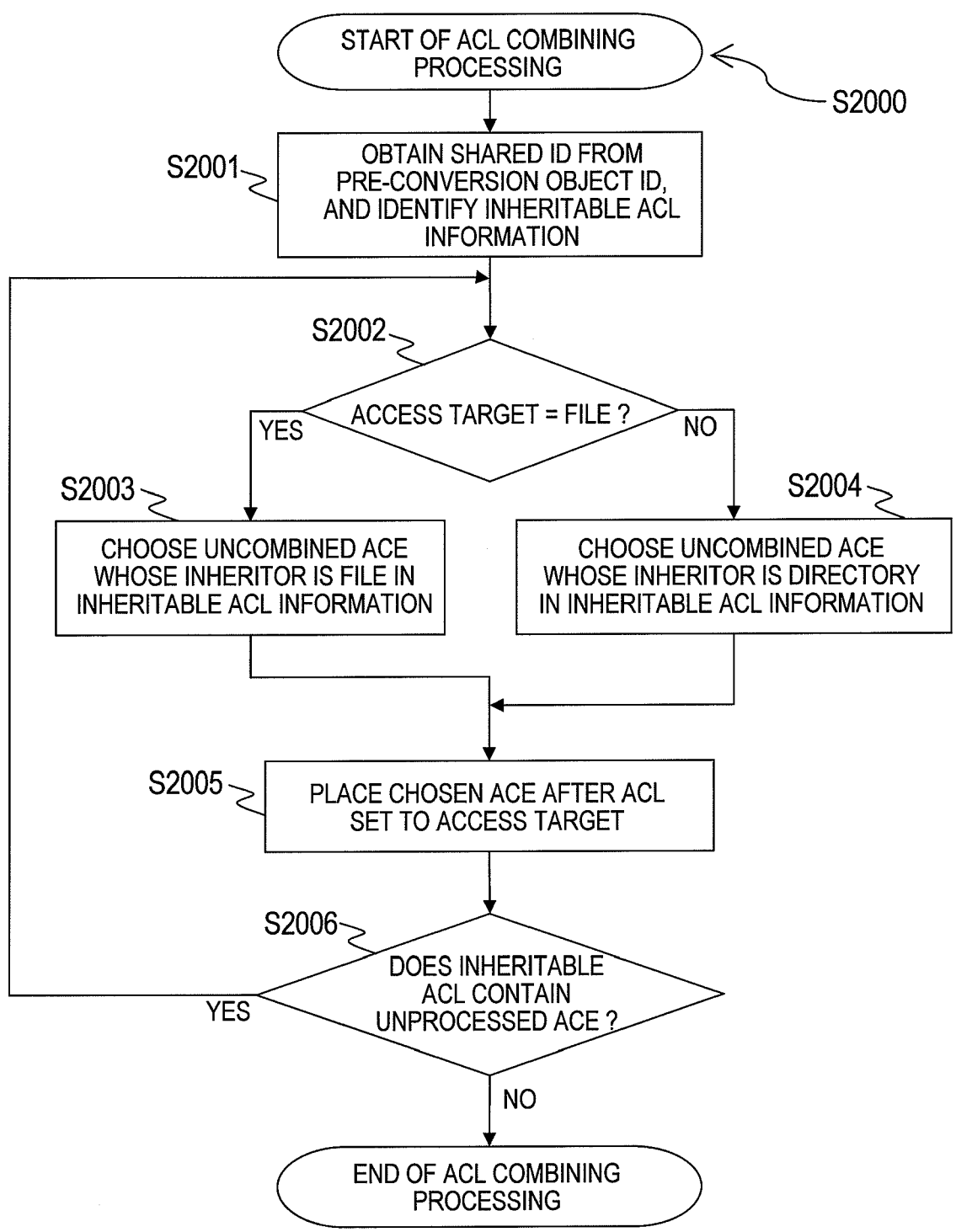
FIG. 41 is a flow chart showing an ACL combining processing in accordance with the second embodiment of this invention.

FIG. 41 is a flow chart showing the ACL combining processing (S2000) according to the second embodiment of this invention.

First, a shared ID is obtained from the object ID prior to conversion, and the inheritable ACL information 5704 is identified by referring to the shared ID-inheritable ACL association table 5500 (S2001). Next, whether the object requested to be accessed by the client 100 is a file or not is judged (S2002).

When it is found as a result that the access target is a file ("YES" in S2002), one ACE that is not registered in the combined ACL information 5400 is chosen from among ACEs that have files as their inheritors according to the inheritable ACL information 5704 (S2003). When the access target is any other object than a file (for example, a directory) ("NO" in S2002), one ACE that is not registered in the combined ACL information 5400 is chosen from among ACEs that have directories as their inheritors according to the inheritable ACL information 5704 (S2004).

Thereafter, the combined ACL information 5400 is created by placing the chosen ACE in the inheritable ACL after an existing ACL set to the file system object that is the access target (S2005).

Whether or not the inheritable ACL information 5704 has any unprocessed ACE is then judged (S2006). When it is judged as a result that there is an ACE that has not been processed ("YES" in S2006), the program returns to Step S2002 to continue the ACL combining processing and process the unprocessed ACE. When no unprocessed ACE remains in the inheritable ACL information 5704 ("NO" in S2006), the ACL combining processing is ended.

As has been described, in the second embodiment of this invention, whether an ACL is to be inherited is judged when a file is accessed instead of when a file system is mounted, and a file system can thus be mounted quickly. This cuts short the time a computer system is down, particularly so for a computer system in which file systems are mounted and unmounted frequently.

In the first embodiment described above, the system down time is long since a lot of ACEs have to be judged in order to mount or unmount a file system that contains many files. However, the second embodiment speeds up the mounting of a file system by judging whether access should be allowed or denied from an ACL inherited upon file access.

Third Embodiment

A third embodiment of this invention will be described next.

The difference between the third embodiment and the above-described embodiments is the root node 200. Unlike the root node 200 of the first embodiment, the root node 200 of the third embodiment does not set an inheritable ACL when a file server is connected to the GNS tree. Also, unlike the root node 200 of the second embodiment, the root node 200 of the third embodiment does not judge whether access should be allowed or denied by combining an inheritable ACL with an ACL set to the file system object when an access request is received.

In the third embodiment, when the root node 200 receives a file access request from the client 100, pre-access judging processing is executed first with the use of inheritable ACL information, and when a definite answer is obtained through the pre-access judging processing about whether the access should be allowed or denied, the result of the pre-access judging processing alone is used to determine whether to permit the access. Access judging processing can be completed quickly in this way.

Figure 42:
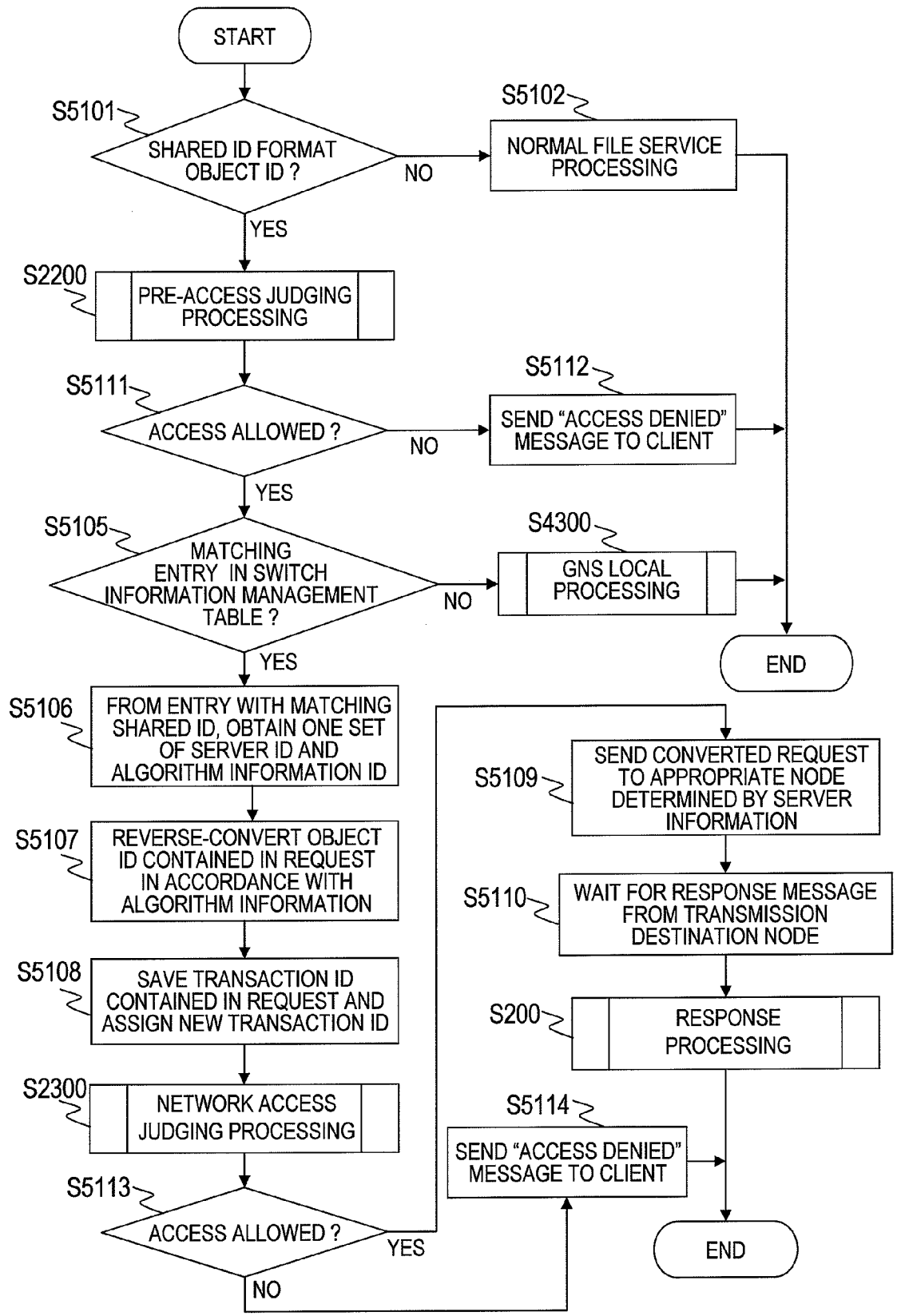
FIG. 42 is a flow chart showing a processing for virtualizing namespaces of sharing groups in accordance with a third embodiment of this invention.

FIG. 42 is a flow chart showing processing that is executed by the root node 200 to virtualize namespaces of sharing groups according to the third embodiment of this invention.

The client communication module 606 receives a file access request from one of the clients 100. The file access request is, for example, a remote procedure call (RPC) of the NFS protocol. The file access management module 700 extracts an object ID from the received request. Whether or not the extracted object ID has the shared ID format is then judged (S5101).

When the object ID extracted from the received request does not have the shared ID format, conventional file service processing is executed (S5102) and the processing of FIG. 42 is ended.

When the object ID extracted from the received request has the shared ID format, the pre-access judging processing is executed (S2200). The pre-access judging processing (S2200) will be described later with reference to FIG. 43.

When the result of the pre-access judging processing (S2200) says that the access should be denied ("NO" in S5111), an "access denied" message is sent to the client 100 (S5112), and the processing of FIG. 42 is ended. When the result of the pre-access judging processing (S2200) says that the access should be allowed ("YES" in S5111), the root node 200 proceeds to S5105.

The root node 200 then judges whether or not the switch information management table 800 has an entry that has the same shared ID as that of the object ID extracted from the received request. As mentioned above, the switch information management table 800 may have more than one entry that meets the condition (entry that holds the same shared ID).

When the switch information management table 800 has no entry that meets the condition ("NO" in S5105), it is judged that the request should be processed by the root node 200 that has received the request, and the GNS local processing is executed as shown in FIG. 38 (S4300). In the GNS local processing (S4300), local access judging processing is executed first. In the third embodiment, the local access judging processing invoked from the GNS local processing (S4300) is local access judging processing (S2400) shown in FIG. 45.

When the switch information management table 800 has an entry that meets the condition ("YES" in S5105), it is judged that the request should be processed by other root nodes 200 than the one that has received the request, and a set of a server ID and an algorithm information ID is obtained from the entry that holds the matching shared ID (S5106). In the case where a plurality of entries meet the conditions, the information sets may be obtained by round robin, or an information set that contains the name of a server whose response time measured in advance is quick may be obtained.

Algorithm information that is identified by the algorithm information ID of the obtained set is obtained from the algorithm information management table 1000. The object ID contained in the request is reverse-converted in accordance with the obtained algorithm information (S5107). As shown in FIG. 12, there are different types of algorithm such as an algorithm that involves no conversion, an algorithm that only involves deleting values from the fields for the object ID format 1301 and the shared ID 1302, and an algorithm that involves deleting values from the fields for the object ID format 1301 and the shared ID 1302 and then restoring an original node object ID from information in the field for the converted node object ID 1304 or other information.

Next, in the case where the request contains a transaction ID when the employed protocol manages transactions on a file access request level, the transaction ID is saved and another transaction ID is assigned for the transaction with a node to which the request is to be transferred (S5108).

Network access judging processing is executed next (S2300). The network access judging processing (S2300) will be described later with reference to FIG. 44. Whether or not the access is allowed is judged (S5113).

When the result of the network access judging processing (S2300) says that the access should be denied ("NO" in S5113), an "access denied" message is sent to the client 100 (S5114), and the processing of FIG. 42 is ended.

When the result of the network access judging processing (S2300) says that the access should be allowed ("YES" in S5113), the root node 200 proceeds to Step S5109. In Step S5109, the transfer destination node is identified by obtaining the server information 902 from an entry of the server information management table 900 that holds the same server ID as the one contained in the obtained set.

The converted file access request is sent to the node identified from the server information 902 (S5109), and a response message from the node to which the converted file access request has been sent is waited for (S5110).

After the response message is received from the node to which the converted file access request has been sent, the response processing shown in FIG. 18 is executed (S200), and the processing of FIG. 42 is ended.

Figure 43:
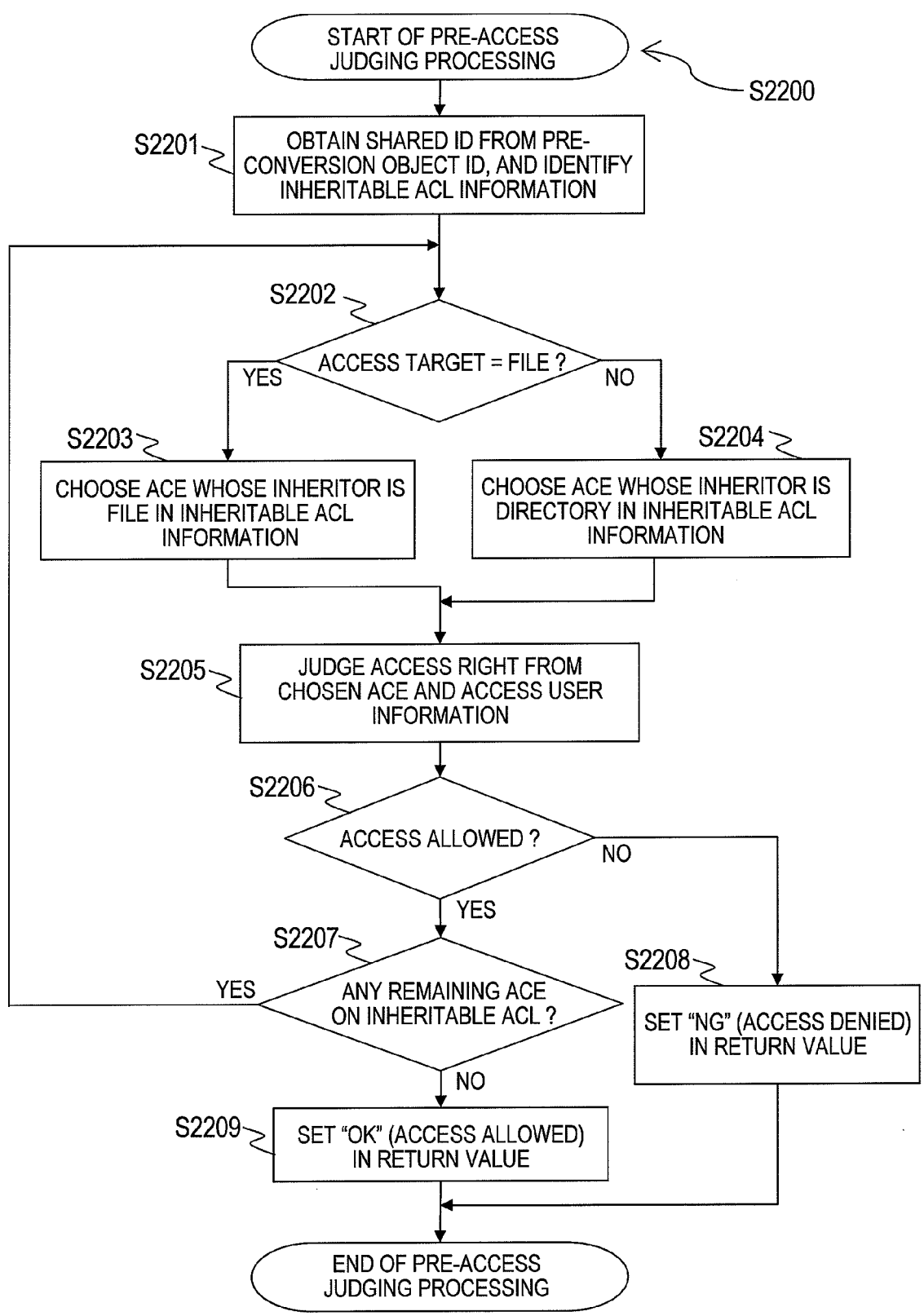
FIG. 43 is a flow chart showing a pre-access judging processing in accordance with the third embodiment of this invention.

FIG. 43 is a flow chart showing the pre-access judging processing (S2200) according to the third embodiment of this invention.

First, the file access management module 700 uses the object ID prior to conversion to obtain a shared ID from the GNS configuration information table 1200, and identifies the inheritable ACL information 5300 by referring to the shared ID-inheritable ACL association table 5500 (S2201). Next, whether the object requested to be accessed by the client 100 is a file or not is judged (S2202).

When it is found as a result that the access target is a file ("YES" in S2202), one ACE is chosen that has a file as the inheritor 5304 of the inheritable ACL information 5300 (S2203). When the access target is any other object than a file (for example, a directory) ("NO" in S2202), one ACE is chosen that has a directory as the inheritor 5304 of the inheritable ACL information 5300 (S2204).

Whether the access should be allowed or denied is then judged based on the chosen ACE and user information of the user that has made the access request (S2205).

When it is judged as a result that the access should be allowed ("YES" in S2206), the next step is S2207. When it is judged as a result that the access should be denied ("NO" in S2206), "NG" (access denied) is set as the return value (S2208), and the pre-access judging processing is ended.

In Step S2207, whether or not the inheritable ACL information 5300 has any unprocessed ACE is then judged (S2207). When it is judged as a result that there is an ACE that has not been processed ("YES" in S2207), the program returns to Step S2202 to continue the pre-access judging processing and process the unprocessed ACE. When no unprocessed ACE remains in the inheritable ACL information 5300 ("NO" in S2207), "OK" (access allowed) is set as the return value (S2209), and the pre-access judging processing is ended.

Figure 44:
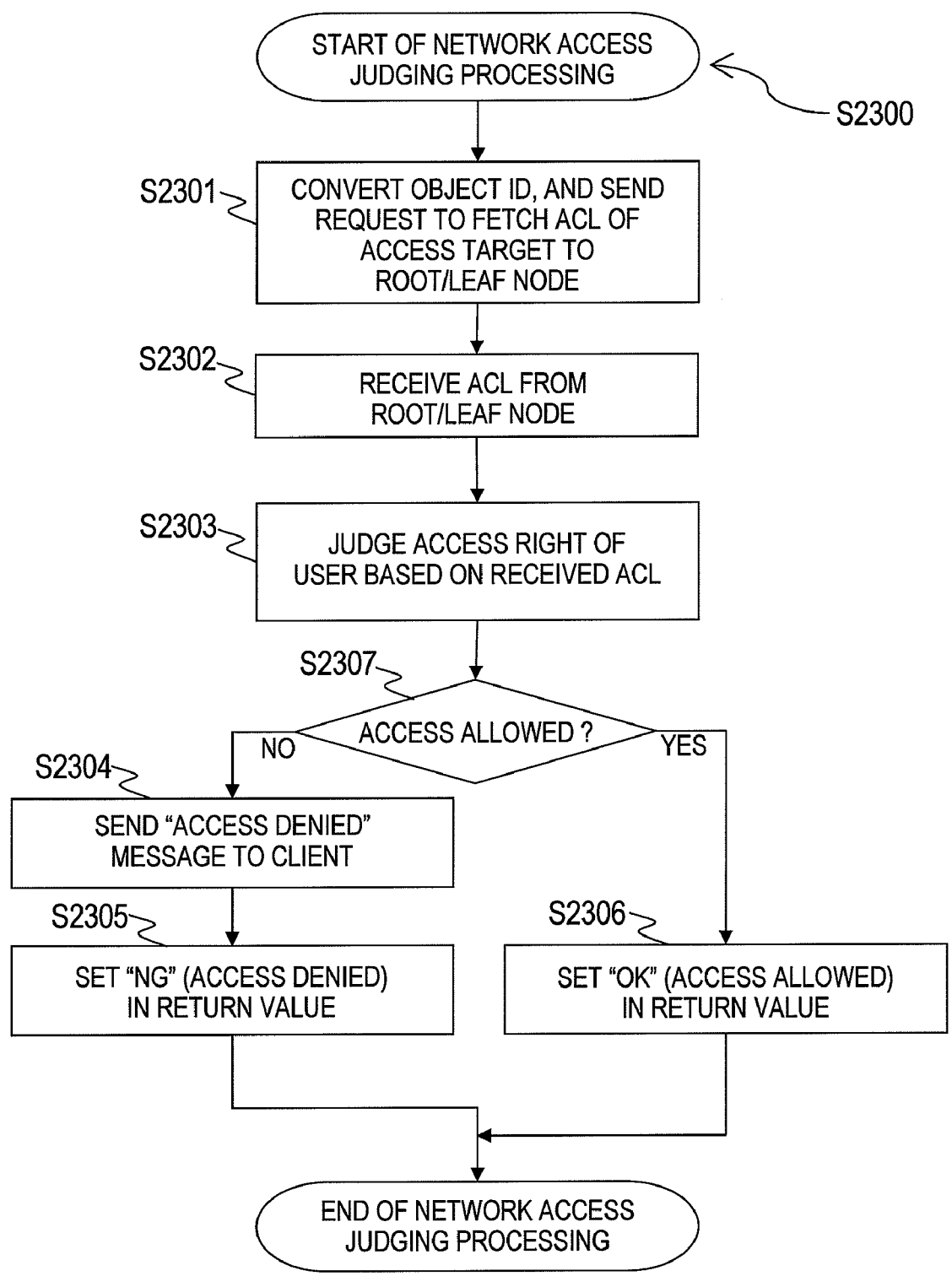
FIG. 44 is a flow chart showing a network access judging processing in accordance with the third embodiment of this invention.

FIG. 44 is a flow chart showing the network access judging processing (S2300) according to the third embodiment of this invention.

First, the file access management module 700 forward-converts the object ID, requests the root node 200 (or the leaf node 300) to obtain an ACL of the access target object (S2301), and receives the ACL from the root node 200 (or the leaf node 300) (S2302).

Whether the access should be allowed or denied to the user who has made the access request is judged based on the received ACL (S2303).

When the access is allowed as a result ("YES" in S2307), "OK" is set as a return value of this processing (a value sent from the network access judging processing back to the processing from which the network access judging processing has been invoked) (S2306), and the network access judging processing is ended.

When the access is not allowed ("NO" in S2307), an "access denied" message is sent to the client 100 (S2304), and "NG" is set as a return value of this processing (S2305). The network access judging processing is then ended.

Figure 45:
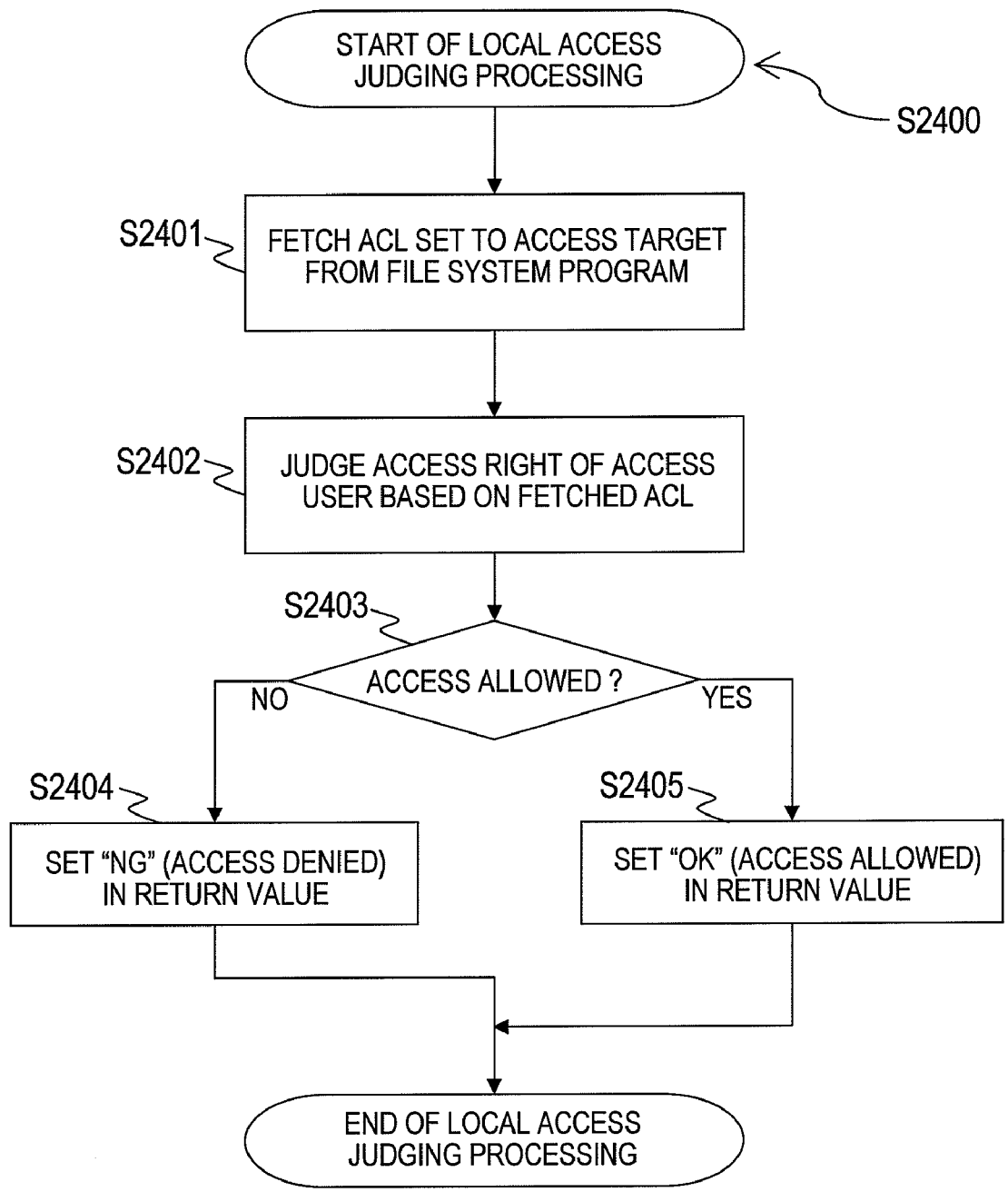
FIG. 45 is a flow chart showing a local access judging processing in accordance with the third embodiment of this invention.

FIG. 45 is a flow chart showing the local access judging processing (S2400) according to the third embodiment of this invention. This local access judging processing (S2400) is invoked from the same GNS local processing (S4300) that is described in the second embodiment with reference to FIG. 38.

First, the file access management module 700 obtains an ACL set to the file system object that is the access target from the file system program 203 (S2401). Whether the access should be allowed or denied to the user who has made the access request is judged based on the obtained ACL (S2402).

When it is judged as a result that the access should be allowed ("YES" in S2403), "OK" is set as a return value of this processing (a value sent from the local access judging processing back to the processing from which the local access judging processing has been invoked) (S2405), and the local access judging processing is ended. When it is judged as a result that the access should be denied ("NO" in S2403), "NG" is set as a return value of this processing (S2404), and the local access judging processing is ended.

As has been described, in the third embodiment of this invention, whether an ACL is to be inherited is judged when a file is accessed instead of when a file system is mounted. A file system can thus be mounted quickly as in the second embodiment described above. In addition, whether access should be allowed or denied can be judged quickly upon file access since the third embodiment includes the pre-access judging processing, which is executed when a file is accessed to obtain access information of an inheritor, and rejects the access request in the case where at least one piece of the obtained inheritor access information indicates that the access should be denied.

While the present invention has been described in detail and pictorially in the accompanying drawings, the present invention is not limited to such detail but covers various obvious modifications and equivalent arrangements, which fall within the purview of the appended claims.

What is claimed is:

1. A method comprising:
providing at a root node a virtual name space which has a first directory tree;
providing at a file system on a leaf node a second directory tree, an access control information being set to a file system object of the second directory tree;
mounting the second directory tree on a mount point of the first directory tree;
specifying inheritable access control information set to a parent directory of the mount point;
adding the specified inheritable access control information to the access control information set to the file system object of the second directory tree;
unmounting the second directory tree from the mount point of the first directory tree; and
selectively deleting the inheritable access control information from the access control information set to the file system object of the second directory tree.

2. The method according to claim 1, further comprising, specifying an inheritable access control information set to the mount point,
wherein, at the deleting step, the specified inheritable access control information is deleted from the access control information set to the file system object of the second directory tree.

3. The method according to claim 2, wherein the file system object is a file or a directory.

4. The method according to claim 1,
wherein, at the adding step, the inheritable access control information is added to the access control information set to the file system object of the second directory tree when receiving an access request to the file system object.

5. A computer system comprising:
a client computer;
a root node coupled to the client computer, the root node providing a virtual name space which has a first directory tree; and
a leaf node coupled to the root node, the leaf node having a file system which provides a second directory tree, access control information being set to a file system object of the second directory tree,
wherein,
in case that the second directory tree is mounted on a mount point of the first directory tree,
if inheritable access control information is set to a parent directory of the mount point,
the root node is configured to add the inheritable access control information to the access control information set to the file system object of the second directory tree,
wherein,
in case that the second directory tree is unmounted from the mount point of the first directory tree,
the root node is configured to selectively delete the inheritable access control information from the access control information set to the file system object of the second directory tree.

6. The computer system according to claim 5, wherein,
in case that the second directory tree is unmounted from the mount point of the first directory tree,
the root node is configured to:
specify inheritable access control information set to the mount point; and
delete the specified inheritable access control information from the access control information set to the file system object of the second directory tree.

7. The computer system according to claim 6, wherein the file system object is a file or a directory.

8. The computer system according to claim 5, wherein the root node is configured to add the inheritable access control information to the access control information set to the file system object of the second directory tree when receiving an access request to the file system object.

* * * * *